Figure 1:
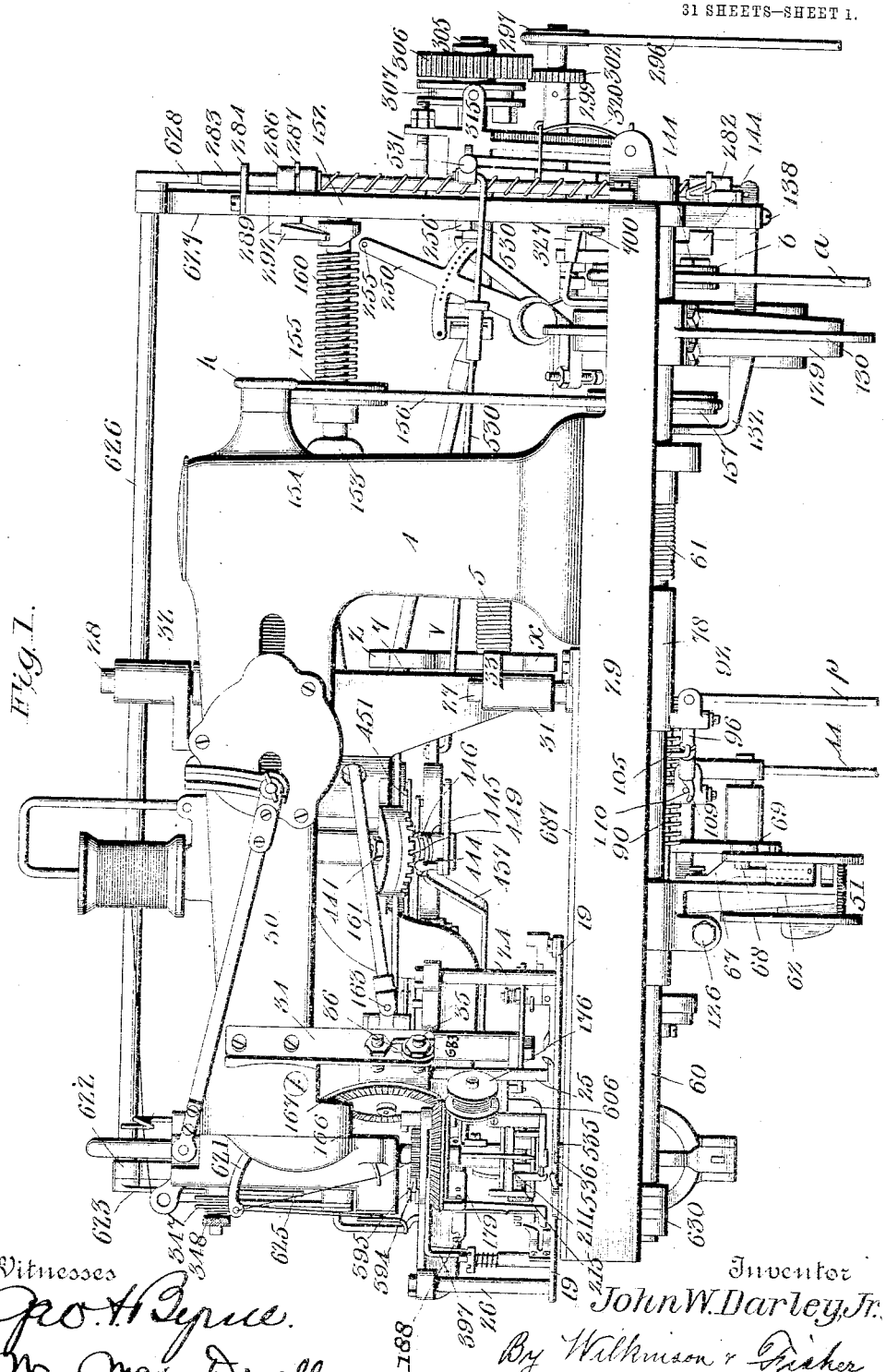

J. W. DARLEY, Jr.
BUTTON SEWING MACHINE.
APPLICATION FILED MAY 25, 1904.

1,124,597.

Patented Jan. 12, 1915.
31 SHEETS—SHEET 1.

Witnesses
Geo. H. Pyne.
W. Max. Duvall.

Inventor
John W. Darley, Jr.
By Wilkinson & Fisher
Attorneys.

J. W. DARLEY, Jr.
BUTTON SEWING MACHINE.
APPLICATION FILED MAY 25, 1904.

1,124,597.

Patented Jan. 12, 1915.
31 SHEETS—SHEET 12.

Witnesses
J. F. Pattison
Geo. H. Spence

Inventor
John W. Darley, Jr.
By Wilkinson & Fisher
Attorneys.

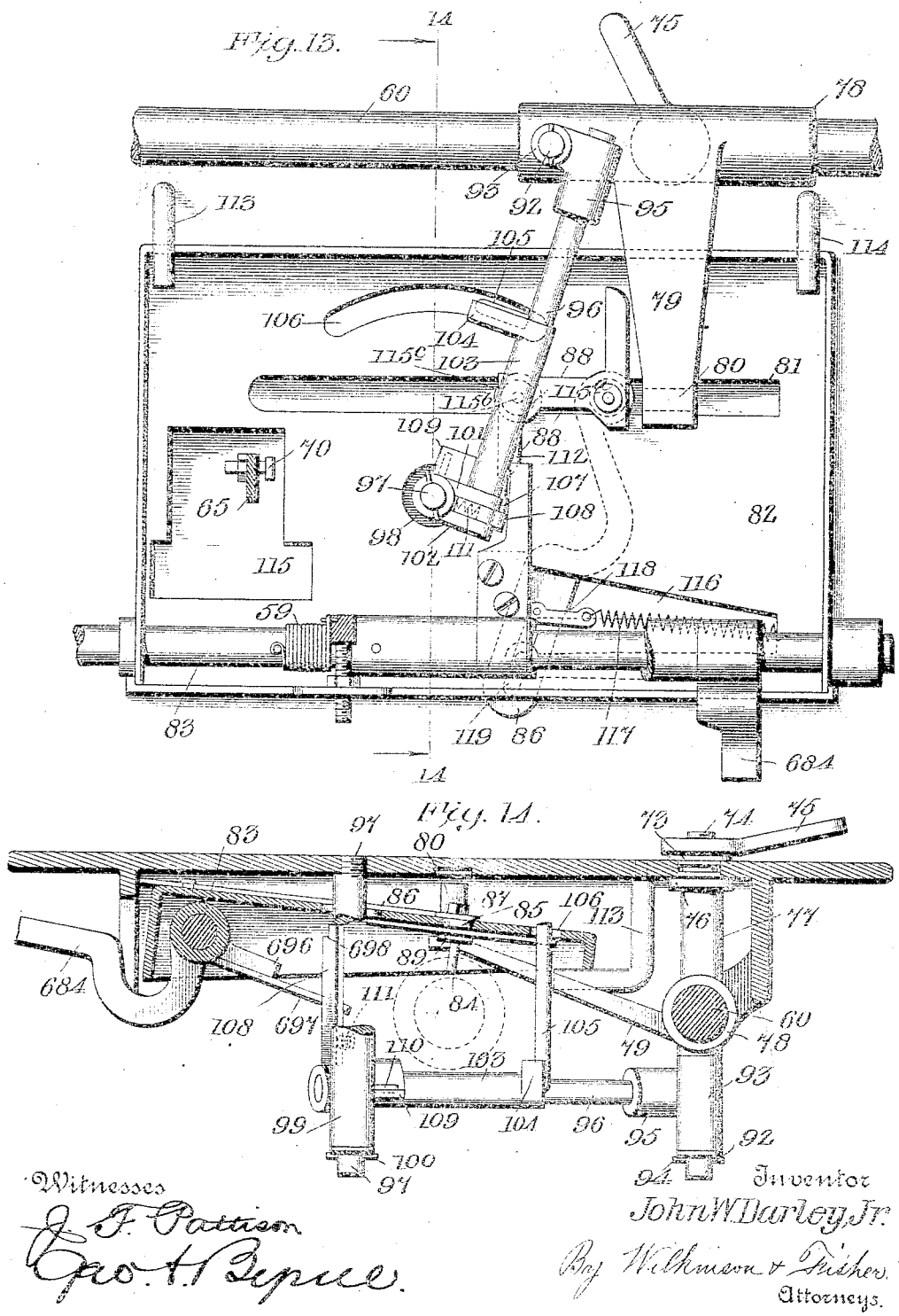

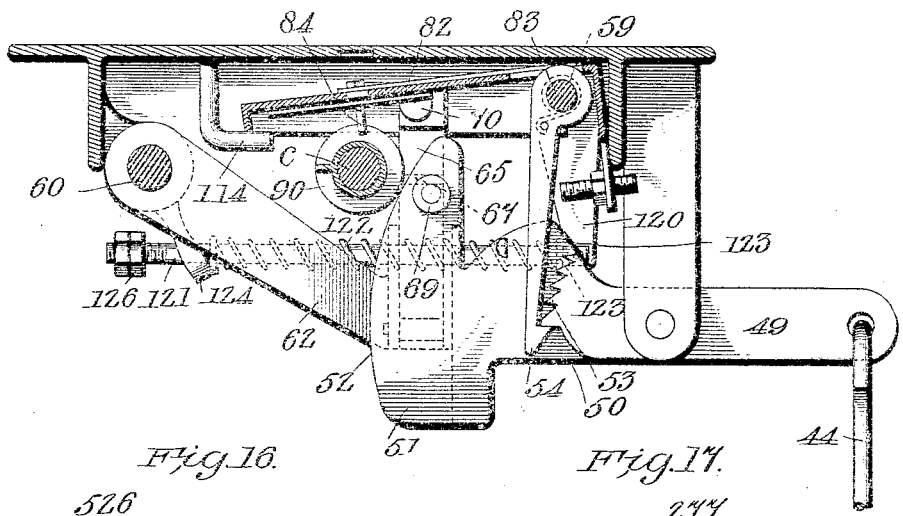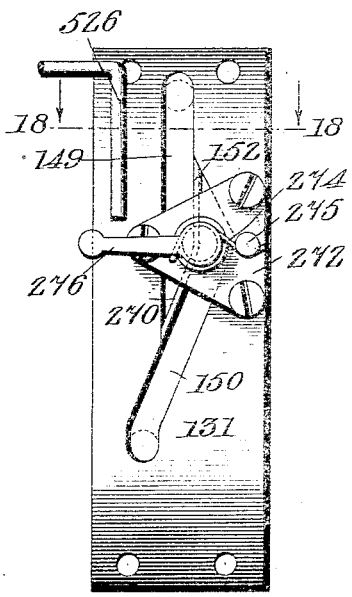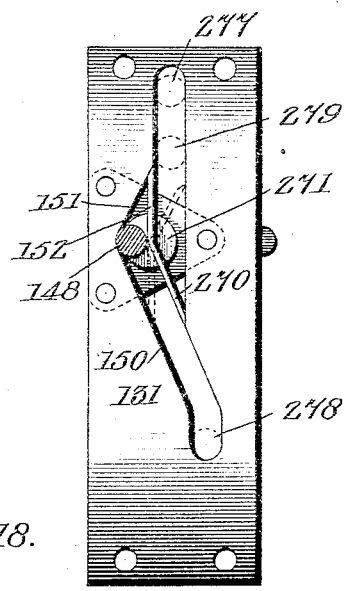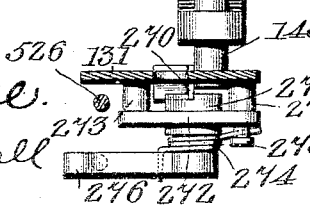

J. W. DARLEY, Jr.
BUTTON SEWING MACHINE.
APPLICATION FILED MAY 25, 1904.
1,124,597.
Patented Jan. 12, 1915.
31 SHEETS—SHEET 15.
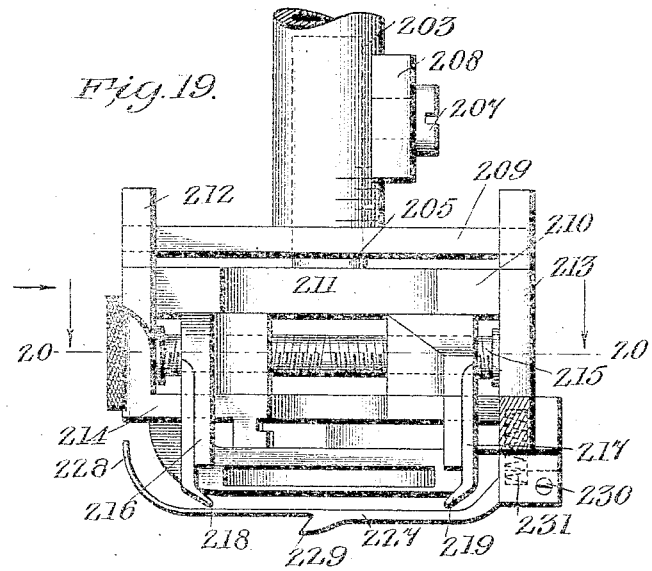
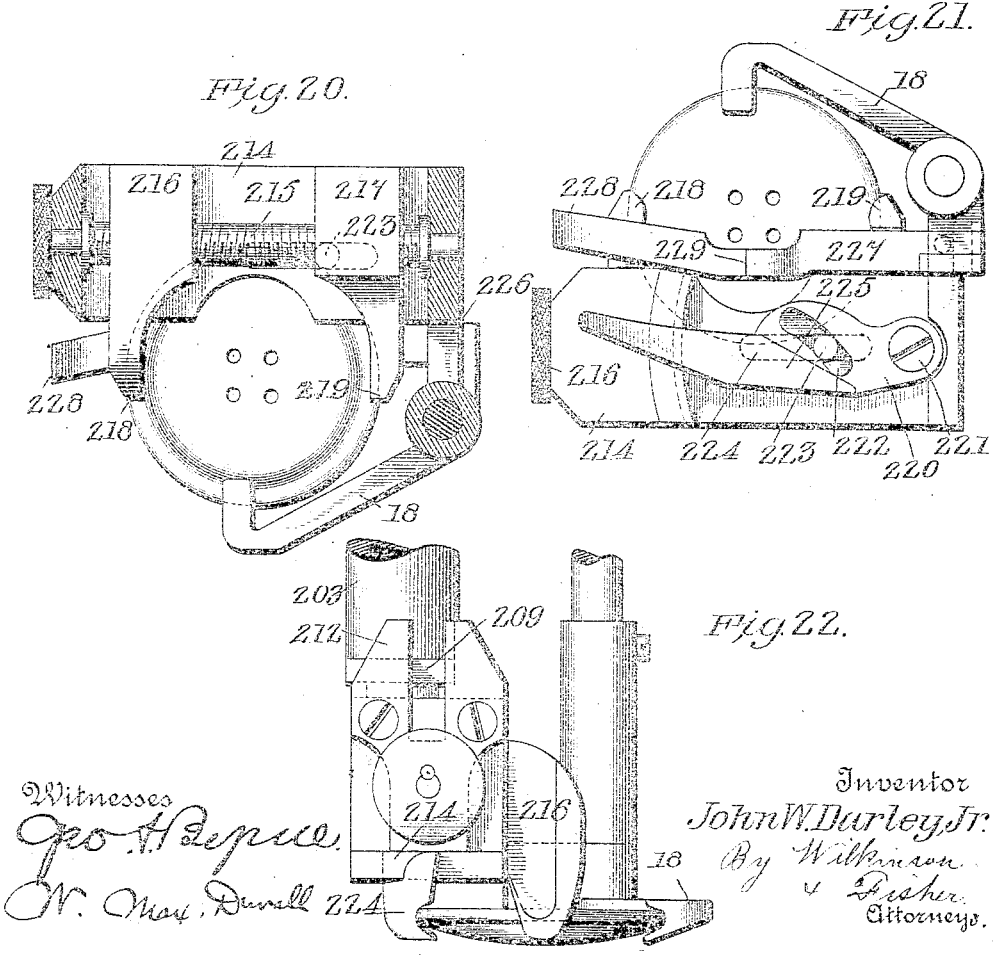
Witnesses
Geo. H. Depue
N. May Duvall
Inventor
John W. Darley Jr.
By Wilkinson & Fisher
Attorneys J. W. DARLEY, Jr.
BUTTON SEWING MACHINE.
APPLICATION FILED MAY 25, 1904.
1,124,597.
Patented Jan. 12, 1915.
31 SHEETS—SHEET 16.
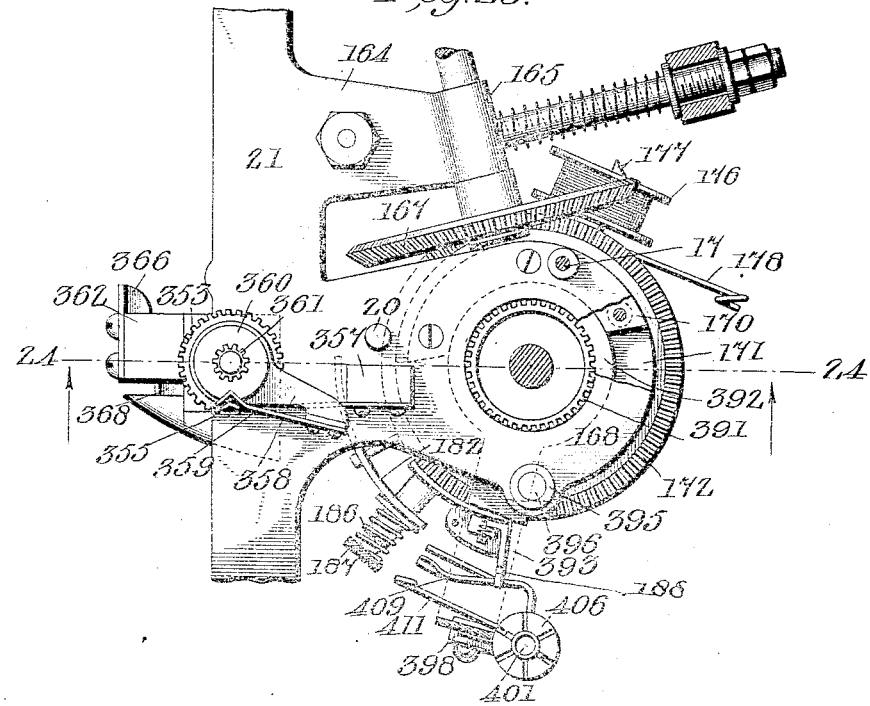
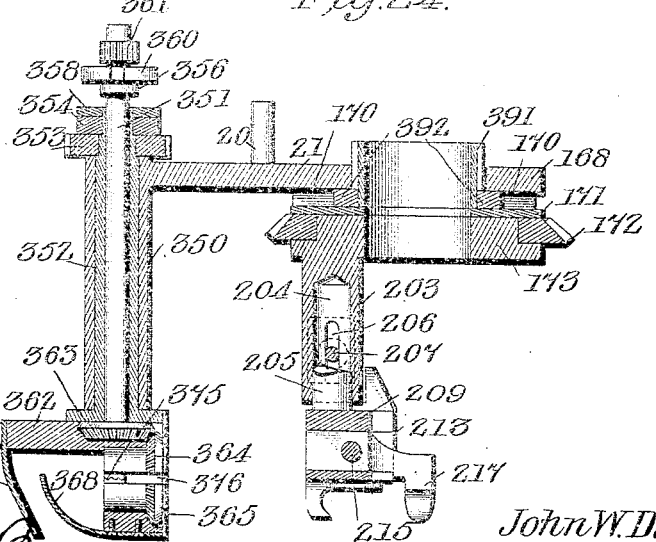
Witnesses
Inventor
John W. Darley, Jr.
By Wilkinson & Fisher
Attorneys.

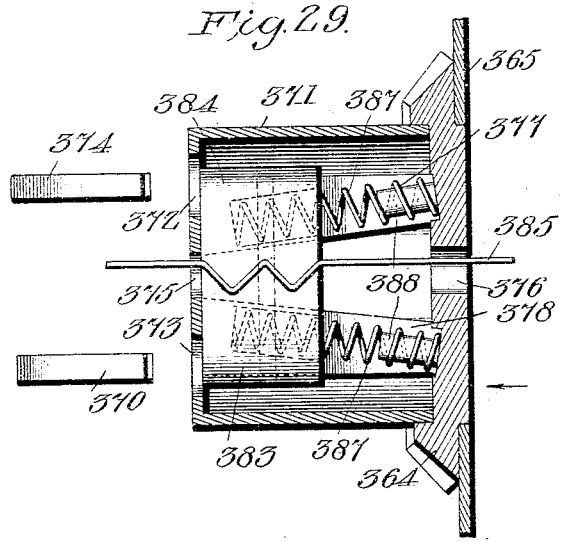
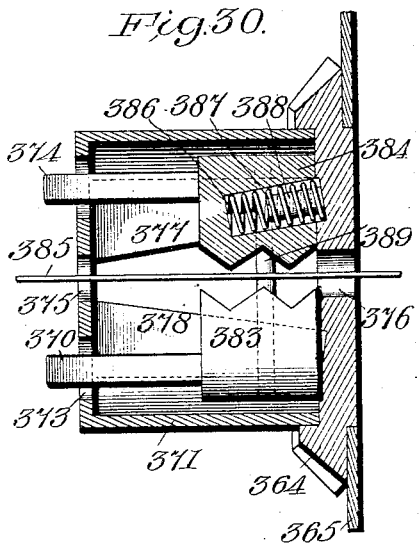
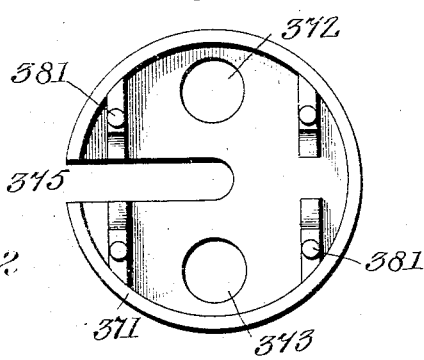
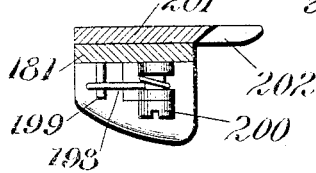
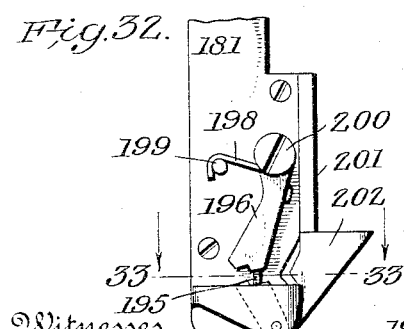
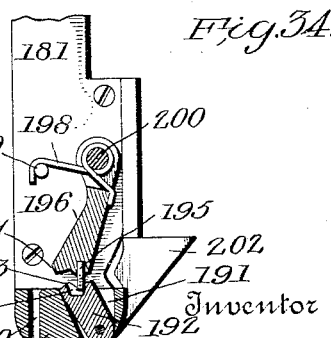

J. W. DARLEY, Jr.
BUTTON SEWING MACHINE.
APPLICATION FILED MAY 25, 1904.
1,124,597.
Patented Jan. 12, 1915.
31 SHEETS—SHEET 19.
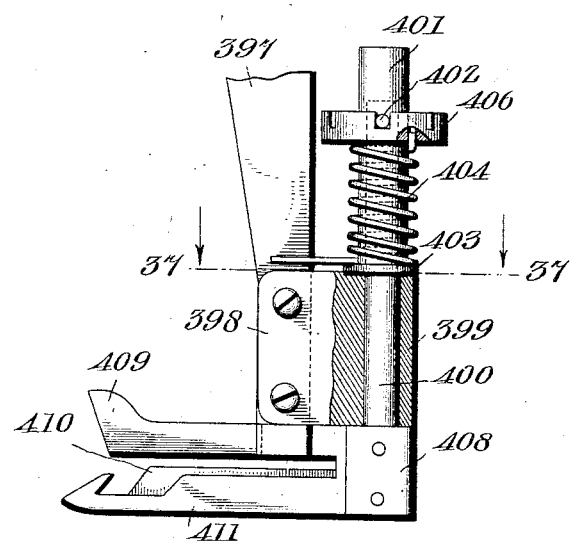
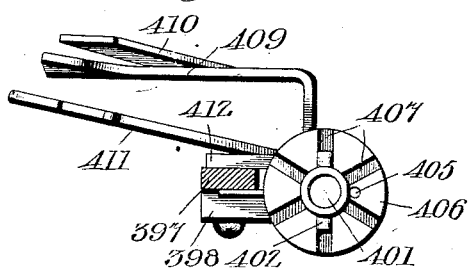
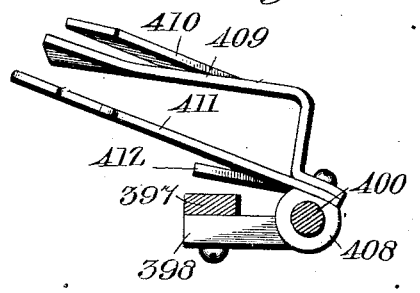
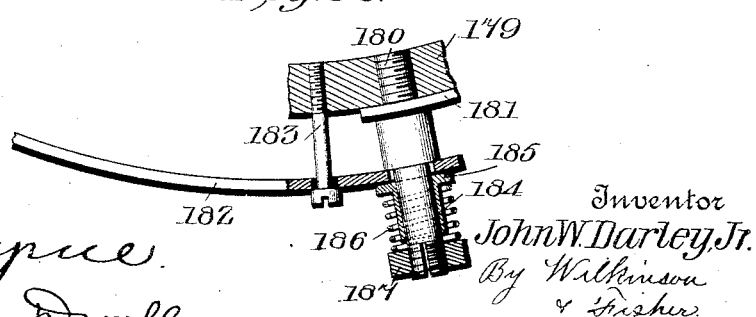
Witnesses
Geo. H. Bynce.
W. Max. Duvall.
Inventor
John W. Darley, Jr.
By Wilkinson
& Fisher
Attorneys J. W. DARLEY, Jr.
BUTTON SEWING MACHINE.
APPLICATION FILED MAY 25, 1904.
1,124,597.
Patented Jan. 12, 1915.
31 SHEETS—SHEET 20.
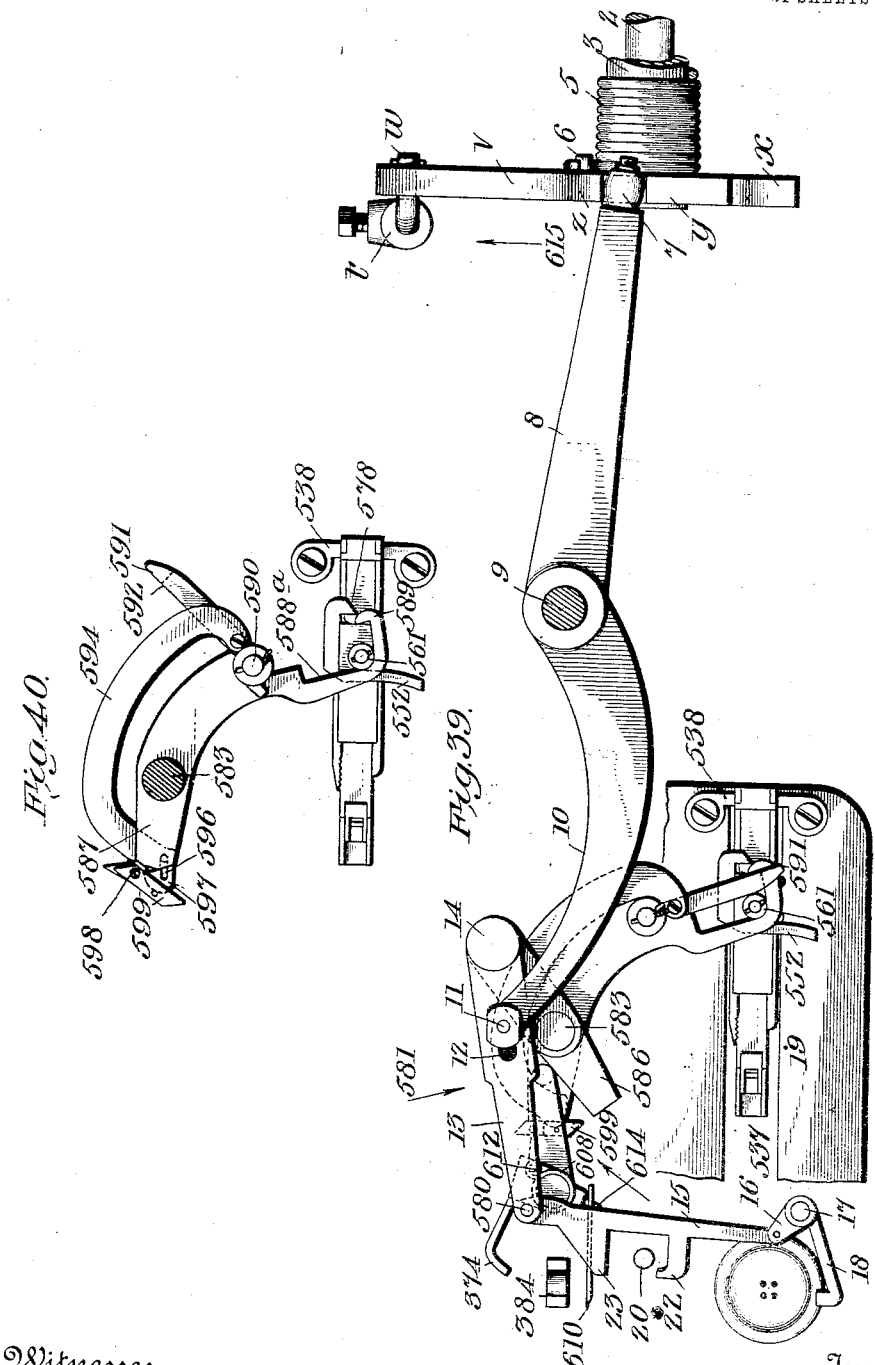
Witnesses
J. F. Pattyson
Geo. H. Dupree
Inventor
John W. Darley, Jr.
By Wilkinson & Fisher
Attorneys.

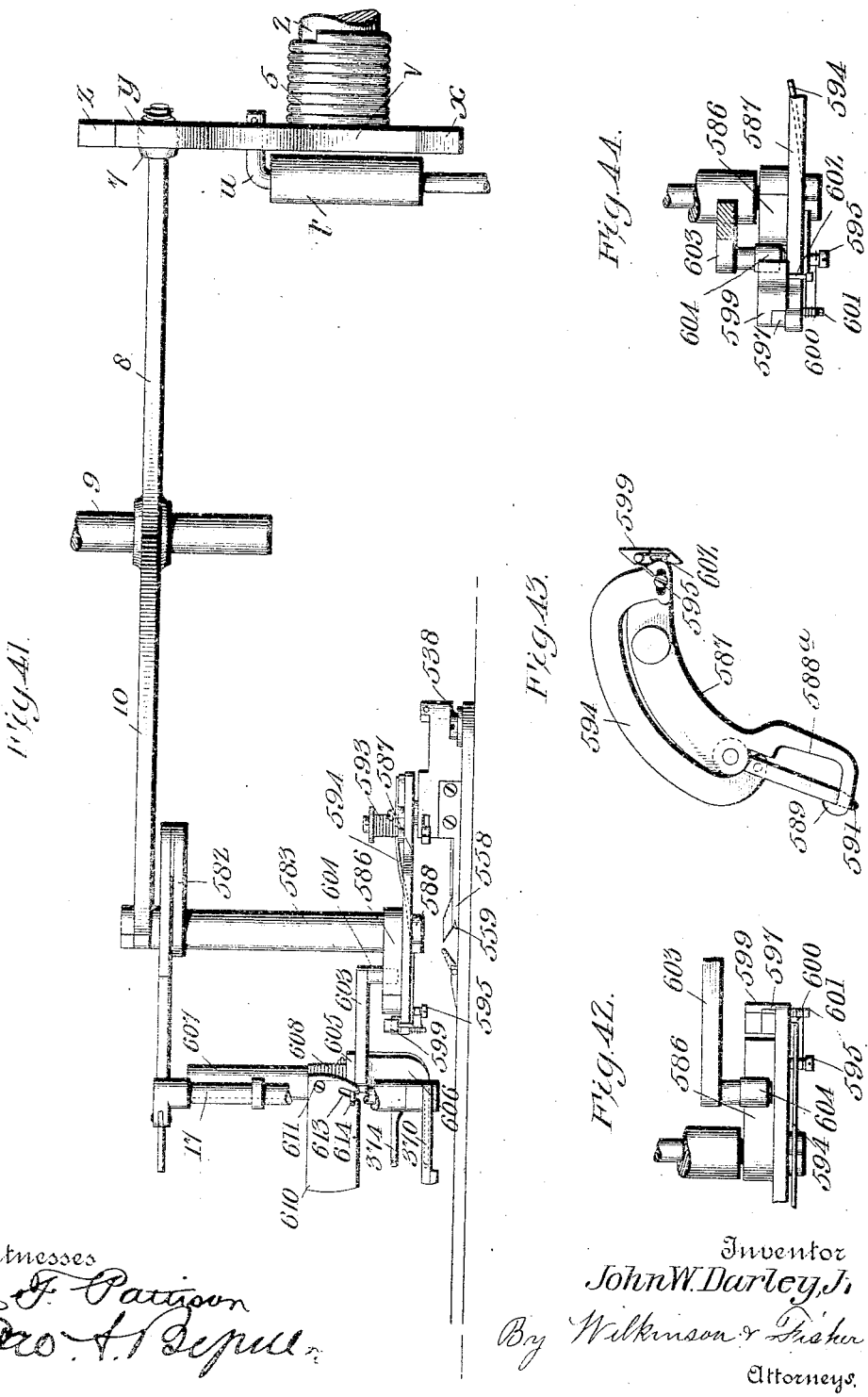

J. W. DARLEY, Jr.
BUTTON SEWING MACHINE.
APPLICATION FILED MAY 25, 1904.

1,124,597.

Patented Jan. 12, 1915.
31 SHEETS—SHEET 22.

Witnesses
J. F. Pattison
Geo. A. Bepue

Inventor
John W. Darley, Jr.
By Wilkinson & Fisher
Attorneys

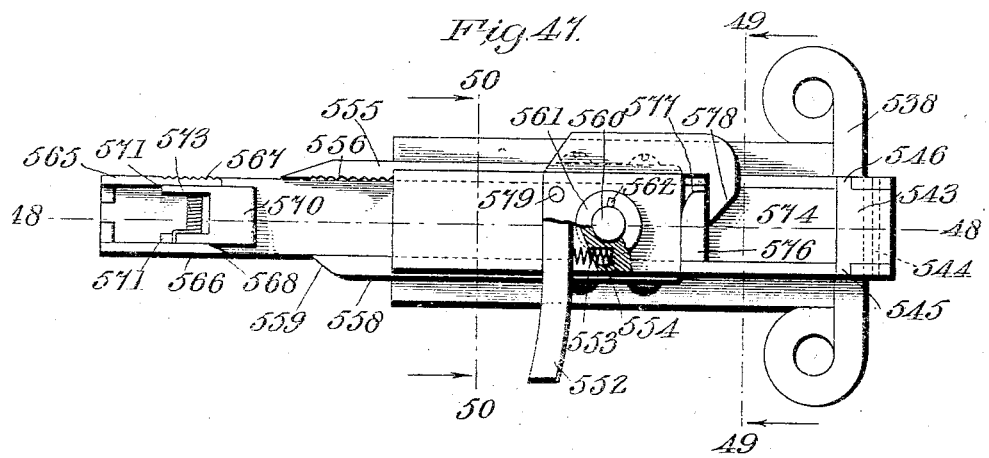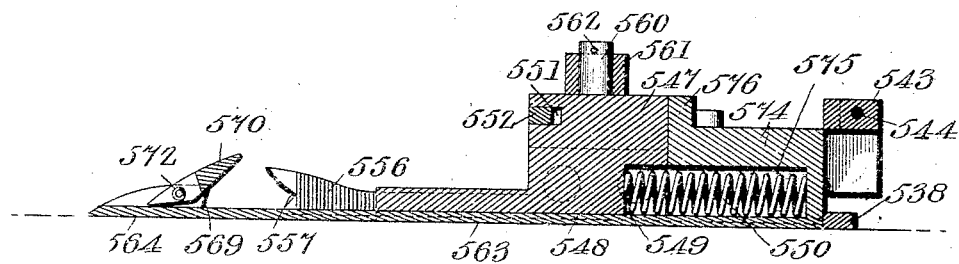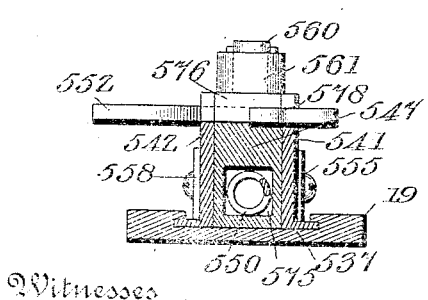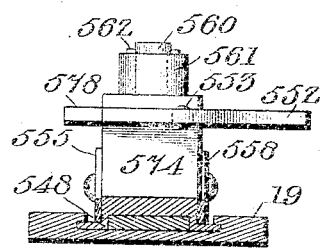

J. W. DARLEY, Jr.
BUTTON SEWING MACHINE.
APPLICATION FILED MAY 25, 1904.
1,124,597.
Patented Jan. 12, 1915
31 SHEETS—SHEET 24.
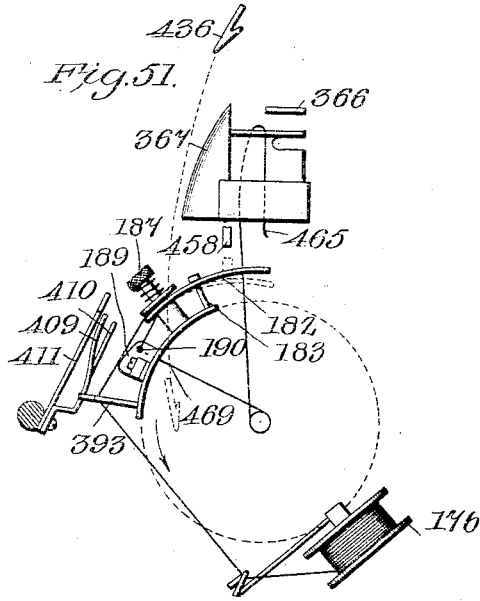
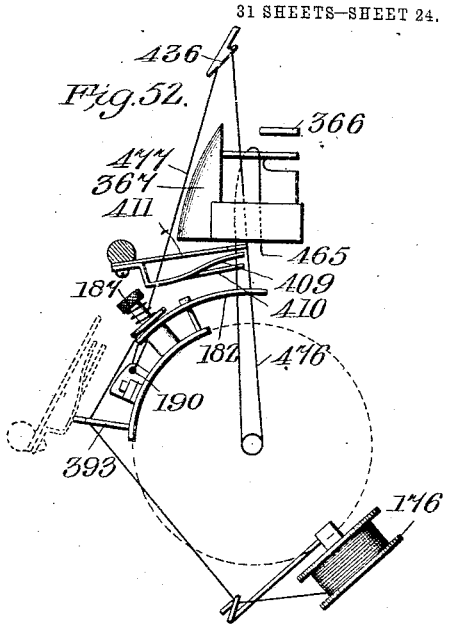
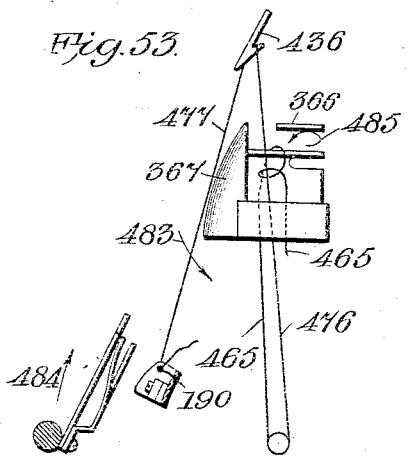
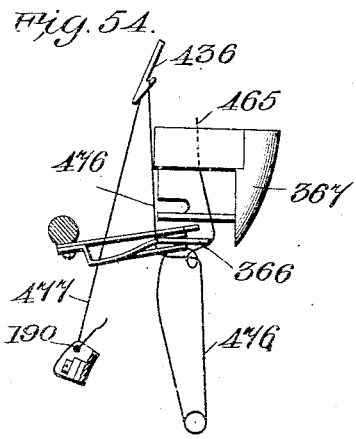
Witnesses
Geo. T. Bepue
W. Max. Duvall
Inventor
John W. Darley, Jr.
By Wilkinson & Fisher.
Attorneys.

J. W. DARLEY, Jr.
BUTTON SEWING MACHINE.
APPLICATION FILED MAY 25, 1904.

1,124,597.

Patented Jan. 12, 1915.
31 SHEETS—SHEET 25.

Witnesses
Geo. H. Pepper
W. Max Duvall

Inventor
John W. Darley Jr
By Wilkinson & Fisher
Attorneys.

J. W. DARLEY, Jr.
BUTTON SEWING MACHINE.
APPLICATION FILED MAY 25, 1904.
1,124,597.
Patented Jan. 12, 1915.
31 SHEETS—SHEET 26.
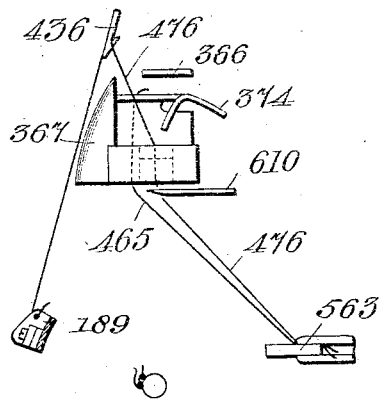
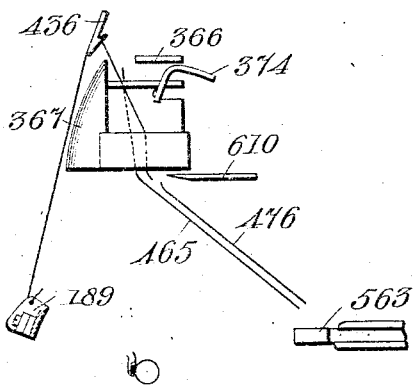
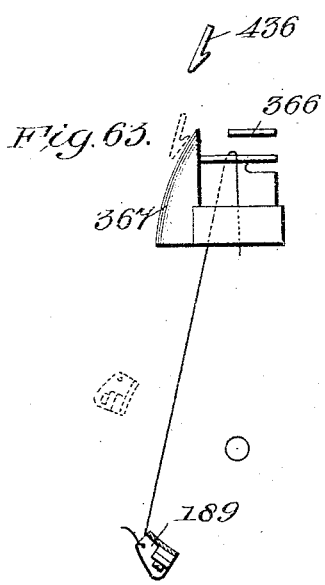
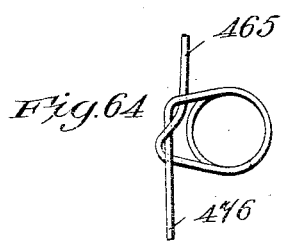
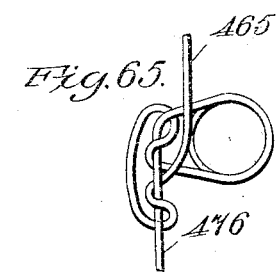
Witnesses
Inventor
John W. Darley, Jr.
By Wilkinson & Fisher
Attorneys J. W. DARLEY, Jr.
BUTTON SEWING MACHINE.
APPLICATION FILED MAY 25, 1904.

1,124,597.

Patented Jan. 12, 1915.
31 SHEETS—SHEET 27.

Witnesses
Geo. H. Bypau.
N. May. Duvall.

Inventor
John W. Darley, Jr.
By Wilkinson & Fisher
Attorneys.

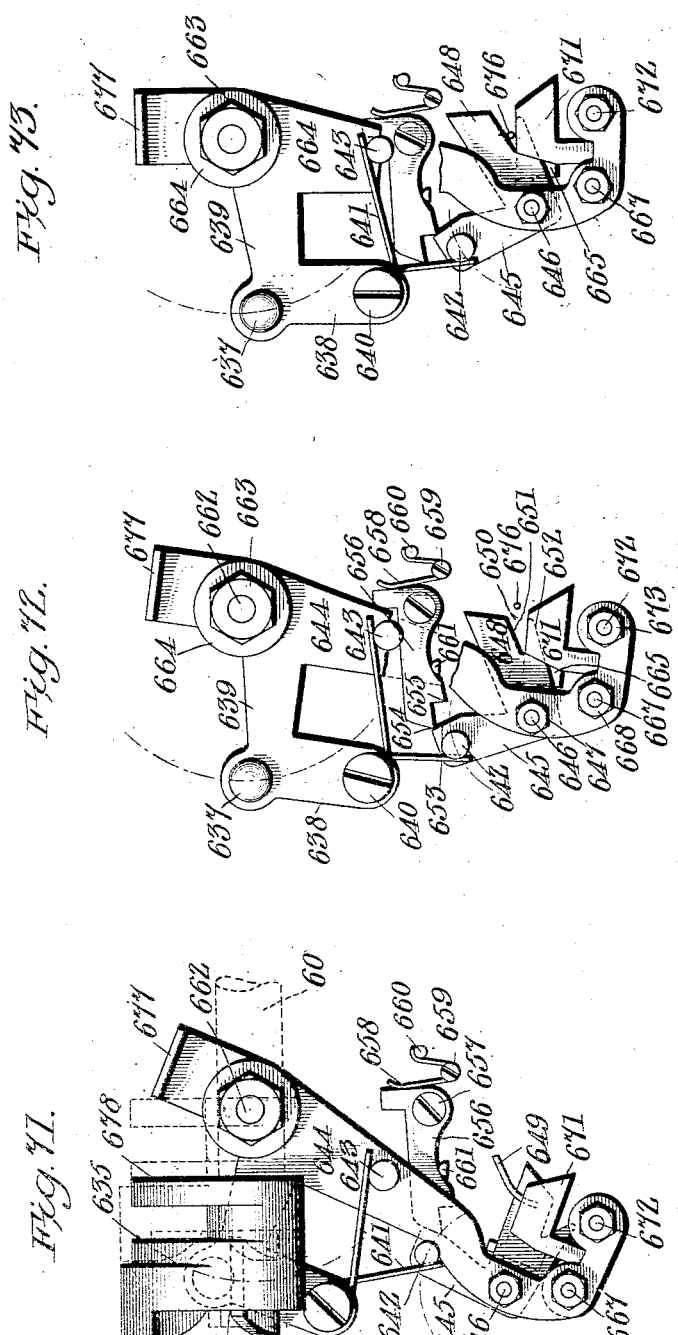

J. W. DARLEY, Jr.
BUTTON SEWING MACHINE.
APPLICATION FILED MAY 25, 1904.

1,124,597.

Patented Jan. 12, 1915.
31 SHEETS—SHEET 29.

Witnesses
Geo. H. Bepice.
W. Max. Duvall.

Inventor
John W. Darley, Jr.
By Wilkinson & Fisher
Attorneys

J. W. DARLEY, Jr.
BUTTON SEWING MACHINE.
APPLICATION FILED MAY 25, 1904.
1,124,597.
Patented Jan. 12, 1915.
31 SHEETS—SHEET 30.
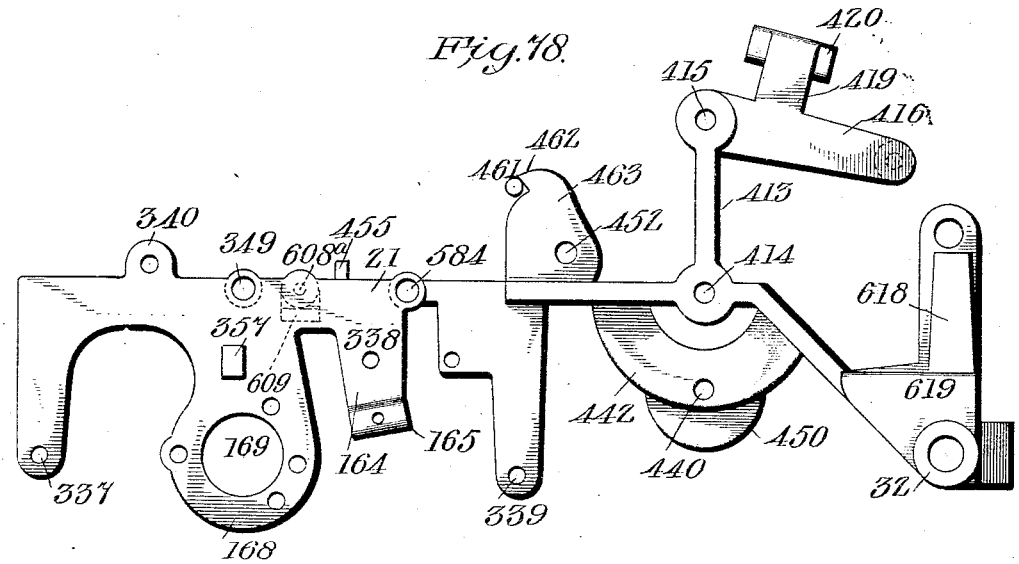
Fig. 78.
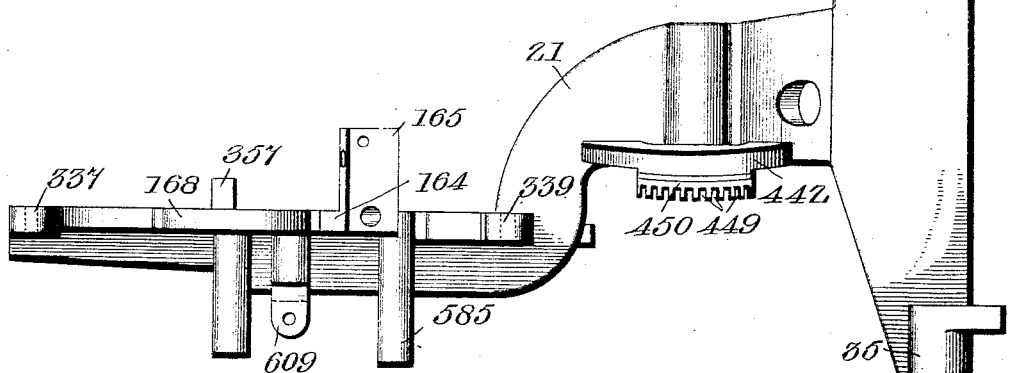
Fig. 79.
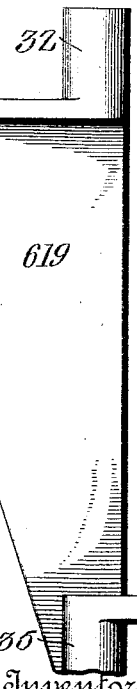
Witnesses
J. F. Patterson
Geo. H. Dupree
Inventor
John W. Darley, Jr.
By Wilkinson & Fisher
Attorneys.

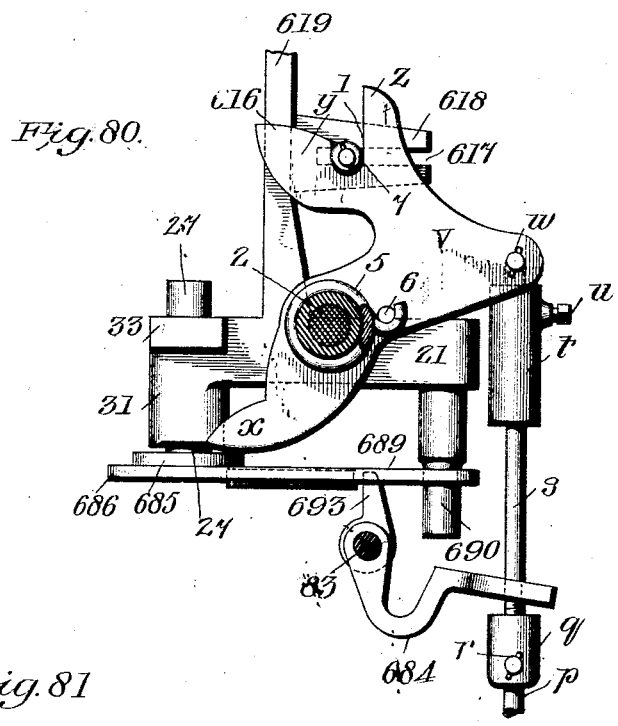
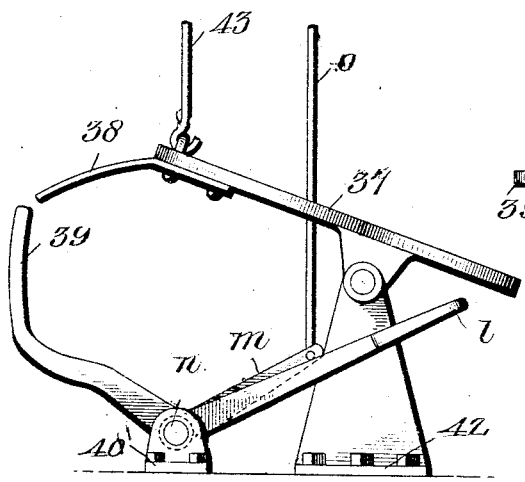
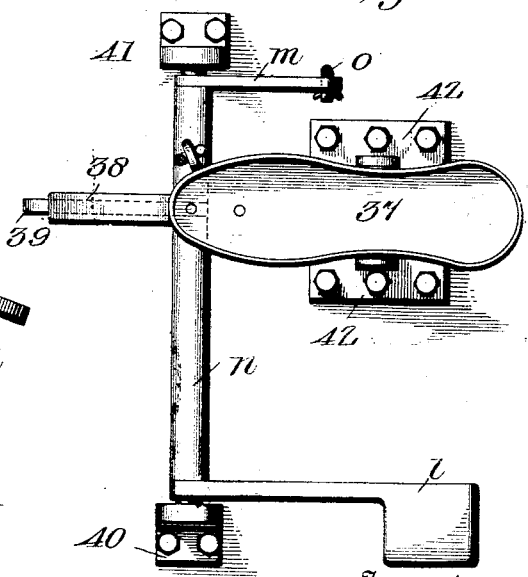

UNITED STATES PATENT OFFICE.

JOHN W. DARLEY, JR., OF BALTIMORE, MARYLAND.

BUTTON-SEWING MACHINE.

1,124,597.  Specification of Letters Patent.  Patented Jan. 12, 1915.

Application filed May 25, 1904. Serial No. 209,728.

*To all whom it may concern:*

Be it known that I, JOHN W. DARLEY, Jr., a citizen of the United States, residing at Baltimore city, State of Maryland, have invented certain new and useful Improvements in Button-Sewing Machines; and I do hereby declare the following to be a full, clear, and exact description of the invention, such as will enable others skilled in the art to which it appertains to make and use the same.

My invention relates to improvements in machines for sewing buttons on garments or other fabrics, and the object of my invention is to provide a machine which will sew buttons on garments in imitation of hand sewing, namely, with the buttons separated from the garment or other fabric by a neck of thread, around which neck another thread is wound, thus securing the buttons to the garments at a distance therefrom, the ends of the wrapping thread being brought together and knotted. Such a machine has hitherto never been made so far as I am aware.

Further objects of my invention are to provide a machine which will sew buttons onto garments or other fabrics, and so constructed that the number of stitches may be regulated and that the buttons still be held at any desired distance from the fabric; to provide means whereby the button and fabric may be shifted when a four hole button is used; to provide means whereby the number of threads wound around the neck of thread by the winding mechanism may be regulated, or whereby these wrapping threads may be omitted altogether, if desired; to provide means whereby the ends of the winding or wrapping thread may be double knotted; to provide means whereby after the knot is made, the ends are trimmed off; to provide means whereby at the proper time the shuttle thread may be cut and the end leading to the shuttle firmly held until the operation of sewing on the next button is completed; to provide means whereby after trimming the wrapping thread after the same is knotted, the ends leading to the knot tying mechanism are held by the trimming mechanism, which in its backward motion pulls from the gripper of the knot tying mechanism the beginning end of the winding thread of the button which has just been sewed on, while at the same time a fresh end is pulled into the gripper of the knot tying mechanism and there held until the next button is sewed on, knotted and trimmed; to provide means giving a light tension on the winding thread as the knot is being formed, and a heavy tension on the same thread when the knot is pulled up, which tensions are independently adjustable; to provide a take-up for the sewing thread which is independent of and auxiliary to the main take-up for the purpose of pulling the last loop of the needle thread tight; to provide means whereby the sewing mechanism, winding mechanism, knot tying mechanism, and trimming mechanism may be operated separately and in succession; to provide means preventing the operation of the winding mechanism until the sewing mechanism has finished its allotted work; to provide means preventing the operation of the knot tying mechanism until the winding mechanism has performed its allotted work; to provide means whereby the trimming mechanism is prevented from operation until the knot tying mechanism has performed its appropriate work; to provide a treadle which will control the operations of the button chuck finger, presser plate, needle thread tension, the gripper of the knot tying mechanism, and the trimming mechanism of the winding thread; to provide a treadle which governs the application of power to the machine; to provide means whereby the operation of either of these treadles will prevent the operation of the other treadle; to provide means for throwing the winding and knot tying mechanism out of gear, and for throwing the trimmers for the winding and for the shuttle threads out of gear; and to provide means for releasing the tension of the winding thread when the hook of the knot tying mechanism is pulling the winding thread into the knot tying mechanism.

With these and other objects in view, my invention consists in the construction and combination of parts as hereinafter described and claimed.

Hitherto in all button sewing machines, except as shown in my prior Patent No. 747,048, dated Dec. 15, 1903, the button has been sewn on close to the garment, making it difficult to button the garments, causing undue strain upon the buttons, and wearing out the button holes quickly. These objections have prevented such machines from going into general use, and they are now used only on the thinnest and cheapest kinds of garments. By my invention, however, these objections are all removed, and the buttons can be sewn on garments with great speed, and in a better manner than is now accomplished by hand sewing.

The uses to which my invention can be put are the sewing of buttons on all kinds of clothing, on ladies' cloaks and suits, underclothes, boys' waists, kid gloves, children's leggings, supporters of all sorts, shirts, shoes, and rubber goods, and in fact every case in which buttons are to be sewed onto or fastened to fabrics of any kind.

Figure 2:
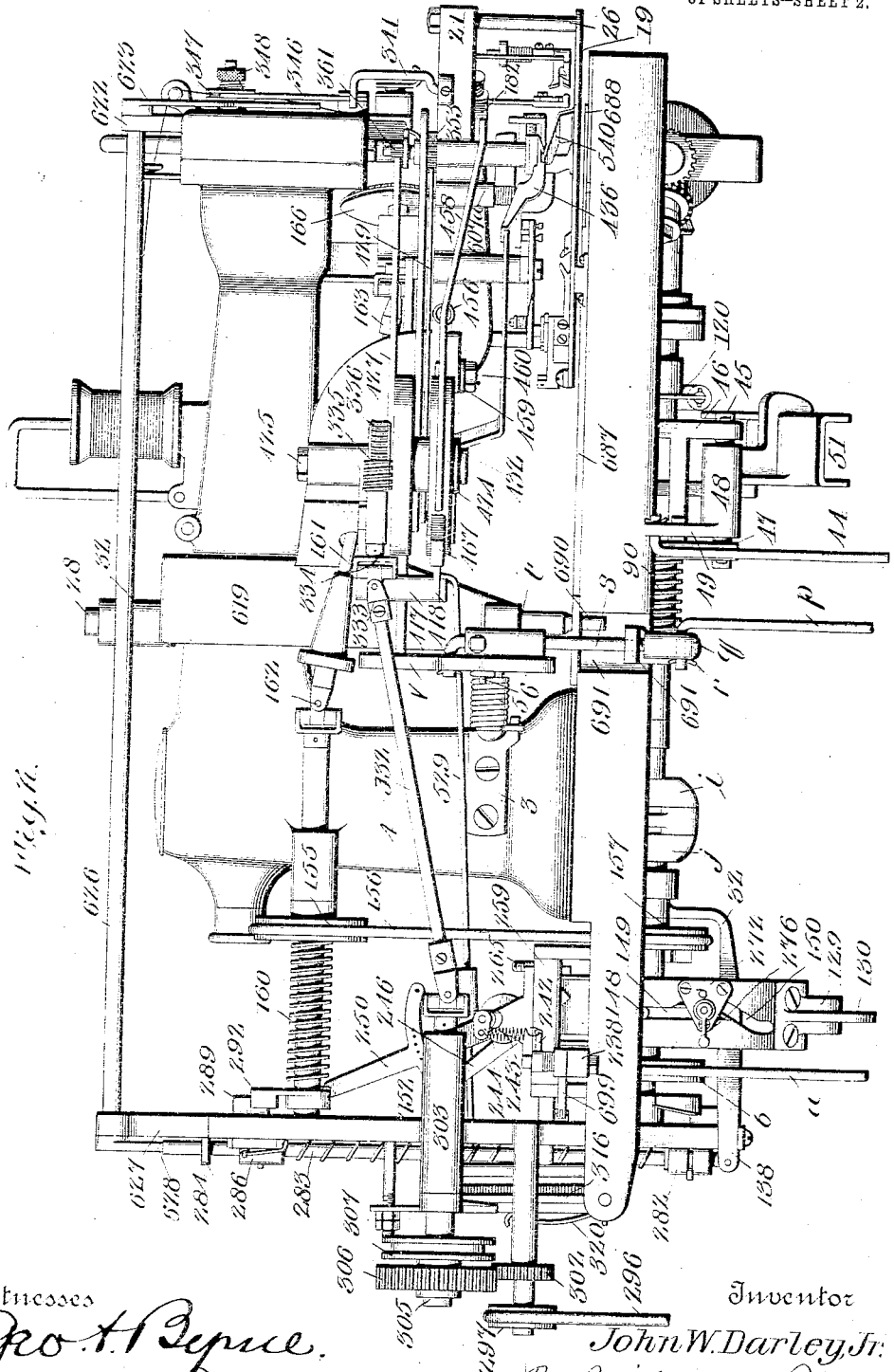
Figure 3:
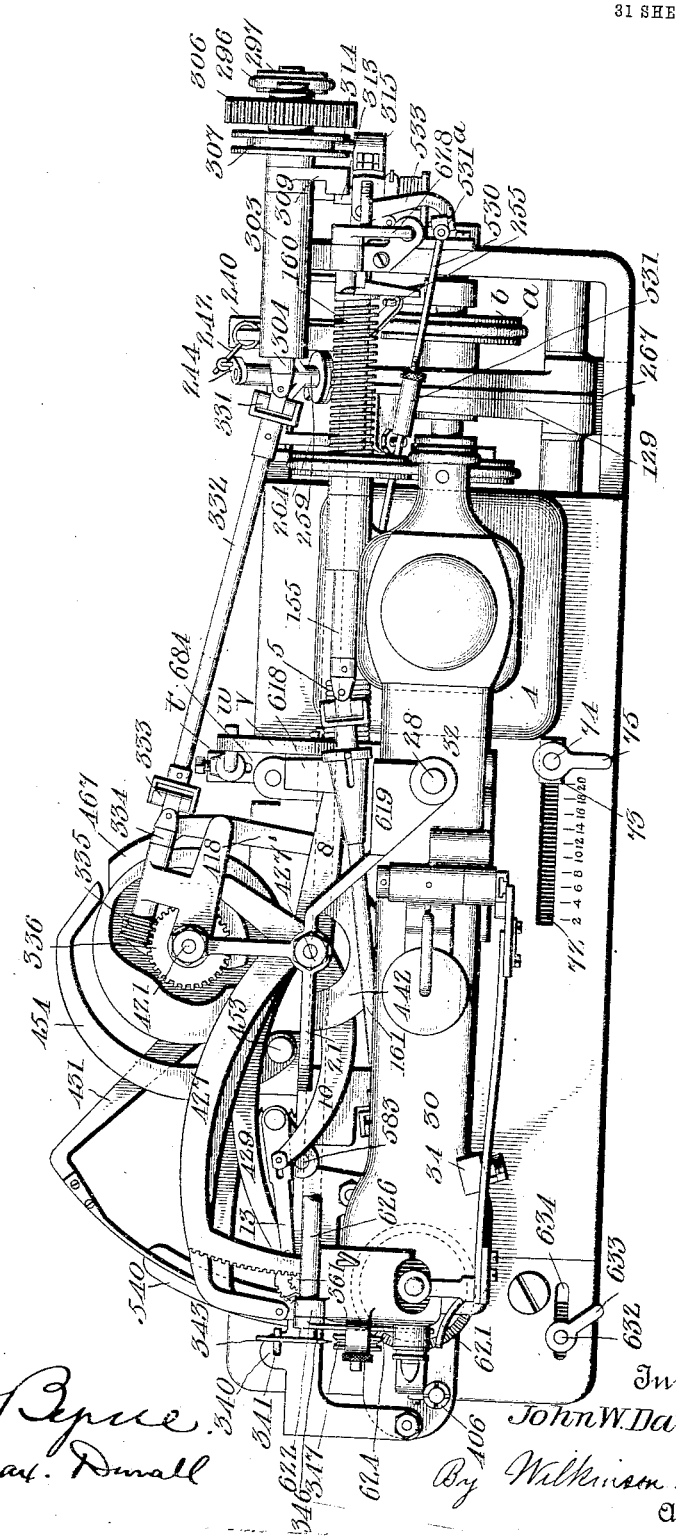
Figure 4:
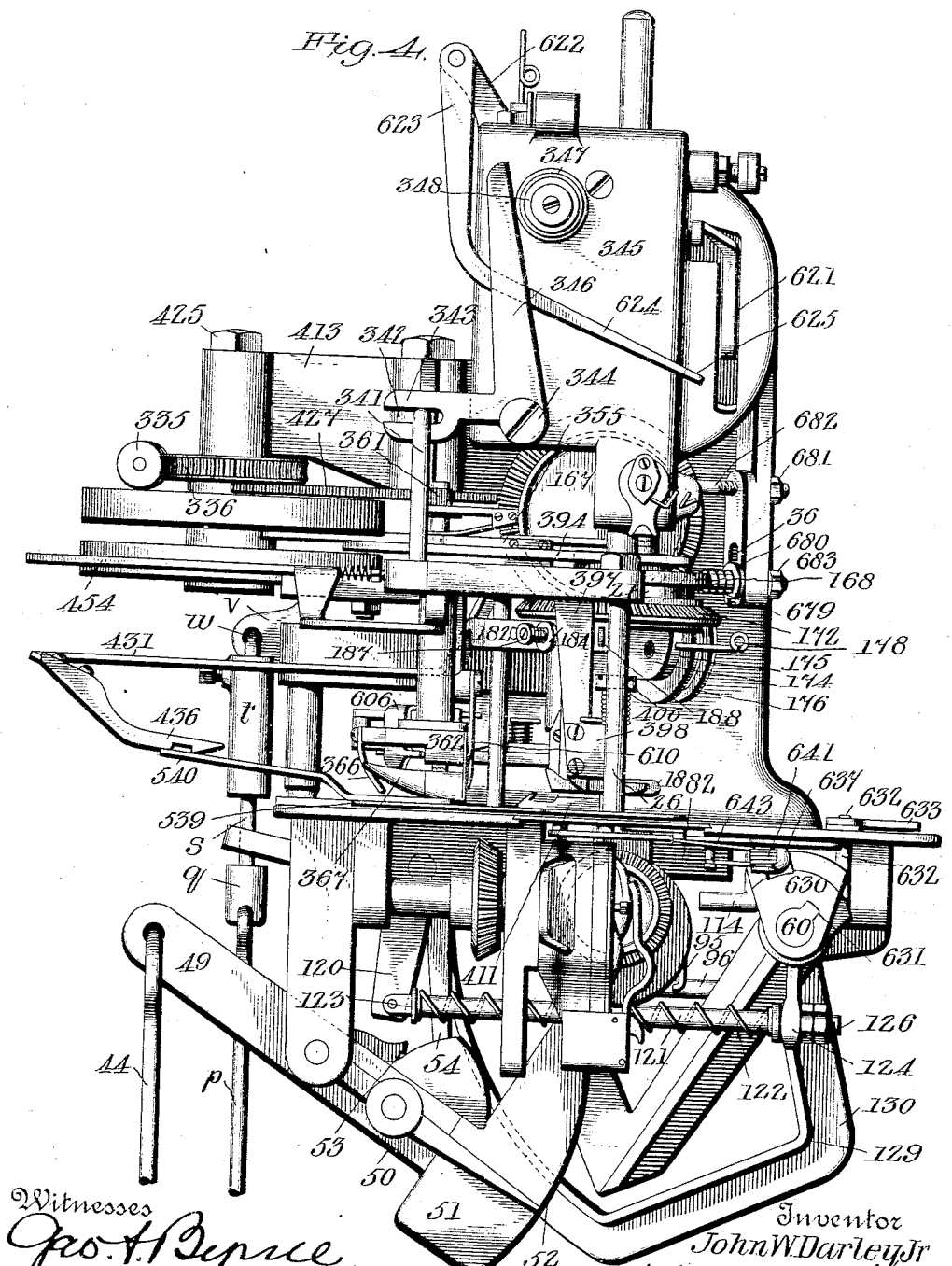
Figure 5:
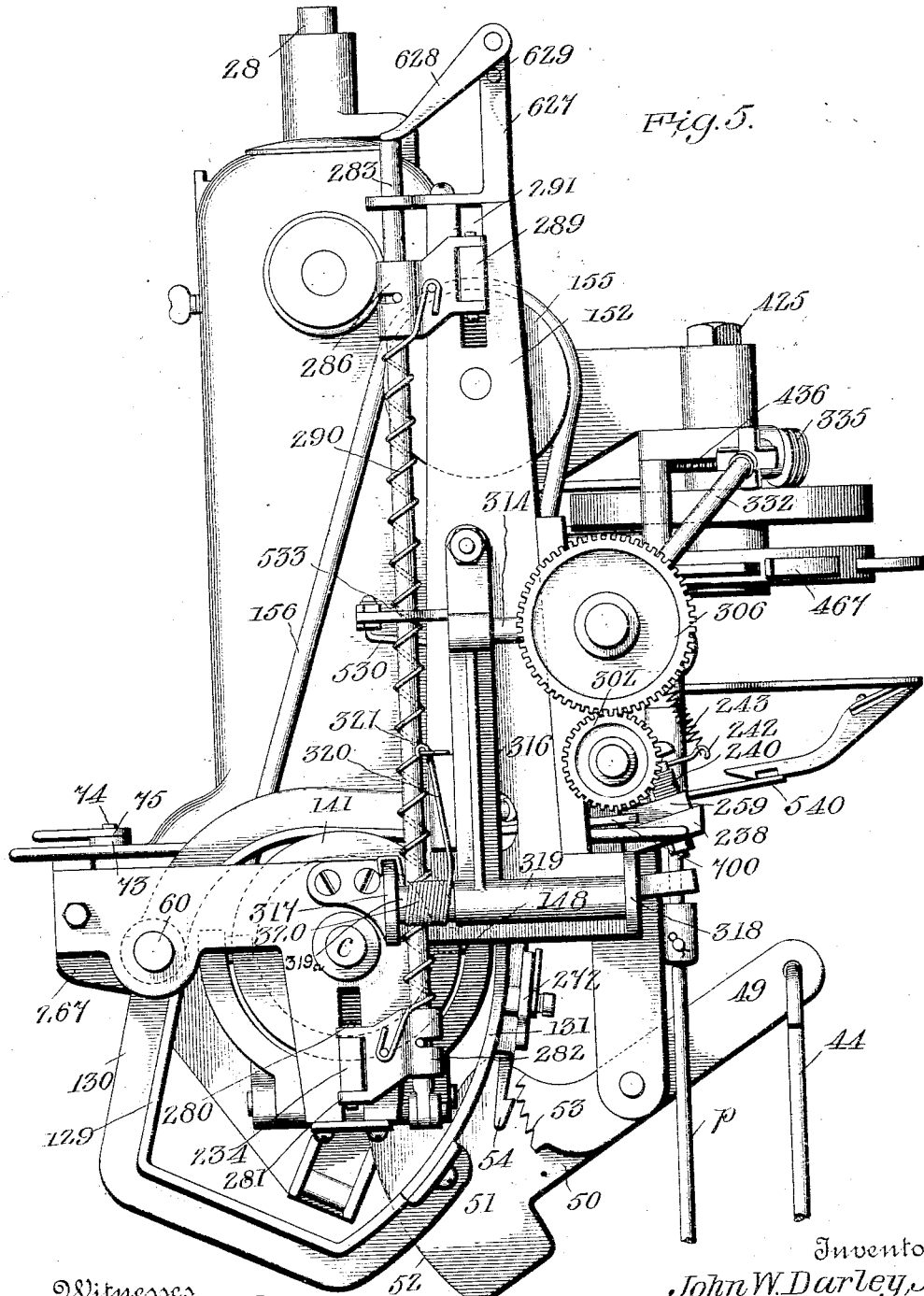
Figure 6:
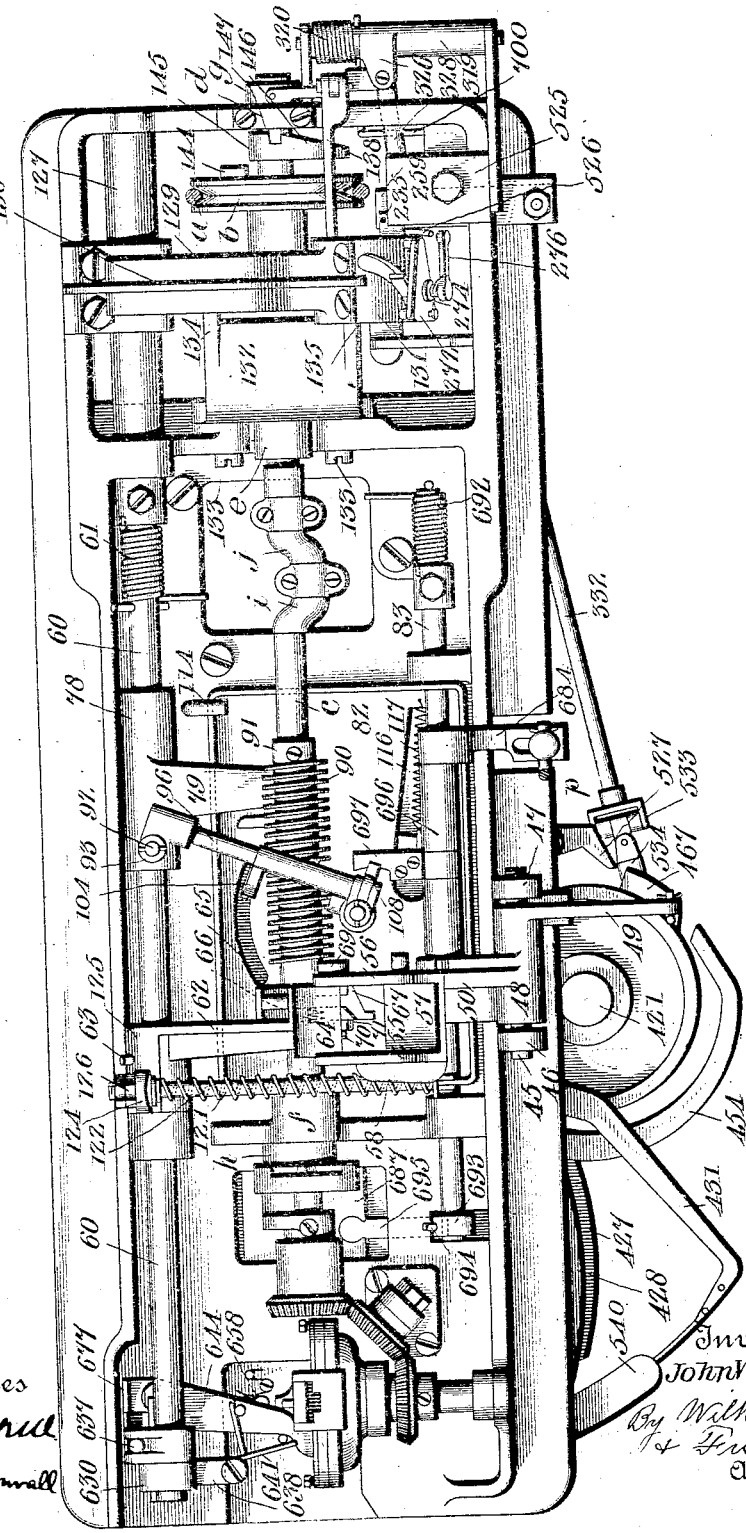
Figure 7:
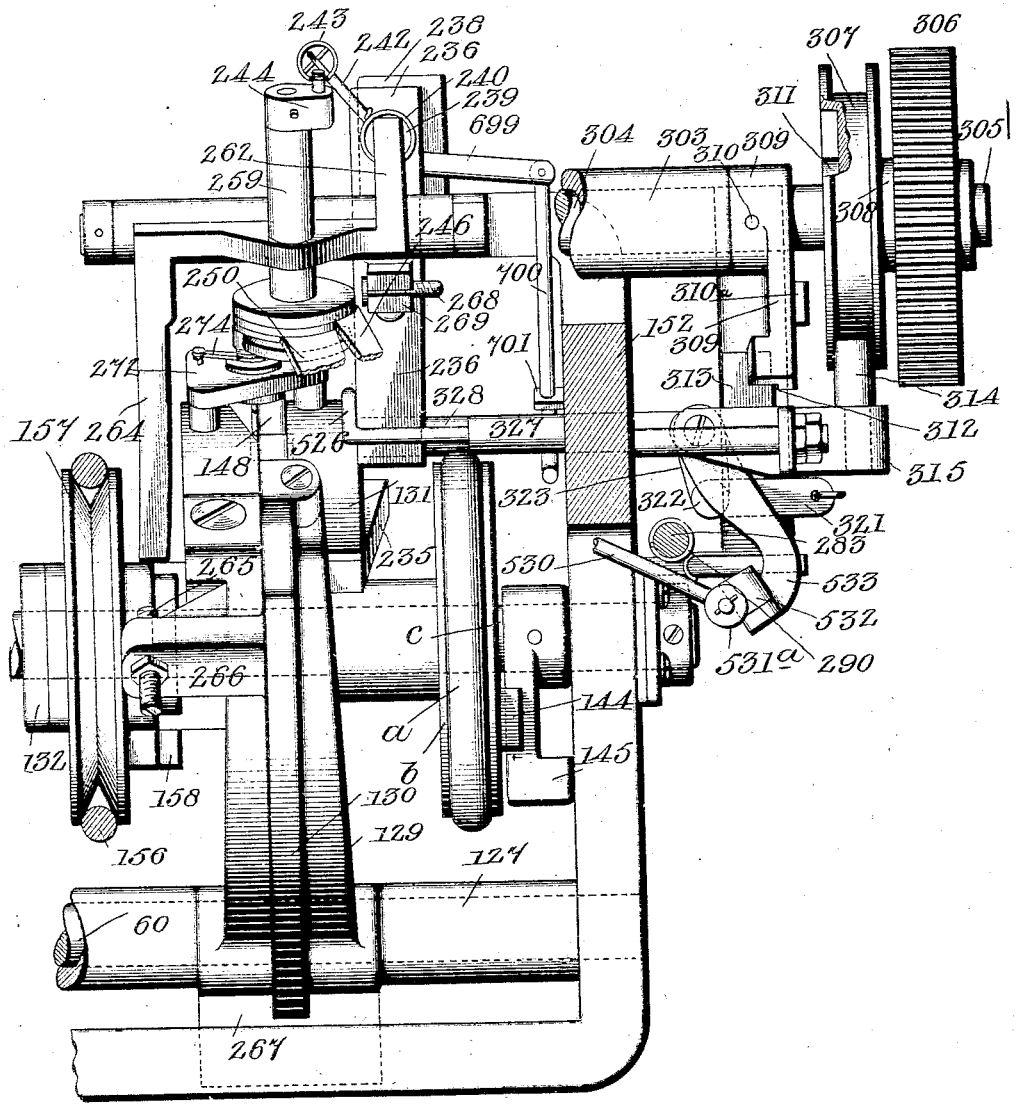
Figure 8:
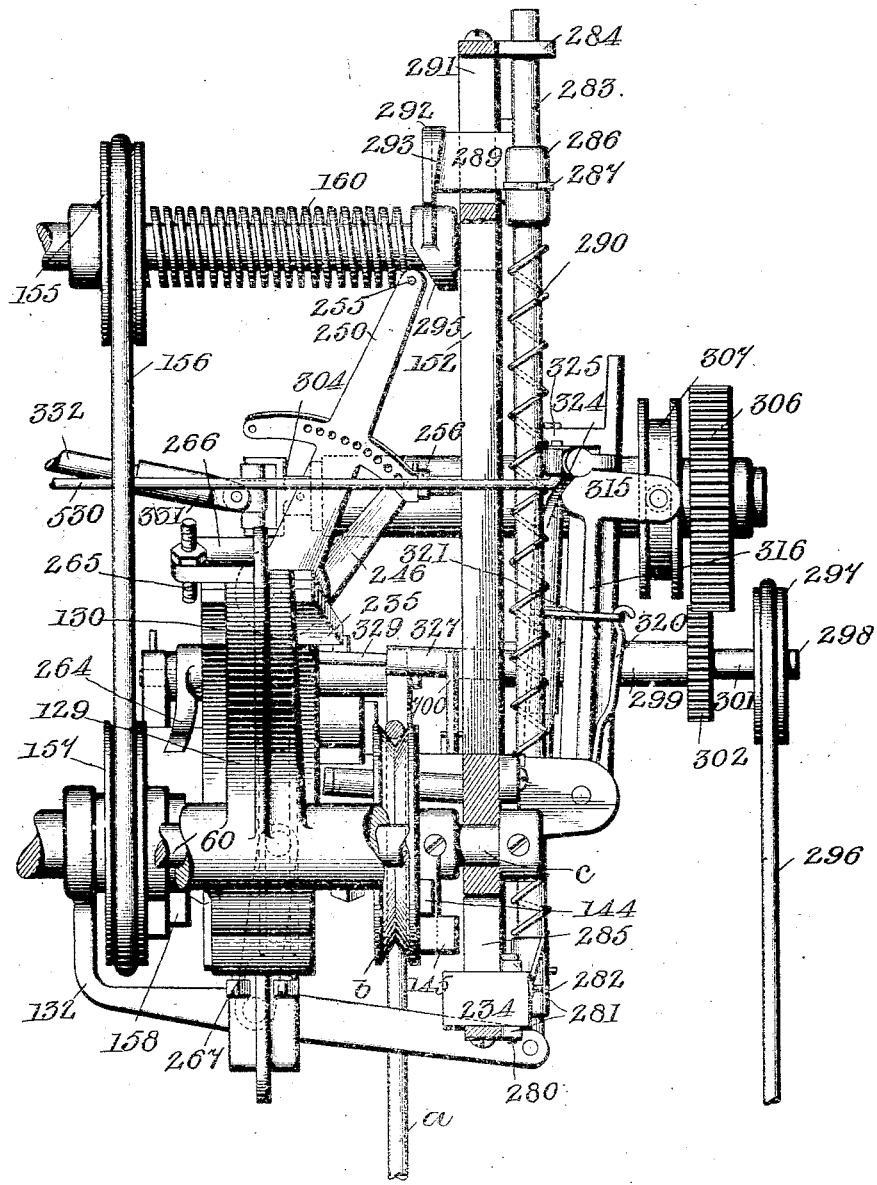
Figure 9:
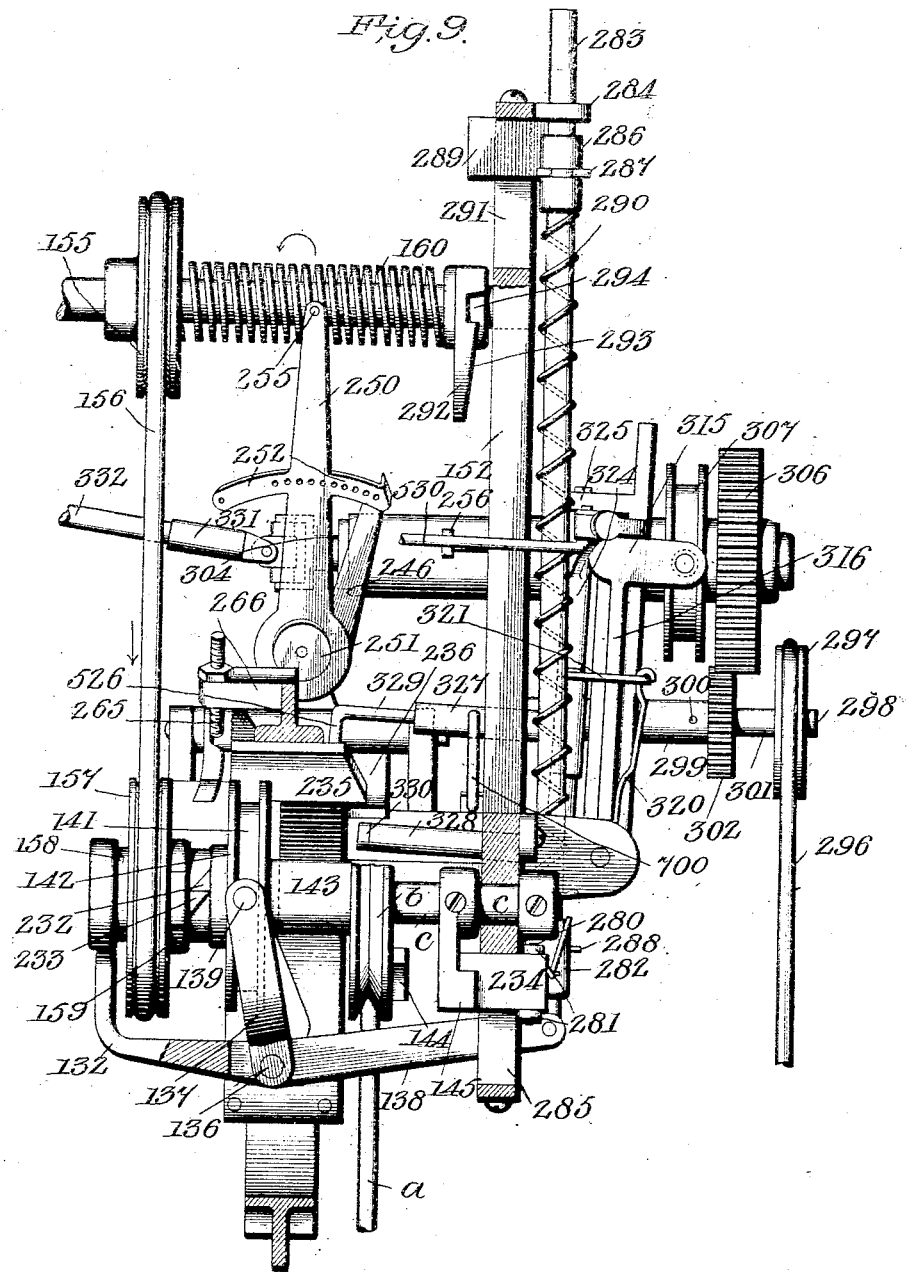
Figure 10:
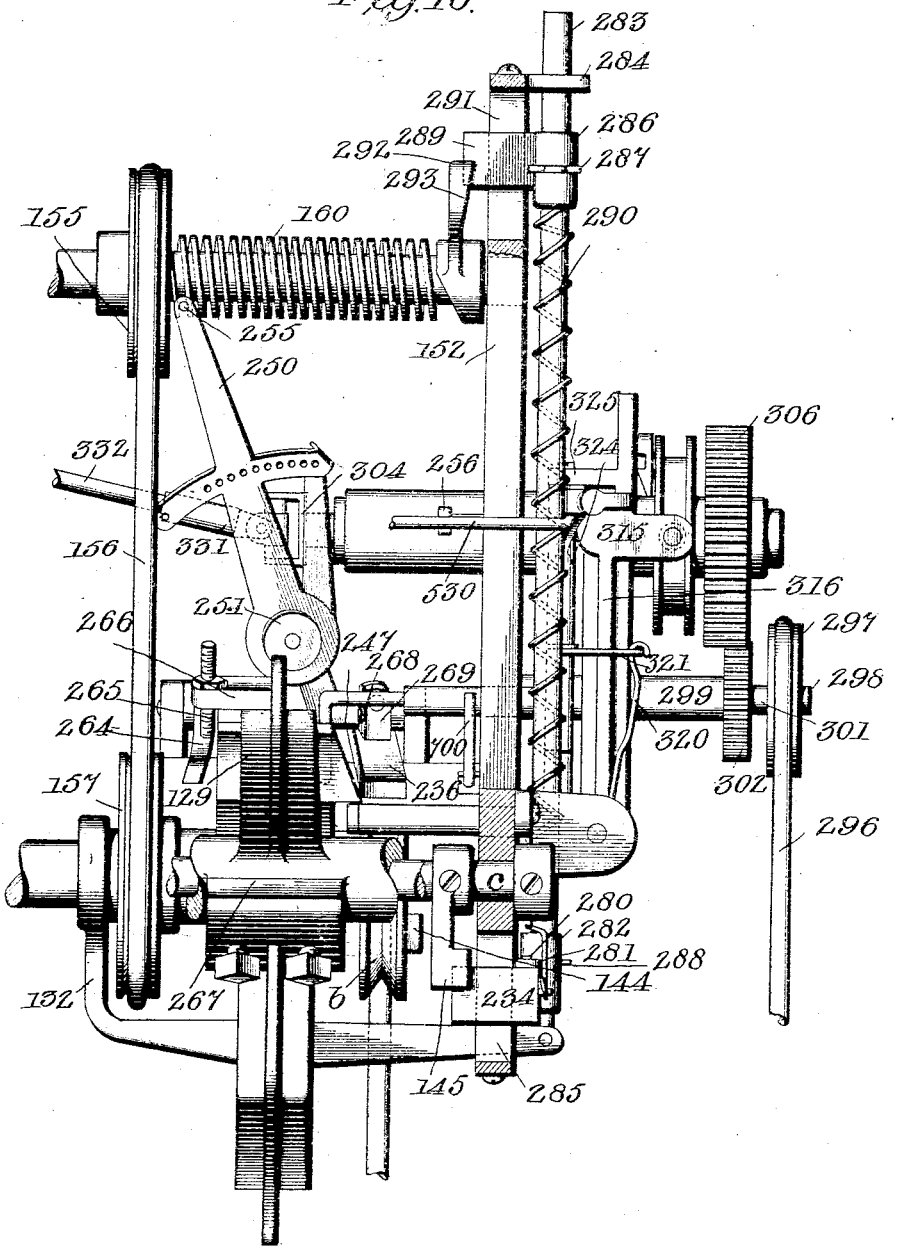
Figure 11:
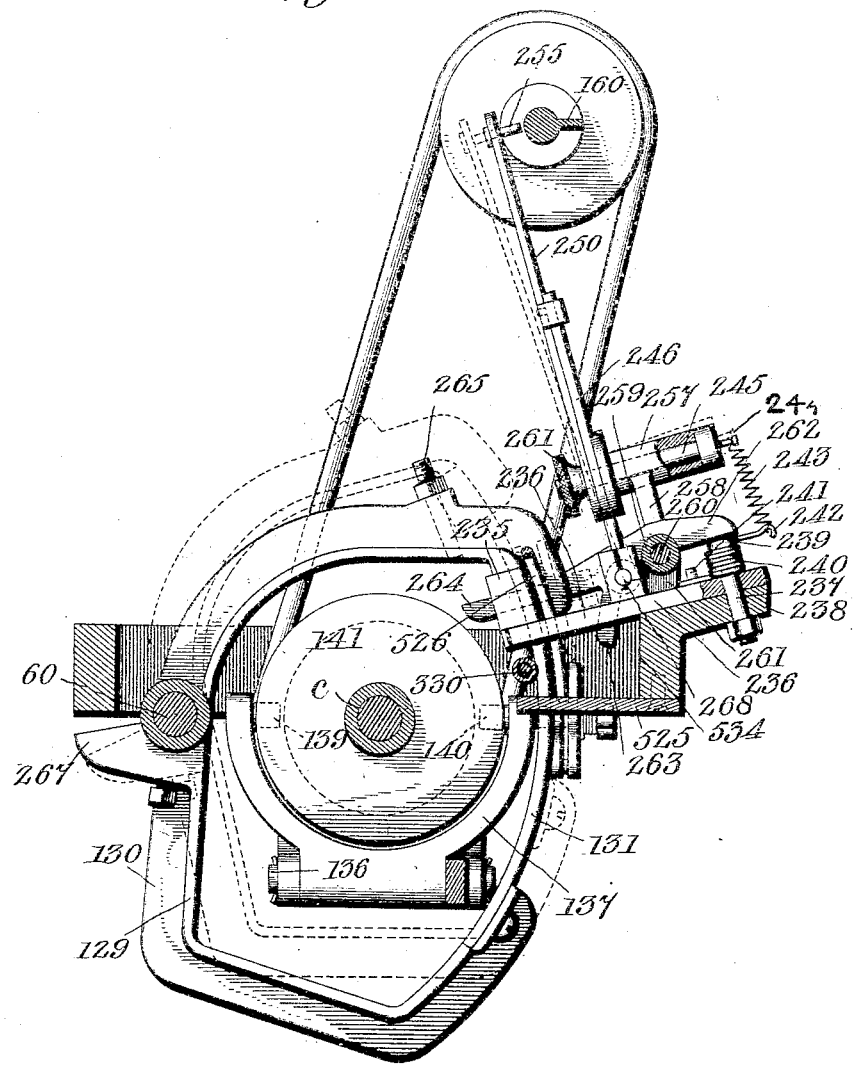
Figure 12:
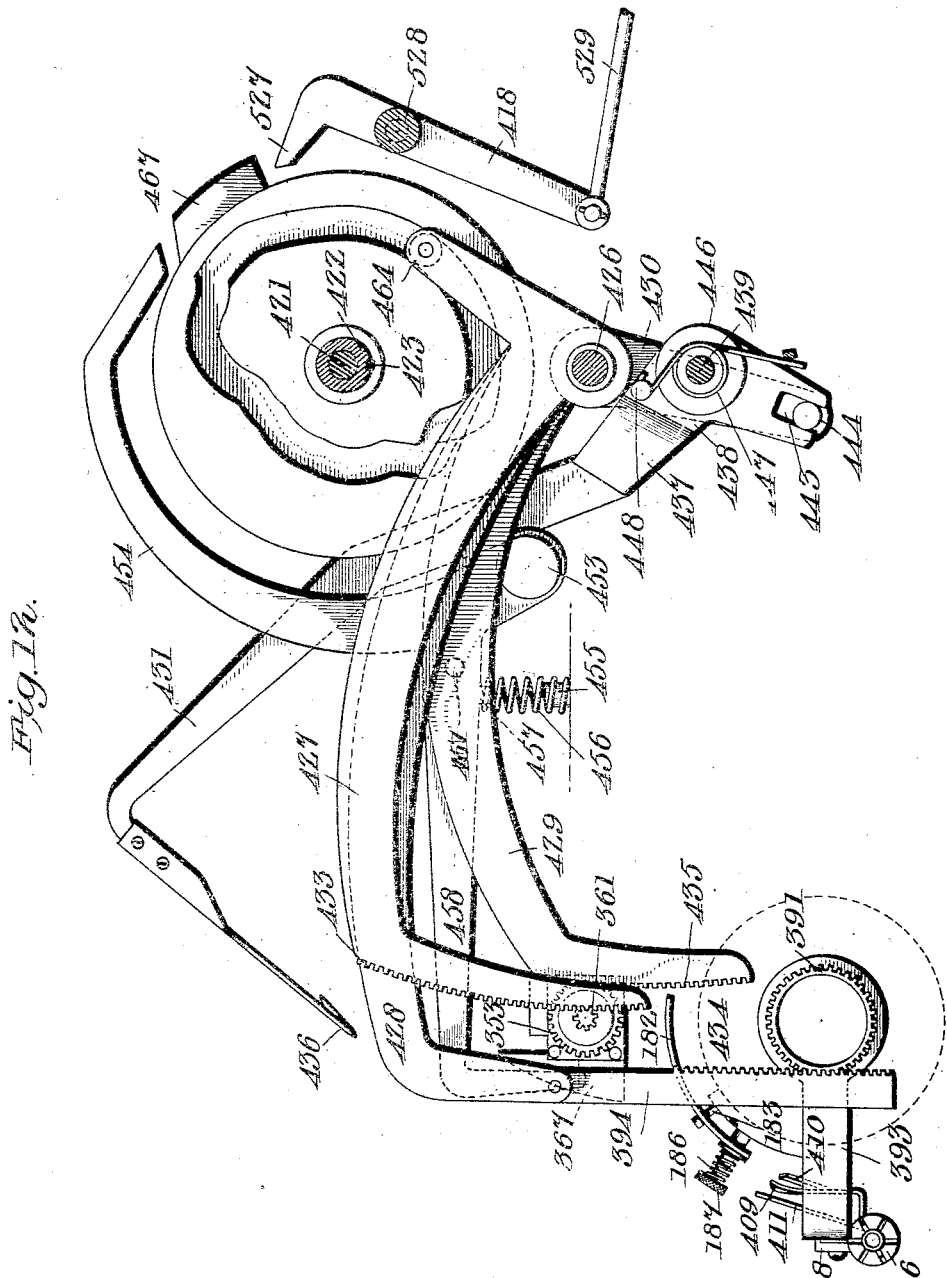
Figure 25:
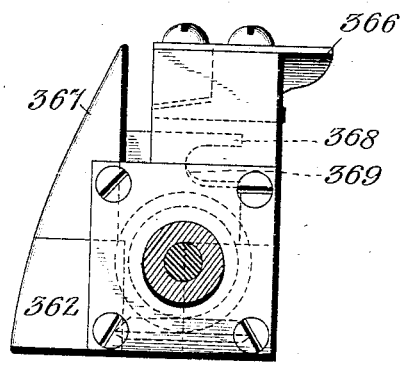
Figure 26:
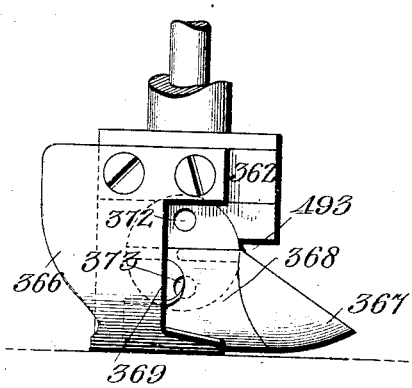
Figure 27:
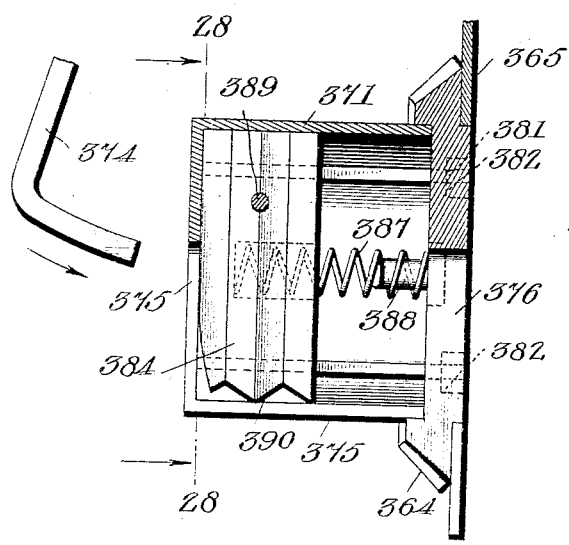
Figure 28:
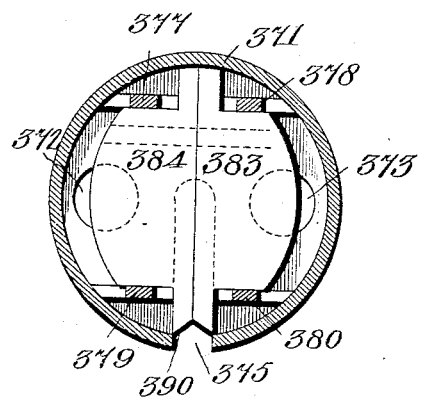
Figure 45:
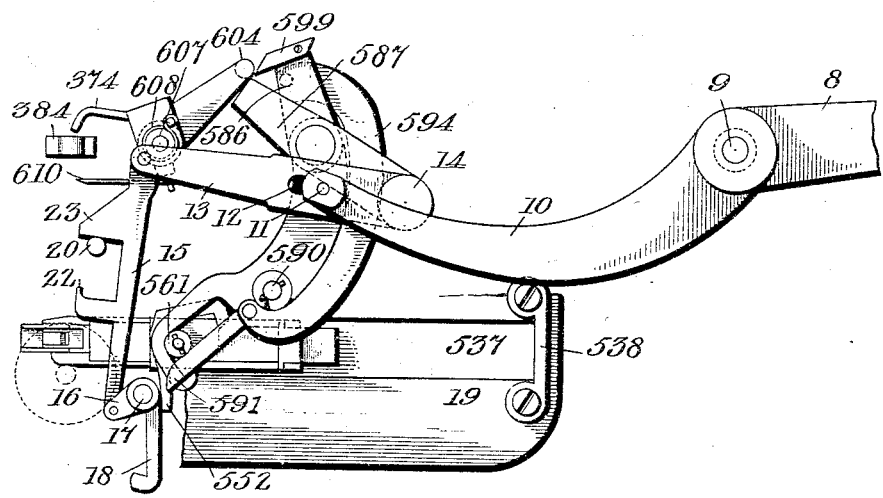
Figure 46:
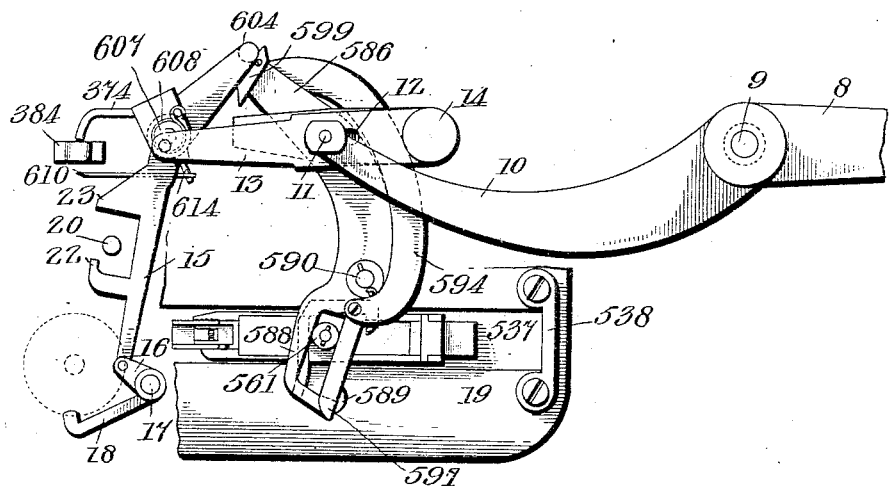
Figure 74:
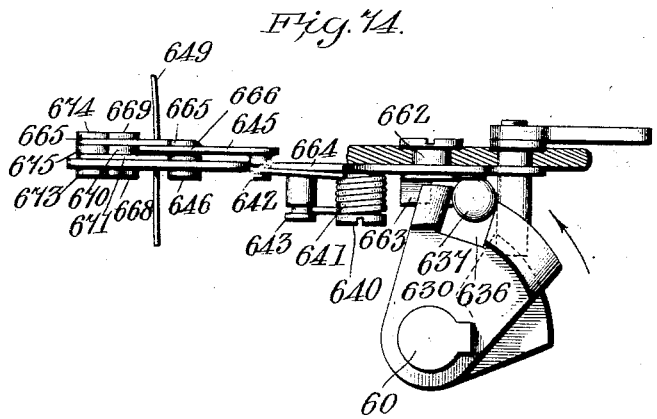
Figure 75:
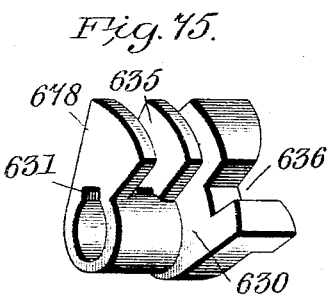
Figure 76:
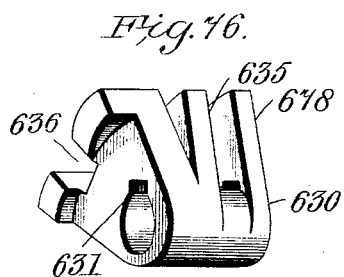
Figure 77:
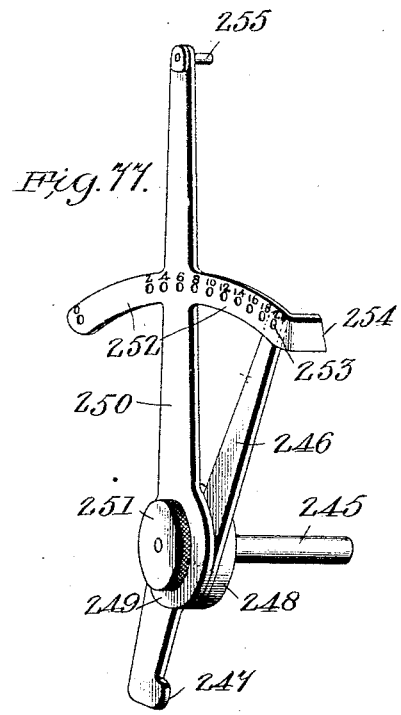

In the accompanying drawings which illustrate one embodiment of my invention Figure 1 represents a front view of the entire machine. Fig. 2 is a rear view of the same. Fig. 3 is a top plan view of the same. Fig. 4 is an end elevation of the needle end of the machine. Fig. 5 is an end elevation of the opposite or power end of the machine. Fig. 6 is a bottom plan view of the same. Fig. 7 is a detailed plan view of the power controlling mechanism. Fig. 8 is a front detailed view of the same, showing the parts in position for sewing. Fig. 9 is a similar view showing the parts while the winding operation is going on. Fig. 10 is a view showing the same during the operation of the knot tying mechanism. Fig. 11 is a cross section showing the C-lever and coöperating parts in the position they assume during the winding operation, the position of the C-lever during the sewing operation being shown in dotted lines. Fig. 12 is a top detail view of the cams of the knot tying mechanism and the parts coöperating therewith, the worm wheel and the driving mechanism of the cams being omitted. Fig. 13 is a bottom plan view of the tilting pan and the parts coöperating therewith. Fig. 14 is a section of the same on the line 14—14 of Fig. 13, looking in the direction of the arrows. Fig. 15 is a cross section showing the starting lever, tilting pan and coöperating parts. Fig. 16 is a rear view of the switch cam attached to the C-lever. Fig. 17 is a front view of the same. Fig. 18 is a cross section of the same taken on the line 18—18 of Fig. 16 and looking in the direction of the arrows. Fig. 19 is a front view of the button chuck, the swinging finger being removed. Fig. 20 is a cross section on the line 20—20 of Fig. 19 and looking in the direction of the arrows, the section being taken simply through the supporting frame, and the other parts being shown in full lines. Fig. 21 is a bottom plan view of the chuck. Fig. 22 is an end elevation of the same looking in the direction of the horizontal arrow in Fig. 19. Fig. 23 is a detail view looking from the top, showing the supporting frame of the chuck, knot tying mechanism, and presser plate. Fig. 24 is a longitudinal section of the same taken on the line 24—24 of Fig. 23, and looking in the direction of the arrows, a number of the parts being omitted. Fig. 25 is a top plan view of the loop forming mechanism, the support and operating shaft of the twister being shown in section. Fig. 26 is a rear view of the same. Fig. 27 is a horizontal section of the twister when in the position shown in Fig. 24, and also showing the gripper operating fingers. Fig. 28 is a cross section on the line 28—28 of Fig. 27 looking in the direction of the arrows. Fig. 29 is a vertical section of the twister taken at right angles to the section shown in Fig. 27, and showing the position assumed when the winding thread is held by the grippers, and also showing the gripper opening fingers. Fig. 30 is a similar section showing the parts in the position assumed when the grippers are held back by the gripper opening fingers. Fig. 31 is an end view of the barrel or case of the twister looking in the direction of the arrow in Fig. 29 and with the gear wheel, grippers, and springs removed. Fig. 32 is a side elevation of the automatic clamp for the winding thread which holds said thread during the pulling of the knot tight. Fig. 32$^a$ is a cross section of the support for said clamp. Fig. 33 is a cross section of the same, taken on the line 33—33 of Fig. 32 and looking in the direction of the arrows. Fig. 34 is a vertical section of the same. Fig. 35 is a side view of the tightener hook and coöperating parts, the bearing for the shaft of the same being shown in section. Fig. 36 is a top plan view of the same partly in section. Fig. 37 is a horizontal section of the same taken on the line 37—37 of Fig. 35 and looking in the direction of the arrows. Fig. 38 is a horizontal section of the tension device for the winding thread. Fig. 39 is a plan view of the swinging finger of the chuck, the means for operating it, the trimmer for the winding thread, the grippers of the twister, the opening fingers therefor, the cutter for the carrying end of the winding thread, and the operating parts therefor, the parts being shown in the initial position. Fig. 40 is a plan view of a portion of the same showing the arrangement of the parts when the trimmer for the winding thread is thrown out of gear. Fig. 41 is a front view of the parts shown in Fig. 39. Fig. 42 is a detail view of the parts operating the gripper opening fingers, looking in the direction of the upper arrow shown in Fig. 39. Fig. 43 is a bottom plan view of the driving lever for the winding thread trimmer. Fig. 44 is a detail view of the parts shown in Fig. 42, looking in the direction of the lower arrow in Fig. 39. Fig. 45 is an enlarged plan view of some of the parts shown on the left of Fig. 39 in the position they assume when the winding thread has just been trimmed. Fig. 46 is a similar view of the same parts showing the position they assume when the winding thread trimmer is returning to the initial position and the grippers open. Fig. 47 is an enlarged plan view of the trimmer for the winding thread, a part being broken away and shown in section. Fig. 48 is a longitudinal section of the same on the line 48—48 of Fig. 47. Fig. 49 is a cross section of the same taken on the line 49—49 of Fig. 47 and looking in the direction of the arrows. Fig. 50 is a cross section of the same taken on the line 50—50 of Fig. 47 and looking in the direction of the arrows. Figs. 51, 52, 53, 54, 55, 56, 57, 58, 59, 60, 61, 62 and 63 are diagrammatic views of the parts used in tying the knots. Figs. 64 and 65 are diagrammatic views of the knots. Fig. 66 is a cross section of the fabric with a button attached thereto by my improved machine, showing the knotted thread and trimmed ends. Figs. 67, 68, 69 and 70 are views of the cams which control the operations of the various parts of the knot tying mechanism. Fig. 71 is a bottom plan view of the trimmer for the shuttle thread, shown in the position it assumes during the operation of the sewing mechanism. Fig. 72 is a similar view showing the parts in the position assumed during the winding operation. Fig. 73 is a similar view of the same parts in the position they assume just before the shuttle thread is severed. Fig. 74 is an end elevation of the parts shown in Fig. 71. Figs. 75 and 76 are perspective views of the casting shown in the top left hand corner of Fig. 71. Fig. 77 is a perspective view of the index of the winding mechanism. Figs. 78 and 79 are a plan and front elevation respectively of the supporting casting for the knot tying, winding, thread trimming, chuck, and operating mechanisms. Fig. 80 is an end elevation of the lever for operating the winding thread trimmer, chuck finger, gripper opener, for lifting the presser plate, and for setting the trigger when a four hole button is to be sewed on. Fig. 81 is a side elevation of the treadles, and Fig. 82 is a plan view thereof.

A constantly running power shaft (not shown) drives a belt $a$, which continuously drives a pulley $b$, loosely mounted on the shaft $c$. This shaft is mounted in bearings, $d$, $e$, $f$, Fig. 6, on the under side of the machine and shoulders $g$, $h$, on either end thereof, prevent it from moving longitudinally. This shaft has two cranked portions $i$, $j$, arranged 90° apart, so that a dead center is always avoided. From these cranked portions run links (not shown) to similar cranked portions on the shaft which drives the needle (not shown). This driving shaft for the needle carries a hand wheel $k$, Fig. 1, used in adjusting the machine before starting.

Before the machine is started, the garment or fabric should be placed beneath the presser plate, the button chuck opened, the button put in position, the button chuck closed, and the presser bar lowered. This is accomplished as follows, see Figs. 1, 2, 4, 5, 80, 81 and 82. The left hand treadle $l$ is moved down carrying with it, by means of the crank $m$, which is fastened to the shaft $n$, to which the treadle $l$ is also fastened, the rod $o$, which is pivoted to the crank $m$. The rod $o$ carries down with it the rod $p$, to which it is adjustably secured by a coupling and set screw (not shown). The downward movement of the rod $p$ causes a downward movement of the rod $s$, Figs. 2 and 80, the rod $p$ being bent and passing through a bearing $q$, screw-threaded on the lower end of the rod $s$, being fastened therein by a pin $r$. The movement of the rod $s$ also sets the trigger for the button shifting mechanism, in case four-hole buttons are used, as will be hereinafter described. The shaft $s$ is bent and passes through a plate lever $v$, being fastened by a pin $w$. To the rod $s$ is adjustably fastened by means of a set screw $u$, Fig. 2, a stop $t$, used in the button shifting operation. The plate lever $v$ has a downwardly extending point $x$ and upwardly extending points $y$ and $z$, separated by slot 1, the upper edge of the point $y$ being curved. The plate lever $v$ is mounted on a stub shaft 2, supported in a bearing 3, which is fastened to the upright part 4 of the goose neck, see Fig. 2. A strong spring 5 is coiled around the hub of the plate lever $v$, the free end thereof passing around a pin 6 carried by the lever plate $v$. This spring tends to hold the related parts in the position shown in Fig. 80. Within the slot 1 works a ball 7, Figs. 39 and 41, which is carried on the end of a horizontal lever 8 which is pivoted on an upright shaft 9, mounted in the frame shown in Figs. 78 and 79. One arm of this lever is straight and the other curved as shown at 10. The curved end 10 carries a pin 11 which projects into a slot 12 in the lever 13, pivoted on the pin 14. The other end of the lever 13 is pivoted to an arm 15 which is pivoted to a crank 16 fastened to the upright shaft 17, which carries the swinging member 18 of the button chuck, the shaft 17 being mounted in bearings in the chuck frame and winding mechanism support. Thus it will be seen that a downward movement of the treadle $l$ will open the button chuck, see Fig. 45, so that a button may be placed therein. When the treadle $l$ is released the spring 5 returns the parts described to their initial position, closing the button chuck.

The movement of the arm 15 in either direction is limited by the pin 20, Figs. 23, and 39, which projects upward from the frame 21, which supports the presser plate and various other parts of the machine, shown detached in Figs. 78 and 79. The arm 15 has two projections 22 and 23 adapted at times to engage the pin 20, the projection 22 being hooked. The downward movement of the treadle *l* also lifts the presser plate 19, so that the garment may be placed underneath. This is done by lifting the plate 21, to which the presser bar is attached by three rods 24, 25 and 26, Fig. 1. The plate 21 is mounted on pins 27 and 28, Fig. 1, carried respectively by the bed plate 29 and horizontal portion 30 of the goose neck. Ears 31 and 32, projecting from the frame 21, engage the pins. The ear 31 is provided with a projection 33 with which the end *x* of the lever *v* engages. The plate 21 is prevented from swinging laterally on the pins 27, 28 by the downwardly projecting brace 34, screwed to the goose neck 30. A bolt 35 passes through a slot 36 in this brace, allowing the frame 21 to move up or down, but aids in preventing lateral motion, except when the button shifting mechanism is operated, as will be hereinafter described. The downward movement of the lever *l* also actuates the trimmer mechanism, as will be hereinafter described. When pressure is removed from the treadle, the spring 5 aided by gravity returns the parts described to their initial position.

After the button has been placed in the button chuck and the fabric beneath the presser plate, the sewing operation commences. The operator removes his foot from the treadle *l*, which is then at once restored to its initial position, and presses down on the treadle 37, Figs. 81 and 82. The treadle 37 has a rearwardly projecting portion 38, bent downwardly and the shaft *n* which carries the treadle *l* has a projection 39, bent upwardly, these projections being so arranged that it is impossible to operate both treadles at once and that when one is pressed down, the other cannot be, thus insuring against mistakes on the part of the operator. These treadles are pivotally mounted in suitable bearings 40, 41, 42, Figs. 81, 82, secured to the floor or to the bottom of a casing in which the machine is mounted. The downward movement of the treadle 37 pulls down the rod 43, attached thereto. The rod 43 pulls down with it the rod 44, which is adjustably attached thereto by a clamp and set screw (not shown). The upper end of the rod 44 is hooked and passes through a hole in the end of one arm of a bell-crank lever, Figs. 2, 4, 5, which is loosely mounted on a shaft 45 which is carried by ears 46, 47, Figs. 2, 6, extending downwardly from the bed plate of the machine, near one side thereof. This bell crank lever is composed of a long central portion 48, through which the shaft 45 passes, an outwardly projecting arm 49, to which the rod 44 is attached and an inwardly projecting arm 50, nearly parallel to but not in the same plane with the arm 49. The arm 50 terminates in an enlarged head 51 curved as shown at 52 and coming to a point, Figs. 4, 5. The arm 50 is provided with ratchet teeth 53 with which a spring pressed pawl 54 is adapted to engage, the teeth and pawl constituting a full stroke device, and preventing the return movement of the treadle 37, after it has once been started in its movement, until the sewing, winding and knot tying operations have been finished, when the pawl will be disengaged from the teeth, as hereinafter described. After the sewing operation has once been started, the operation of the sewing mechanism, winding mechanism and knot-tying mechanism are entirely automatic and beyond the control of the operator and depend wholly on the adjustments of the machine at the start.

The head 52 of the arm 50 is composed of two parallel portions 55, 56 united by a flat portion 57, Fig. 6, forming quite a large trough. On one side of the part 55 is a projection 58, for the purpose of strengthening the same. As the arm 49 is moved down by the treadle, the arm 50 is moved up, till the pawl 54 engages the teeth 53, the pawl being urged against teeth by the action of the spring 59, shown in dotted lines in Fig. 15. As the arm 50 is thrown upward, it causes a partial rotation of the shaft 60, Fig. 6, against the tension of the spring 61, wound around said shaft, by the following means: Within the trough formed between the parts 55, 56, is engaged the end of an arm 62, firmly attached to the shaft 60 by means of a pin 63 or by any other suitable means, Figs. 6, 15. The end of the arm 62 is enlarged, as shown at 64, so as to nearly fill said trough. In this end 64 is journaled a pawl 65 nearly at right angles to the arm 62 and a spring 66, shown in dotted lines on Fig. 6, normally presses the pawl to the right. The pawl has a projection 67 adapted to be struck, when the treadle 37 is operated, by the pin 68, Fig. 1, which is carried by a boss 69 on the part 56 of the lever arm 50. The movement of the pawl 65 causes the movement of the arm 62 and therefore a partial rotation of the shaft 60. The pawl 65 at its rear end is provided with an adjusting screw 70, Figs. 6, 13, held in place by a nut 71. This adjustment is for the purpose of stopping the sewing at exactly the proper instant.

The sewing index mechanism, or mechanism for exactly regulating the number of stitches passed through the holes in the button, will next be described. The bed plate has a slot 72 near its front edge and parallel thereto, Fig. 3, the edge of which is divided off, as shown, to form an index or graduated scale, whereby any number of stitches from 2 to 20 may be caused to pass through the button. Extending over this slot 72 is an index plate 73 provided with projections on the sides thereof, so that it will be supported on the edges surrounding the slot 72. A bolt 74 passes through the plate 73, and an adjusting handle 75 engages the screw threaded top of said bolt. When the handle is loosened the plate 73 may be adjusted back and forth, as desired, thereby regulating the number of stitches. The bolt 74 is carried on the top of an upright arm 77, Fig. 14, and a guiding washer 76 is placed on a shoulder on the arm 77 and rests against the bottom of the bed plate. The upright arm 77 is supported near the center of a sleeve 78, which is loosely mounted on the shaft 60 so as to slide freely thereon. The washers or plates 73 and 76 have rectangular reduced portions fitting within the slot 72 and preventing the arm 77 from twisting. Carried by the sleeve 78 is a projecting arm 79 preferably made integral therewith and extending from said sleeve 78 nearly at right angles. The arm 79 is provided with a projection 80, shown in dotted lines in Fig. 13, which passes into a slot 81 in the tilting index pan 82. This index pan is provided with downwardly projecting sides journaled on the shaft 83, which is located in bearings on the under side of the bed plate on the back thereof and parallel to the shafts 60 and c. Through the slot 81, passes the index pin 84. This pin is surrounded by a washer 85 just large enough to fit within the slot 81, but a little thicker than the pan 82. Above the washer 85 fits the end of a curved lever 86 on an extension of the washer 85, and a nut 87 screwed onto the end of the pin 84 keeps the lever 86 in engagement with said extension. On the under side of said pan the pin 84 passes through the junction of a three-armed slide 88. A nut 89 screwed up against a shoulder on the pin 84 keeps the lever 88 or slide in its proper place upon the pin 84. The three armed lever 88 has at the junction of its central portion with the arm 112, a washer 115ᵃ, the washer 115ᵃ also slides loosely in the slot 81, and a pin 115ᵇ provided with an enlarged head 115ᶜ passes through said washer and is riveted in the slide 88, the construction of these parts being such that while they are firmly held together they will all slide easily along the index pan guided by the slot 81. The index pin engages with a screw thread 90 carried by a sleeve 91 screwed or otherwise fastened to the shaft c, Fig. 6. By tilting the index pan so as to bring the pin 84 out of engagement with the screw 90 loosening the handle 75, the index pin may be adjusted along the screw 90 so as to sew any number of stitches from two to twenty, or more, if the slot 72 were made longer.

Extending downwardly from the sleeve 78 is a pin 92, Figs. 13, 14, which is firmly fixed to the said sleeve. On the pin 92 is loosely mounted a sleeve 93, a pin 94 preventing the sleeve from dropping off the pin 92. The sleeve 93 has secured upon it or made integral therewith at right angles thereto, another sleeve 95 within which loosely works a rod 96. The other or inner end of said rod is secured as follows: Secured into the bottom of the bed plate is a rod 97 which passes through a slot 98 in the index pan, this slot being considerably larger than the pin 97. On the pin 97 is loosely mounted a sleeve 99, and a pin 100 preventing the sleeve from dropping off said pin. This sleeve 99 is provided with two projecting ears 101 and 102, which are perforated for the passage therethrough of the rod 96, which is freely movable therein. A sleeve 103 is firmly fixed to this rod, and is provided with a projection 104 to which a stout wire 105 is firmly attached, which wire passes through a curved slot 106 in the index pan 82. At the other or rear end of the sleeve 103, said sleeve is provided with a projection 107 which fits down over the ear 101. A lever arm 108 is attached to the rod 96 and located between the ears 101 and 102. This lever arm is screwed or otherwise fastened to the projection 107 on the sleeve 103. The sleeve 103 is also provided with a curved projection 109 adapted to contact in certain positions with a pin 110 carried by the sleeve 99. A spring 111, shown in dotted lines in Fig. 13, normally keeps said projection in contact with said pin, which limits in one direction the movement of the rod 96, the sleeve 103, the wire 105, and the lever arm 108. The function of the wire 105 and the lever 108 will be more fully described in connection with the button shifting mechanism. As the shaft c is rotated the screw 90 drives the index pin 84 to the left, the slot 81 in the index pan guiding said pin. When the required number of stitches has been made, the arm 112 of the three-armed slide 88 strikes the bolt 70 in the pawl 65, moves said pawl against the tension of the spring 66, disengages said pawl from the pin 68, whereupon the spring 61 rotates the shaft 60 toward its original position into the position for bringing the winding mechanism into operation.

The index pin 84 is brought into engagement with, and set free from the driving screw 90, by means of the tilting index pan 82 mounted on the shaft 83, as already described. Bent pins 113 and 114 projecting downward from the bed plate limit the downward motion of said tilting pan, as shown in Fig. 14. This pan is provided with slots 81, 98, and 106, the use of which has already been described. It is also provided with a large slot 115 to afford clearance space for the upward movement of the end of the arm 50, and for the end of the arm 62. It also affords a space for the working of the pawl 65. Said pan is also provided with a slot 116 to afford space for the operation of the spring 117, one end of which is fastened to said pan, and the other end of which is fastened to a link 118 on the lever 86. This lever 86 operates to return the three-armed slide 88 and the index pin 84 to the initial position ready for sewing on another button. The lever 86 is provided with a slot 119 so that the three-armed slide 88 may be moved in a straight line under the influence of the spring 117. The spring 117, however, can not draw the slide 88 back as long as the tilting pan is in the position shown in Fig. 14, and means are provided whereby this slide can not be drawn back until the sewing, winding and knot-tying operations have been completed.

When the required number of stitches have been made the power is shifted from the sewing mechanism to the winding mechanism by means of the C-lever, which will hereinafter be described, the sewing mechanism being locked against operation, and the winding mechanism being unlocked for operation simultaneously. When the pawl 65 is moved aside by the slide 88, the spring 61 partially rotates the shaft 60 toward its original position. It can not return it wholly, however, because the C-lever is locked in the winding position, and the tilting pan 82 is held down against the pins 113 and 114 by the following means. The tilting pan 82 has on one corner a downwardly projecting ear 120, Fig. 15, to which is pivotally mounted one end of a rod 121, which is surrounded by a spring 122, which bears against a washer 123 at one end, and against a perforated lug 124 through which the rod 121 passes, this lug being preferably made integral with the sleeve 125 which carries the arm 62, said sleeve being mounted on the shaft 60, Fig. 6. Nuts 126 are provided on the end of this bolt 121 against which the lug 124 strikes when the parts are thrown into their original position ready for starting the sewing operation again.

The bed plate of the machine is longer than the usual bed plate of a sewing machine, and the right hand end, as shown in Fig. 6, is an open framework fitted with bosses which serve as bearings for the shafts c and 60. On the shaft 60 is journaled a long sleeve 127, said sleeve being long enough to just fill in the open space in the framework. This sleeve is fastened to the shaft 60 by bolts, or in any other suitable manner. To this sleeve 127, and preferably made integral therewith, is a C-lever 129, preferably provided with a central rib 130 for strength. This lever is shown in Figs. 1, 4, 5 and 6–11, and is fastened to the shaft 60 and encircles the shaft c. Joining the ends of the lever is the switch cam 131, see Figs. 5, 11, 16 and 17. Attached to the underside of the bed plate by screws 133 and encircling the shaft c, which passes through a perforation therein, is a wide right angled support 132, see Figs. 1, 2, 6 and 9. The right hand end of this support is cut away leaving two ears 134 and 135, in which is pivoted a long pin 136, Figs. 9 and 11 on which is mounted a yoke 137 provided with a bell crank extension 138 made integral therewith. This yoke carries pins 139 and 140, Figs. 9 and 11, which loosely engage on opposite sides of a groove 141 in a pulley 142, which is connected by a long sleeve 143 with the driving pulley $b$. It is evident that the shifting of the pulley 142 by the yoke will also shift the pulley $b$. The pulley $b$ carries a projection 144, which is adapted to engage when the pulley is shifted to the right with a sector shaped clamp 145, which is keyed or otherwise fastened to the shaft c. This clamp is beveled off, as shown at 146, in Fig. 6, and is provided with a groove 147 the purpose of which will be hereinafter described. When the treadle 37 is pressed down to cause the pin 84 to engage the screw 90, the same movement causes a partial rotation of the shaft 60, as already described, and this shaft carries with it the C-lever 129, and by means of the switch cam 131 shifts the pulleys 142 and $b$, so that the projection 144 on the latter will engage the clamp 145 and cause the shaft c to rotate by the rotation of the pulley $b$. This rotation continues until the required number of stitches has been passed through the button, when it automatically ceases. This shifting of the pulleys 142 and $b$ is caused by the motion of the C-lever through the following instrumentalities. The pin 140 carried by the yoke 137 is elongated toward the rear of the machine, as shown at 148, the elongated end engaging in a groove in the switch cam 131. This groove, as shown in Figs. 16 and 17, is composed of a straight part 149 and inclined parts 150 and 151, these two parts being separated by the pivoted switch, the purpose of which will be hereinafter more fully described.

When the sewing mechanism is out of operation—in other words, when the C-lever is down, as shown in Fig. 5—the pin 148 occupies the dotted position shown in the top of Fig. 16. When the treadle 37 is pushed down, which operation raises the C-lever into the position shown in dotted lines in Fig. 11, this motion lifts the switch cam 131, and, by reason of the inclined slot 150, causes the yoke 137 to be shifted to the right in Fig. 8, bringing the projection 144 on the pulley $b$ in contact with the clamp 145, whereby the rotation of the pulley $b$ causes the rotation of the shaft $c$, which condition continues until the arm 112 strikes the screw 70 in the pawl 65, Fig. 13, when, as already described, the pawl 65 is disengaged from the pin 68, the shaft 60 released, and the spring 61 partially revolves said shaft and brings the C-lever 129 to the position shown in full lines in Fig. 11, whereby the switch cam 131 swings the yoke 137 to the left, back beyond its original position, disengaging the pulley $b$ from the clamp 145 whereupon the motion of the shaft $c$ is stopped as hereinafter described. Moreover, the shaft $c$ cannot again be started to rotate until the winding and knot-tying mechanisms have finished their operations.

The winding mechanism will next be described, reference being had especially to Figs. 1, 2, 8, 9, 10 and 11. Connected to the right hand end of the bed plate near the rear thereof is an upright standard or brace 152. A rod is preferably connected near the top of this standard to the goose neck for the purpose of strengthening the same. This rod, however, has been omitted from the drawings. Journaled in the standard 152 and in a bearing 153 attached to the goose neck is the driving shaft 154 of the winding mechanism. This shaft has on it a pulley 155 which, by means of a cord or belt 156 is connected with a pulley 157, Fig. 9, which is loosely mounted on a bearing 158 projecting from the right angled piece 132. The hub 159 of the pulley 157 is wider than the pulley itself, and preferably made integral therewith. On the shaft 155 is an index screw 160 for governing the number of turns of the thread that will be twisted around the neck of thread connecting the button and the fabric. The shaft 154 is connected with the shaft 161, Fig. 2, by a universal joint 162, and a second universal joint 163 connects the shaft 161 with a bevel gear wheel, which drives the winding mechanism, Fig. 1. The plate 21 is provided with a horizontal projection 164, Fig. 78, which is bent upward at right angles, as shown at 165. Through this upward portion runs a shaft 166, Fig. 1, carrying a bevel gear wheel 167. The plate 21 is also provided with an extension 168 provided with a large circular perforation 169 through which the needle carrying bar operates. To the under part of this extension is fastened a section of a ring forming a distance piece 170, Figs. 23, 24. Underneath the distance piece is an annular disk 171, which forms a top bearing for the horizontal bevel gear wheel 172, which meshes with the vertical bevel gear wheel 167. The gear wheel 172 is annular and is supported on a shoulder on the ring 173, the parts 168, 170, 171, and 173, being firmly secured together by screws, or in any other convenient manner. Through the parts just mentioned passes the shaft 17 carrying the swinging jaw 18 of the button chuck. Extending downwardly from the horizontal annular bevel gear 172 is an extension 174, Fig. 4, in which is mounted a shaft 175, which carries the winding bobbin 176. The weight of the downward extension 174 and the bobbin carried thereby is regulated so as to approximately balance the tension and thread guides on the opposite side of the annular gear wheel 172. The shaft 175, which carries the winding bobbin is made hollow, and in it is mounted a short metallic cylinder closely fitting the interior of said shaft, which metallic cylinder is reduced in thickness toward the end, forming a spring, and terminates in a hook 177, Fig. 23, to hold the bobbin on the shaft against centrifugal force, but permitting of its ready removal when the spring is pressed back. The downward extension 174 also carries a wire 178 twisted at the end to form a guide for the winding thread.

Nearly opposite the winding bobbin and approximately the same in weight as the bobbin and its support on the annular gear wheel 172 are located the cutter for the sewing cotton, upper thread guide, tension, thread guide for the winding thread, and also an automatic clamp for use during the operation of tying the knot in the winding thread. To the lower rim of the annular gear wheel 172 is attached a downwardly extending lug 179, Figs. 1, 38. A bolt 180 is screwed into the lug 179 passing through the upper rear corner of the piece 181, which carries the automatic clamp, as well as the lower thread guide and knife for severing the sewing thread. This bolt is shouldered as shown in Fig. 38, and on the outer shoulder is mounted a curved lever 182, which forms one member of the tension for the winding thread. A screw 183 passes loosely through a slot in the lever 182 and is secured in the lug 179. The body of this screw prevents lateral displacement of the lever 182, and the head of the screw prevents the lever from being thrown out by centrifugal force. On the bolt 180 is mounted a cylinder 184 enlarged at the end, as shown at 185, to form a washer against which the spring 186 bears, which spring is confined by a nut 187 screwed on the outer screw-threaded end of the bolt 180. Through a perforation in the upper right hand corner of the piece 181 passes a short slotted arm 188 serving as a thread guide, Figs. 1 and 23, this piece being screwed into the lug 179. Referring to Figs. 32, 33, 34, the piece 181 also carries the automatic clamp for the winding thread, which is used during the knot tying operation. Near the lower end of the piece 181 and preferably made integral therewith is a horizontal piece 189 provided with a hole 190 acting as a thread guide, and also provided with a slot 191, in which is pivoted one member 192 of the automatic clamp. The jaw 192 is provided with teeth 193 on its upper edge and a slot 194 within which loosely plays a roughened pin 195 fixed to the other movable jaw 196, which is also provided with teeth 197 oppositely arranged in relation to the teeth 193. A spring 198 passes over a pin 199 attached to the piece 181, and is coiled around the body of the screw 200, which screws into the piece 181 and serves as a bearing for the jaw 196, the spring being disposed in a slot in the jaw 196, and the end bearing against said jaw tending to hold the said jaws apart with a slight pressure. The function of this automatic clamp will be fully described in connection with the knot-tying mechanism. To the piece 181 is fastened a vertical knife 201 for the purpose of severing the sewing thread at the beginning of the winding operation. This knife is removably held to the piece 181 by screws so that it may be removed and sharpened. The lower part of the knife terminates in a triangular portion 202, the function of which will be described in connection with the knot-tying mechanism.

The button chuck will next be described. From the lower face of the ring 173 a cylindrical portion 203 extends downward. This is bored out as shown at 204 in Fig. 24, and in the circular hole 204 is located a shaft 205, which carries the button chuck. A slot 206 is also provided in the side of the extension 203, and a screw 207, passing through a washer 208 which is curved to fit the outside of the cylindrical portion 203, passes through this slot and into the chuck carrying shaft 205, Fig. 19. On the cylindrical portion 203 is marked an index or scale, and the lower face of the washer 208 acts as a pointer for said scale, so that the height of the button above the fabric can be adjusted as desired. It will be noted that the presser plate, which always moves parallel to the throat plate, rests upon the top surface of the fabric, and since the button chuck and presser plate are both firmly supported by the plate 21, it follows that when the washer 208 is set opposite any one of the divisions on the cylindrical portion 203, that no matter what the thickness of fabric placed under the presser plate, the distance between the lips 218 and 219 of the button chuck jaws, and the bottom surface of the presser plate remains unchanged, and hence each of the divisions corresponds to one definite length of neck.

The shaft 205 passes through a horizontal arm 209, which is firmly attached to the part 203, and then into the cross piece 210 of the button chuck frame, which cross piece is secured to said shaft and cut away, as shown at 211 for the movement of the needle. The side portions 212 and 213 are attached to the cross piece 210 by screws, or in any other desired way, and these side frames are connected together near their bottoms by another cross piece 214. The upper parts of the frame 212 and 213 are provided with vertical slots in which the ends of the bar 209 engage, as shown in Fig. 22, which prevent the button chuck from turning on the shaft 205. Between the cross pieces 210 and 214 is journaled a screw 215 provided with a milled head, and with oppositely arranged screw threads thereon. Each of these screw threads carries a movable jaw of the button chuck, 216 and 217, provided with downwardly extending lips 218 and 219, which pass around the lower edge of the button. The swinging jaw 18 of the chuck has already been described, and it is provided with a forked end, Fig. 22, to embrace the edge of the button. Opposite the point of the swinging jaw 18 and carried underneath the cross piece 214 is the fourth jaw forming a part of the button chuck, Figs. 19 to 22. This jaw 225 is mounted on an arm 220 pivoted on a screw 221 in the bottom part of the plate 214. This arm is provided with a slot 222, with which slot engages a pin 223 extending downwardly from the jaw 217 and passing through a slot 224 in the cross piece 214. When the screw 215 is moved the jaws 216 and 217 approach or recede from each other, and the pin 223 causes the fourth jaw 225 to approach or recede from the center, a proportionate amount, and the swinging jaw 18 of the button chuck being controlled by a spring, automatically adjusts itself to different sizes of buttons. To the lower part of an extension 226 of the side frame 213 is attached a thin steel arm 227 curved at the end, as shown at 228, and provided with a hook 229. The part 227 is pivotally secured to the extension 226 by a screw 230, the parts fitting together as shown in Fig. 21. A spring 231, Fig. 19, normally presses the arm 227 downward. This arm is a part of the knot-tying mechanism, and its function will be described later on.

The means for governing the action of the winding mechanism will next be described. After the sewing mechanism has finished its operation the spring 61 rotates the shaft 60 back toward its original position, as already described, but it stops short of returning the shaft to its original position, leaving the index pin 84 still engaged with the screw 90. At the same time as the shaft 60 is brought back, the yoke 137 is shifted to the left bringing the projection 232 on the pulley 143, which engages with the yoke, into engagement with the projection 233 on the pulley 157, Fig. 9, thus bringing the winding mechanism into operation. The inertia of the shaft $c$, however, carries it a little farther until it is locked by reason of the spring pressed block 234 engaging a notch in the clamp 145, thus locking the shaft c, which cannot be unlocked until the winding and knot-tying operations have been finished. At the same time, when the yoke 137 is shifted to bring the winding mechanism into operation, the C-lever 129, being fastened to the shaft 60, drops from the position shown in dotted lines in Fig. 11 to the position shown in full lines therein, the switch cam 131 at the same time swinging the yoke 137 into the position shown in Fig. 9. The C-lever is prevented from going back to its initial position by reason of the fact that the projecting portion 235 thereon, Fig. 11, strikes the movable arm 236, which is pivotally supported by means of a pin 237 on an extension 238 of the main frame. The upper part of the pin 237 is enlarged, as shown at 239, and a spring 240 is coiled around this enlarged portion and engages with a pin 241 on the arm 236, this spring constantly tending to throw the arm 236 toward the C-lever. The other end of the spring 240 is hooked around the pin 242, to which pin is attached a spring 243, which in turn is attached to a crank 244, Figs. 3 and 11, on the end of the shaft 245, on which is firmly fixed the tripping arm 246 of the winding index mechanism, Fig. 77. This tripping arm is provided on its lower end with a projection 247. The tripping arm 246 is enlarged, as shown at 248, to afford a bearing surface for the lower enlarged portion 249 of the adjustable index arm 250, which is movably mounted on the end of the shaft 245, a nut 251 being fixed to the screw threaded end of this shaft to keep the index arm movably confined on said shaft. The index arm 250 is provided with curved wings 252 perforated at regular intervals, said perforations being numbered 2, 4, 6, etc., to determine the number of turns given to the winding thread. The zero hole, which is used when it is desired to throw out the winding and knot-tying mechanism is located at the left, as shown in Fig. 77, at a considerable distance from the other holes. The tripping arm 246 carries a pin 253 near its upper end, which may be adjusted by turning the index arm 250, so that said pin will engage any of said holes by the loosening of the nut 251, and moving the wings along until the proper adjustment has been made, when the nut is tightened. One of the wings is provided with a right angled extension 254, which serves to stop the index pin 255 carried on the upper part of the index arm 250, at exactly the proper place, as shown in Fig. 8, to engage the first thread of the winding index screw 160. The projection 254 strikes the bolt 256 carried by the standard 152, Fig. 8, and the spring 243 constantly tends to swing the projection 254 against the bolt 256.

The spring 243 has a double function. In addition to the fact that it tends to swing the index arm into the position shown in Fig. 8, it also tends to bring the index pin 255 into engagement with the screw 160, that is from the position shown in dotted lines in Fig. 11, to the position shown in full lines therein. This is accomplished in the following way. The shaft 245 is journaled in a sleeve 257 carried on the top of a bracket 258. This bracket is mounted lengthwise of a long sleeve 259, Figs. 2, 11, which sleeve is mounted on a pin 260 carried in ears 261 mounted on the bed plate of the machine. The sleeve 259 is free to vibrate on the pin 260. A lug 262 projecting rearwardly from the sleeve 259 is adapted to strike on the top of the pin 237, which limits the motion in one direction. In the other direction the motion is limited by the lug 263, which is attached to the sleeve 259 and extends forwardly and downwardly and is adapted to strike against the bed plate of the machine, thereby limiting the motion in that direction. To the sleeve 259 is also attached another lug 264, which is adapted to be struck by the end of a bolt 265, Figs. 8 and 11, which passes through an extension 266 of the C-lever. When the C-lever 129 drops from the position shown in dotted lines in Fig. 11 to the position shown in full lines, the index pin 255, which, together with the sewing index pin is set before the beginning of the sewing operation in contact with their respective index screws, still keeps in contact with the screw 160 and remains there until the winding and knot-tying operations are finished. When the latter operation is finished, the C-lever drops from the position it assumes during the knot tying operation, which is a little below that shown in full lines in Fig. 11, to its initial position, with the lug 267 thereon in contact with the bed plate, as shown in Fig. 5. When the C-lever drops from its knot tying position to the position shown in Fig. 5, then the screw 265 strikes the lug 264 and brings the index arm 250 into the position shown in dotted lines in Fig. 11, whereupon the spring 243 returns the index arm into the position shown in Fig. 8.

When the winding mechanism is in operation, the index pin 255 is carried along by the screw 160, as shown in Fig. 9, carrying with it the index arm 250, and the tripping arm 246 until the projection 247 on said tripping arm, Fig. 10, comes in contact with a screw 268, mounted in an upward extension 269 on the arm 236, thus swinging said arm out from under the projection 235 on the C-lever and allowing it to drop until it strikes the mechanism governing the knot-tier, as hereinafter described. To the back of the C-lever 129 is affixed the curved switch cam 131, which has already been referred to as provided with a straight slot 149, and inclined slots 150 and 151. The pin 148 carried on the yoke 137 is adapted to engage said slots and is guided by a movable switch 270, Figs. 16 and 17, composed of two arms at angles to each other and mounted on a pin 271, which is carried by a triangular plate 272 fastened to the back of the switch cam 131 by screws, distance pieces 273, Fig. 18, being interposed to keep the plate at the proper distance from the switch cam.

The pin 271 is secured in the plate 272 by shoulders in any approved manner. Around the end of the pin 271 is coiled a spring 274, one end of which engages a pin 275 in the plate 272, and the other end of which engages a lever arm or handle 276, whose function will appear when the means for throwing out of operation the winding and knot-tying mechanism is described. The tendency of the spring 274 is to keep the switch cam 270 always in the position shown in full lines in Fig. 17.

According to the position of the pin 148 in the slot in the switch cam the various operations are determined. When this pin is in the position shown in dotted lines at the top of Fig. 17, as indicated by the numeral 277, the machine is at rest, the driving mechanism running free. When the pin is in the dotted position shown at the bottom of Fig. 17, and indicated by the numeral 278, the sewing mechanism is thrown into operation. When this pin is in the position shown in section lines at about the center of Fig. 17, the winding mechanism is in operation, and when this pin is in the position shown in dotted lines, as indicated by the numeral 279, the knot-tying mechanism is in operation, and the machine is so arranged that this cycle of operation must always be performed in the same order, and the locking mechanisms are provided whereby each of said operations must be finished before the succeeding one can be commenced. For example, as shown in Fig. 15, the winding mechanism cannot be put into operation until the sewing mechanism has finished its allotted work, because the pawl 54 engages with the teeth 53 and prevents the backward motion of the C-lever and switch cam, and the C-lever is not released until the pin 68 is disengaged from the pawl 67.

It is impossible to bring the pin 148 down from the position 277 below the end of the switch cam 270 by a partial movement of the treadle 37, and then bring it back up into the central winding position without its having first been forced down to the position shown at 278. In other words, it is impossible to throw the winding mechanism into operation until the sewing mechanism has finished its work, because the pawl 54, no matter how far the treadle 37 is pressed down, will always engage with some of the teeth 53, so that a backward movement of the treadle is impossible until after the completion of the sewing, winding and knot-tying operations. Locking means are also provided, whereby the winding mechanism is locked from operation until the sewing mechanism has finished its work, and vice versa. These parts are best shown in Figs. 5, 6, 8, 9 and 10. The clamp 145 is provided with a notch 147, Fig. 6, with which the locking block 234 is adapted to engage. This block 234 is pivotally mounted on a pin 280 passing through ears 281 in an extension on a bearing 282 mounted on the rod 283. The upper part of this rod passes through a perforated brace 284 attached to the top of the standard 152. The lower end of this rod 283 is pivotally connected to the arm 138, which is fixed to the yoke 137. The locking block 234 is free to play up and down in a slot 285 in the bed plate. The rod 283 also carries a sleeve 286 near its top and a pin 287 passing through said rod and through a slot in said sleeve permits said sleeve to rotate on said rod, but prevents it from moving longitudinally on said rod. The sleeve 282 is similarly attached to the rod 283, the pin 288 showing in Figs. 9 and 10. The sleeves with their extensions and ears carrying the locking blocks are best shown in Fig. 5. A locking block 289 for the winding mechanism is pivoted in ears in an extension of the sleeve 286. A spring 290 is coiled around the rod 283, and the ends thereof pass over pins in the extension of the sleeves 282 and 286. This spring has a double function, that is of constantly tending to force both the locking blocks 289 and 234 into engagement with the clamps on the winding and sewing mechanism, respectively. The block 289 is adapted to play in a slot 291 in the standard 152. The locking clamp for the winding mechanism is shown in Figs. 8, 9 and 10. It consists of a portion 292 projecting from the shaft 154 and nearly in the shape of a quadrant of a circle. It is beveled off, as shown at 293, and provided with a recess 294. It is also beveled off, as shown at 295, to allow the index pin of the winding mechanism to be guided to the index screw 160. The bar 283 has the functions of locking either the sewing mechanism, or the winding mechanism, or both together, against operation. Thus, for example, in the position shown in Fig. 8, the sewing mechanism is free to operate, and the winding mechanism is locked. In the position shown in Fig. 9, the winding mechanism is free to operate, and the sewing mechanism is locked, and in the position shown in Fig. 10 both mechanisms are locked, and this condition exists from the beginning of the knot-tying operation up to the time when the sewing mechanism is thrown into operation for sewing on the next button, in which case the parts are thrown back again into the position shown in Fig. 8.

The mechanism for driving the knot-tier will next be described, reference being made especially to Figs. 2 to 10 inclusive. A belt 296 connected with a source of power in any suitable way passes over a pulley 297 loosely mounted on a shaft 298, which shaft is supported in a tubular bearing 299 carried by the standard 152. A pin 300, Fig. 9, passes through the bearing 299 and the shaft 298, the shaft forming a fixed stud projecting out of the bearing and having a head on its outer end to prevent the pulley from coming off. A sleeve 301 connects the pulley 297 with a gear wheel 302, so that said pulley and gear wheel always revolve in unison. The pulley and gear wheel, of course, run constantly whether the knot-tying mechanism is in operation or not. Above the bearing 299, and on the standard 152 is mounted a long bearing 303, Figs. 2 and 7. Through this bearing passes the driving shaft 304 of the knot-tying mechanism. The shaft 304 is extended outwardly beyond the bearing 303 forming a stud, as shown at 305, on which the gear wheel 306 and guide therefor 307 are loosely mounted, so that they may be moved toward or away from the clamp, hereinafter described. This clamp is best shown in Fig. 7, and is referred to by the numeral 309, and is fastened to the shaft 304 by a pin 310. The gear wheel 306 and the guide 307 are made in one piece connected together by a sleeve 308. The clamp 309 is provided with a projection 310ª adapted, when the parts 306 and 307 are shifted, to engage with a projection 31b on the inside of the part 307. The clamp 309 is provided with a recess 312 with which the stop 313 on the shifting mechanism for the gear wheel 306 coöperates. This shifting mechanism consists of a pin 314 engaging a groove in the part 307. It is provided with a reduced portion riveted in the arm 315. This arm 315 extends at right angles from the casting 316, which is pivoted between ears 317 and 318 attached to the bed plate, Fig. 5. The casting 316 is provided with a long sleeve 319, by means of which it is loosely mounted on the pin 319ª, the ends of which fit tightly in holes in the ears 317 and 318, and a spring 320 is coiled around this pin, the lower end of which spring bears against the ear 317 and the upper end of which is fastened to a link 321, the other end of which link is pivoted on a pin 322. The pin 322 is mounted in a bearing in an extension 323 of a vertical piece 324, which is pivotally secured in ears 325 and 326, Figs. 6 and 9, which ears extend toward the machine from the part 316. Formed integral with the vertical piece 324 are two extensions 327 and 328, Fig. 9. The part 327 has soldered to it, the bent wire 329, and the part 328 terminates in a roller 330, revolubly attached thereto. The roller 330 is directly under the stop 235 carried by the C-lever 129, being brought there by the tension of the spring 320. This spring 320 also tends to move the part 316 to the right, as shown in Fig. 9, thus disengaging the power from the driving shaft 304 of the knot-tier and bringing the stop 313 in engagement with the slot 312 of the clamp 309.

During the winding operation, the C-lever is in the position shown in full lines in Fig. 11. As the winding operation progresses, the arm 236 is gradually moved out from underneath the projection 235 on the C-lever, which drops on the roller 330 carried on the arm 328. This tilts the upright piece 316 and the parts connected therewith against the tension of the spring 320, shifts the gear wheel 306 and guide 307 to the left, bringing the pieces 310ª and 311 in engagement with each other, and thereby driving the knot-tying mechanism, a little before which time the stop 313 is withdrawn from the slot 312 in the clamp 309, thus permitting the knot-tying mechanism to be thrown into operation. The shaft 304 is connected by a universal joint 331 to the shaft 332, Fig. 3. The shaft 332 is connected by a universal joint 333 with the shaft 334, which is provided with a worm 335, which meshes with the gear wheel 336, which drives the cams which operate the knot-tying mechanism.

All the winding mechanism, knot-tying mechanism, winding thread trimming mechanism, button chuck, and presser plate, are mounted on the frame 21, shown in Figs. 78 and 79, which is movably mounted on two pins, one connected to the bed plate, and the other to the horizontal arm of the goose neck, permitting a motion of the same in a vertical plane, as already described. It also has a partial rotary motion in a horizontal plane, as will be described in connection with the button shifting mechanism. As already described, the bearing 165 carried by the extension 164 serves for the reception of a part of the driving shaft of the winding mechanism. The extension 168 serves to support the winding mechanism, the button chuck, and the tightener of the knot-tying mechanism. The three holes 337, 338 and 339 are for the reception of the rods 26, 25 and 24 carrying the presser plate. The perforated ear 340 is for the reception of the mechanism for opening the tension device of the needle thread, and in this ear is mounted an upright rod 341, Fig. 4, which is bent at its top and passes through a slot 342 in the horizontal arm 343 of a bell crank lever, which is pivoted at 344 on the front of the goose neck cap 345. The nearly vertical arm 346 of this bell crank lever is formed to a knife edge, as shown in Fig. 3, and is adapted to engage between the plates 347 of the ordinary tension device held together by a spring 348.

The plate 21, see Fig. 24, is provided with a downward cylindrical extension 350 perforated as shown at 349, Fig. 78, for the reception of the shaft and the sleeve encircling the shaft of the twister. The shaft 351 of the twister passes downwardly through the sleeve 352, which is rotatably mounted in the cylindrical extension 350. The sleeve is driven by means of a gear wheel 353, this gear wheel being driven by one of the cams, as hereinafter described. Fixed to the sleeve 352 above the gear wheel 353 is a stop 354 provided with a V-shaped notch. Within this notch the spring 355, Figs. 4 and 23, which has a V-shaped end, is adapted to engage to cause the sleeve to stop in a definite position at certain times during the operation of the knot-tier, to cause the slot in the twister to register with the corresponding slot in the loop former, this operation being aided by a similar construction controlling the shaft 351 which drives the twister. The spring 355 is secured onto a solid block 357 projecting upwardly from the top surface of the supporting plate 21. Above the stop 354, on the sleeve 352, is mounted a support 358 for a spring 359. The shaft 351 carries a stop 360 provided with a V-shaped slot, as shown in Fig. 23, and is supported by a collar 356. On the shaft 351 is mounted a gear wheel 361 driven by one of the cams, as hereinafter described.

The lower end of the sleeve 352 is expanded into a square, Figs. 24, 25 and 26, which is screwed onto the body of the loop former 362. The top of the loop former is bored out for the reception of the gear wheel 363, which is located at the lower end of the shaft 351. The expanded portion of the sleeve 352 furnishes a shoulder for supporting the upper part of this gear wheel, and the lower face of the wheel is made flat resting in the depression in the upper part of the loop former 362. The gear wheel 363 meshes with the gear wheel 364, which drives the twister, as will be hereinafter described. The loop former 362 is also recessed for the reception of the gear wheel 364, and a back piece 365 is screwed onto the body of the loop-former, forming a bearing for the gear wheel 364, as shown in Fig. 27. On the rear part of the loop former is mounted, by means of screws, a downwardly extending guide 366 of the shape shown in Figs. 25 and 26, and bent as is shown in Fig. 24. The loop former is also provided with a curved horn 367, which tapers to a point, as shown in Figs. 25 and 26, over which the thread slips, and it also aids in pulling one end of the knot tight. Screwed to the lower part of the loop former is an additional thread guide 368 slotted as shown in Figs. 25 and 26 at 369 for the passage of the lower finger 370 of the gripper opener. The horn 367 and the curved thread guide are preferably formed integral with each other, the outer face of the horn and main portion of the looper being perfectly smooth and in line with each other to prevent the thread from catching.

The twister is shown enlarged in Figs. 27 to 31 inclusive. It consists of a barrel or case 371 provided with slots 372 and 373 for the reception of the gripper opening fingers 370 and 374. It is also provided with a slot 375 for the passage of the winding thread, and the gear wheel 364 is provided with a similar slot 376. The gear wheel 364 and the casing are slotted half way up, as shown in Fig. 27. Except for the slots, above mentioned, the outside of the barrel or casing 371 is in the form of a cylinder closed at one end, the open end being closed by the gear wheel 364. Four guides 377, 378, 379, and 380 are provided, one end of each of which is riveted or otherwise secured to the end of the barrel or casing opposite the gear wheel. These guides are tapered, as shown in Figs. 29 and 30, and their ends are reduced and formed cylindrical, as shown at 381 in Fig. 31, and nuts 382 engage the screw threaded ends of said slides, passing into countersunk openings in the gear wheel 364, binding the whole structure firmly together. On the four guides 377, 378, 379, and 380 slide two gripper jaws 383 and 384 formed with teeth adapted to engage with each other, thus firmly securing the thread 385 between them, when they are in the position shown in Fig. 29. These grippers are each bored out, as shown at 386, for the reception of a spring 387, which spring is mounted on a pin 388 secured to the inner face of the gear wheel 364. Both gripper jaws are so mounted, but the pins which support the springs and the holes of the gripper jaws in which the springs work, incline toward each other slightly, Fig. 29, at about the angle of the slides 377 and 378. Consequently, when the gripper jaws are left free to be acted upon by the springs they move forward and toward each other on the guides referred to into the position shown in Fig. 29, firmly gripping the thread, as shown. On the other hand when the gripper jaws are driven back by the gripper opener fingers 370 and 374, they separate from each other, as shown in Fig. 30, thus releasing the thread. To insure that the gripper jaws shall move forward at the same rate, a pin 389 is secured to one of said jaws and this pin fits loosely in a hole in the other jaw. The ends of the grippers disposed toward the slot 375 are beveled off, as shown at 390, so that the thread may easily enter between them if they are separated.

The tightener mechanism will next be described, reference being had especially to Figs. 1, 2, 4, 12, 23, 24, 35, 36 and 37. Within the hole 169, in the plate 21, works a tubular gear wheel 391. This gear wheel passes within and is soldered or otherwise fastened to an enlargement 392 of the arm 393, which is provided with a circular hole, and which is kept in place by the plate 21 above and by the plate 171 below, Fig. 24. A rack 394, Figs. 1, 4 and 12, is provided with teeth adapted to mesh with the teeth on the gear wheel 391. This rack is driven from one of the driving cams, as will be hereinafter described. This rack is kept in mesh with the gear wheel by the grooved roller 395 working on the pin 396, Figs. 1 and 23. The arm 393 is provided with a downwardly bent extension 397, Figs. 1, 4 and 35, to the lower end of which is screwed or otherwise fastened an extension 398 of a sleeve 399 forming a bearing for the shaft 400. The shaft 400 passes freely through the bearing 399 and up into a sleeve 401 to which it is secured by the pin 402. The sleeve 401 is provided with a shoulder 403, and a spring 404, one end of which rests against the part 397, is coiled around the sleeve 401 and its upper end passes into a hole 405 in the disk 406. This disk has radial slots 407 in its upper face, as shown in Fig. 36, and the pin 402 passes through the shaft and sleeve and engages two of these slots 407, preventing the rotation of the disk. By pressing the disk 406 down and turning it in the proper direction, and then releasing it, the tension of the spring 404 may be adjusted, the spring returning the disk into engagement again with the pin 402. The lower end of the shaft 400 is enlarged, as shown at 408, forming a shoulder. One side of this shoulder is flattened off, as shown in Fig. 37, and to it are secured the two thread guides 409 and 410, and the hook 411. The hook 411 is provided with a stop 412, which, under the tension of the spring 404, bears against the downwardly extending arm 397, as shown in Fig. 36. The function of the hook 411 is to seize the loop after it is formed in the loop former and draw it tight around the neck of the button. The function of the guide 409 is to push the thread into the slots 375 and 376 of the twister and to insure the fact that the thread shall not slip out of said slot during the loop forming operation. The function of the guide 410 is to guide up one of the threads over the hook 411, to prevent its being caught thereby, the manner of its operation being more fully described in connection with the diagrams of the knot-forming mechanism.

The mechanism for controlling the various parts of the knot-tier will next be described. From the upper part of the frame 21 extends rearwardly a bracket arm 413, Fig. 78, which is perforated at 414 to furnish a bearing for a pivot for various levers hereinafter referred to. It is also perforated at 415 to furnish a bearing for the pivot pin on which the controlling cams are mounted. At an angle to the bracket arm 413 extends another bracket arm 416, which is provided with a downwardly extending portion 417, Fig. 2, in which extension is bored a hole, in which is fastened a pin on which is pivoted a lever 418, Figs. 2 and 12. Formed integral with the bracket arm 416 is another bracket arm 419, Fig. 78, which terminates in a bearing 420 through which passes the shaft 334 carrying the worm wheel 335, Fig. 3. Through the perforation 415 extends a pin 421 surrounded by a sleeve 422, Fig. 12, revolubly mounted thereon. The sleeve 422 is provided with a spline 423, Fig. 12, which fits in a key way in the worm wheel 336 and also in the controlling cams located below said worm wheel. This pin is provided with a head 424, which keeps the cams and worm wheels in position thereon, and the top of the pin is preferably formed into a thread, and a nut 425, Fig. 2, is fastened thereon holding all the parts together. Through the perforation 414, Fig. 78, passes a pin 426, Fig. 12, provided with a nut 427 on its top. On the pin 426 are mounted four levers 427, 428, 429 and 430, Fig. 12. The lever 427 controls the twister, the lever 428 controls the tightener, the lever 429 controls the loop former, and the lever 430 controls the motion of the hook lever 431. These levers, as said before, are all mounted on the pin 426 and are separated from each other by distance washers. The pin 426 is provided with a head 432, Fig. 2, for the purpose of keeping these levers in place. The lever 427 terminates in a curved end provided with teeth 433, which mesh with the pinion 361 on the shaft of the twister, Figs. 12 and 24. The lever 428 has a bent end, which is pivotally connected to the rack 394, which is provided with teeth 434, which mesh with the gear wheel 391. The lever 429 is also provided with a curved end having teeth 435, which mesh with the gear wheel 353, which drives the loop former. The lever 431 terminates in a hook 436, Figs. 4 and 12, and this lever is bent upward, as shown at 437, Figs. 1 and 12, and is then bent nearly horizontal, as shown at 438. This end of the lever is expanded, as shown in Fig. 12, and pivotally mounted on the screw 439, which is screwed into the perforation 440 in the plate 21, see Fig. 78, and is locked in place by a nut 441, Fig. 1. The perforation 440 is in a curved arm 442 forming a part of the frame 21 and extends forward from said plate, but is inclined downward slightly, as shown in Fig. 79. The screw 439 is therefore inclined rearwardly to a slight extent in order to make the hook 436 pass forwardly and downwardly as it moves to catch the thread. The end 438 of the hook lever 431 is provided with a slot 443 in which works a ball headed pin 444, which projects upwardly from the lever 430. The screw 439 is provided with a head 445, Fig. 1, on which is mounted the end 438 of the lever 431, and above which is a washer 446 with an expanded head, which with the screw head forms shoulder bearings for the hook lever 431. Around the body of this washer is coiled a spring 447, one end of which passes around the pin 448, Fig. 12, and the other end of which may be placed in any one of the slots 449 formed on an extension 450 of the arm 442 of the frame 21. The end 451, Fig. 1, of this spring 447 projects beyond the slots 449, which form a curved rack, and may be grasped by the fingers and moved so as to engage any one of the slots 449, thus providing for any tension of the hook 436 on the winding thread by means of the spring 447. The frame 21 is provided with a perforation 452, Fig. 78, in which is mounted a large headed screw 453, which provides a bearing for the two-armed winder tension opener lever 454. A pin 455, Figs. 12 and 78, projects rearwardly from the frame 21, and a spring 456 is mounted on said pin and a projection 457 on the straight arm 458 of the winder tension opener, and normally forces the same rearwardly. The screw 453 is held in place by the washer 459 and nut 460, Fig. 2. On this lever arm 428 is mounted a pin 461, which is adapted to engage with a projection 462 on the bracket arm 463 in which is located the perforation 452, Fig. 78, thus limiting the rearward motion of this lever.

Figure 67:
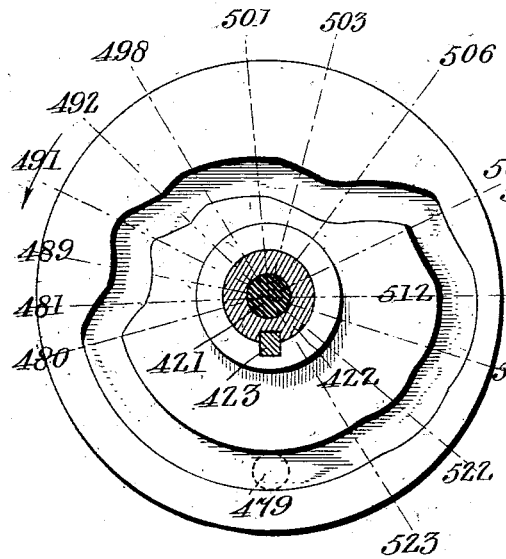
Figure 68:
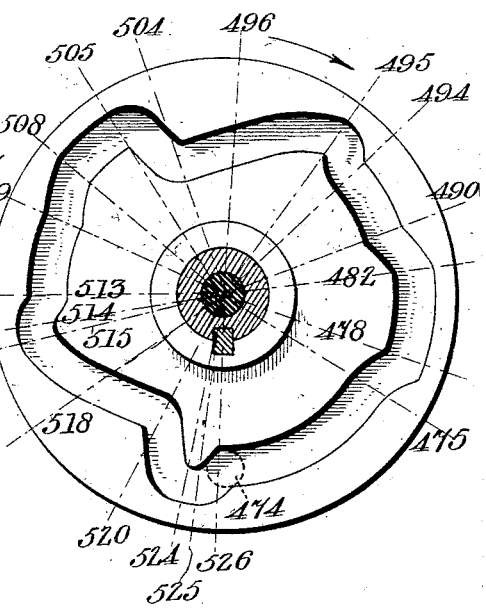
Figure 69:
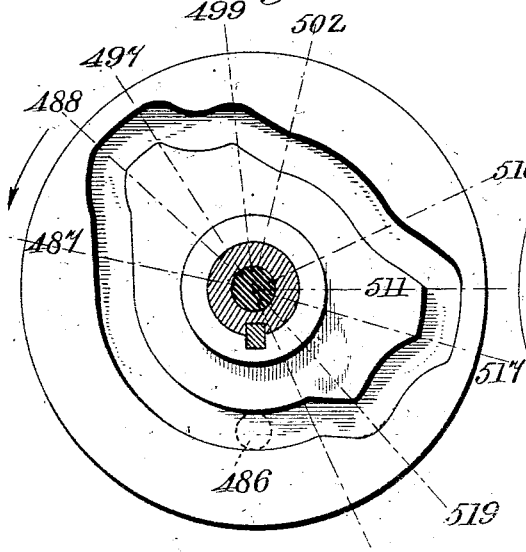
Figure 70:
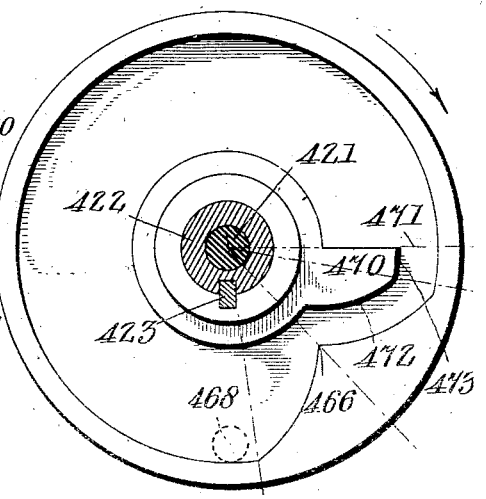

The five levers just before referred to are governed by the action of the cams mounted on the shaft 421. There are two cam disks, but the upper and lower face of each disk are formed into cams, which are shown in detail in Figs. 67 to 70. Fig. 67 represents the cam on the upper face of the top cam disk, and this cam is used for controlling the twister. Fig. 68 shows the cam on the lower face of the upper disk, and this cam controls the tightener. Fig. 69 represents the cam on the upper face of the lower cam disk, and this controls the loop-former, and Fig. 70 represents the cam on the lower face of the lower cam disk, and this controls the action of the hook lever. Each of the levers 427, 428, 429 and 430 is provided at one end with a pin on which a roller is mounted, which roller extends into the cam groove on one of the cam disks. One of these rollers is shown at 464 in dotted lines on Fig. 12. The positions of these rollers are shown in Figs. 67 to 70 in dotted lines in the position they are in when the machine is stopped. The arrows on Figs. 67 to 70 show the direction of motion of the cam disks during the operation of tying the knot, and the dotted lines on these figures divide the cams up into sectors, each of which sectors has one particular function.

Referring now to Figs. 51 to 65, and to Figs. 67 to 70, and considering that the sewing and winding operation have been finished, the operation of the knot-tying mechanism will now be described. Referring to Fig. 51, the winder stops in the position shown therein, and the beginning end 465 of the winding thread is drawn up through the looper and twister. This operation has been done previously in a manner which will be hereinafter described. The first step in the knot-tying operation is to bring the hook 436 along the dotted line in Fig. 51 to the position shown in dotted lines therein. This is accomplished by the cam face shown in Fig. 70, the roller 468 moving from the position shown in dotted lines up to the point 466. Fixed to the outer cylindrical surface of the lower cam disk is a projection 467, Figs. 2 and 12, and the inclined face thereof is adapted to strike the inclined face of the lever 454 just before the roller reaches the point 466, the left hand end of this lever striking the curved arm 182, Fig. 38, and opening the winding thread tension device, as already described. By this time the hook 436 has passed beyond the winding thread at the point 469, and the roller 468 having passed over the point 466 the hook 436 commences its rearward movement catching the thread at the point 469. The hook retreats until the roller 468 has reached the point 470, where it dwells until the roller 468 reaches the point 471. To positively drive and hold the roller 468 which controls the action of this hook, drawing up the thread, the cam is provided with faces 472 and 473. The hook lever is positively controlled by the cam surface, while the roller 468 is passing from the point 466 to the point 471. During the remainder of the rotation of the lower cam disk this hook lever is controlled simply by the tension of the spring 447. When the roller 468 reaches the point 470, the projection 467 has passed beyond the end of the lever 454, thereby releasing it, whereupon the spring 456 returns said lever to its original position, again putting the tension on the winding thread by means of the devices shown in Fig. 38.

As already said, the roller 468 in traveling to the point 466 brings the hook 436 from the position shown in full lines in Fig. 51, to the point shown in dotted lines therein, and while this roller is traveling from the point 466 to the point 470, the hook retreats back into the position shown in Fig. 52, in which position it dwells for a short time. In the backward motion of the hook 436 which, as shown, is in a curve, one strand of the winding thread is drawn from the winder spool 176 up through the slots 375 and 376 of the twister, as shown in Fig. 52. While the roller 468 is traveling from the position shown in dotted lines over the point 466, and about two-thirds of the distance from the point 466 to the point 470, while the roller 474, shown in dotted lines in Fig. 68, which controls the action of the thread guide 409 dwells. This thread guide and the related parts therefore remain motionless in the position shown in Fig. 51, until the roller 474 reaches the point 475, Fig. 68, whereupon the thread guide 409 comes up behind the strand 476 of the winding thread and pushes it in to the slots 375 and 376. The action of the hook 436 will, generally speaking, pull the thread into these slots all right, but the thread guide 409 is provided to push the thread in, as an extra precaution. While this thread guide is moving from the position shown in Fig. 51 to that shown in Fig. 52, the thread guide 410 lifts the outer strand of thread, 477, above the hook 411, so that in no case during any of the operations of the knot-tier will this strand 477 engage with the hook 411. By the time the roller 474 has reached the position of the dotted line 478, the thread has assumed the position shown in Fig. 52. Meanwhile, the roller 479, Fig. 67, which governs the action of the twister has moved nearly to the dotted line 480, Fig. 67, the twister being inactive during this time. When the roller 479 passes the dotted line 480, the twister commences to act and makes one revolution opposite to the hands of a watch, looking from the right in Fig. 24, or as shown by the arrow 485 in Fig. 53. This twists the strand 465 once around the strand 476, as shown in Fig. 53. Just before the roller 479 reaches the dotted line 481, Fig. 67, the roller 474, Fig. 68, reaches the dotted line 482, and the tightener mechanism moves backward in a direction opposite to the arrow 484 in Fig. 53 to afford clearance for the loop former, as it turns to deliver the loop. As the roller 479 moves from the dotted line 481 to the dotted line 489 no motion of the twister takes place. By this time the roller 474 has reached the dotted line 490, Fig. 68, at which time the roller 486 has reached the line 487.

During all the preceding operations, the roller 486, Fig. 69, which governs the action of the loop former, has passed up to the dotted line 487, the loop former being inactive all this time. While the roller 486 is traveling from the dotted line 487 to the dotted line 488, the loop former is turned around from the position shown in Fig. 53 to that shown in Fig. 54, to deliver the loop to the tightener mechanism. During the motion of the roller 486 from the line 487 to the line 488, the roller 479 has moved from the position 489 through the position 491 to the position 492. In moving from the position 489 to the position 491 the roller 479 has caused the slots 375 and 376 to remain in alinement with the slot 493 in the loop former. These slots remain in alinement with each other until the loop former is turned about 90 degrees in the direction of the arrow 483 in Fig. 53, at which time the thread strand 476 has come out of the loop former when the twister makes a second revolution in the direction of the arrow 485 in Fig. 53, completing the said revolution, by the time the looper has reached the position shown in Fig. 54. This, however, does not make a second loop in the thread. It is merely to put the roller 479 in such a position in reference to its controlling cam that two revolutions may be made by the twister in making the second loop, as will be described later on. This second revolution of the twister takes place while the roller 479 is moving from the position 491 to the position 492. During a part of the time of this motion of the rollers 479 and 486, the roller 474 has passed from the position 490 to the position 494, and partly beyond to the position 495. While the roller 474 is moving from the position 490 to the position 494, the tightener remains in the position shown in Fig. 53, but when it is passing from the position 494 to the position 495, the tightener moves into the position shown in Fig. 54, and the hook 411 passes under the thread strand 476, and also under the thread strand 477. This motion of the roller 474 is completed shortly after the roller 486 reaches the position 488, and the roller 479 reaches the position 492.

Figure 55:
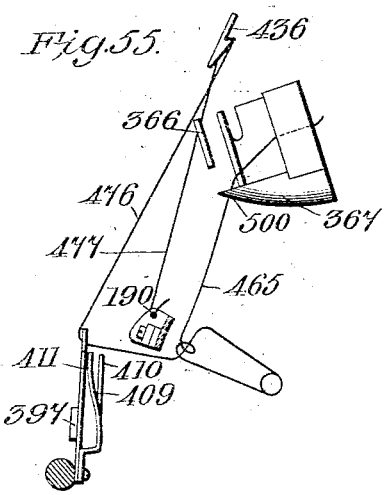
Figure 56:
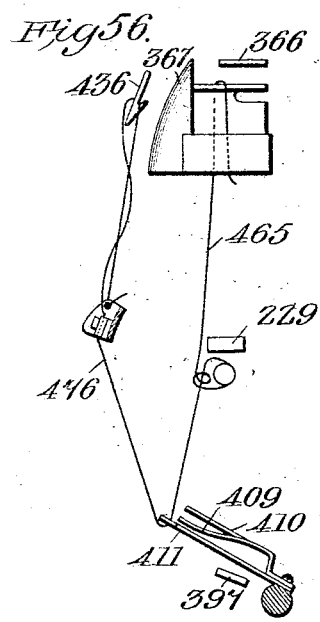

When the roller 474 moves from the position 495 to the position 496, the tightener moves back, as shown in Fig. 55, carrying with it the strand 476, the strand 477 not being caught by the hook 411 owing to the effect of the thread guide 410 in preventing the engagement of said strand by said hook. During the latter part of the motion of the roller 474, from the position 494 to the position 495, and during the first part of its motion from the position 495 to the position 496, the roller 486 passes from the position 488 to the position 497, this being a dwell, and the roller 479 passes from the position 492 to the position 498, this being also a dwell. During the latter part of the motion of the roller 474 from the position 495 to the position shown in 496, the roller 486 moves from the position 497 to the position 499, and during the first part of its motion it brings the loop former from the position shown in Fig. 54 to that shown in Fig. 55, said motion being in a direction opposite to the arrow 483, which causes the loop to be released from the end of the thread guide 366, whereupon the loop assumes the position shown in Fig. 55. The latter part of the movement of the roller 486 from the positions 497 to 499 is merely a dwell, permitting the loop former to remain for a time in the position shown in Fig. 55. It should be noted that the thread strand 465 passes down under the point of the horn 367, as shown at 500 in Fig. 55, so that when the loop former returns to its original position, as shown in Fig. 56, it has power to draw up the thread 465, and so pull the knot tight, as shown in Fig. 56, the end of the thread being tightly held by the gripper all this time. While the roller 486 is passing from the position 497 to the position 499, the roller 479 is passing from the position 498 to the position 501, thus keeping the slots in the twister always in line with the slot 493. While the roller 486 passes from the position 499 to the position 502, the loop former is turned from the position shown in Fig. 55 in a direction opposite to the arrow 483, in Fig. 53, back to its original position, as shown in Fig. 56. Meanwhile the roller 479 has been traveling from the position 501 to the position 503, which causes the slots 375 and 376 to be always kept in line with the slot 493. During the same time the roller 474 has passed from the position 496 to the position 504, causing the tightener to move from the position shown in Fig. 55 to the position shown in Fig. 56, thereby drawing tight the first loop around the neck of thread connecting the button with the fabric. As the tightener moves from the position shown in Fig. 55 to that shown in Fig. 56, the thread is drawn in between the movable jaws 192 and 196, Fig. 34, which automatically close upon the same and clamp it tightly, by pulling against the roughened pin 195, which moves the jaw 196 which carries with it the jaw 192. Any further motion, therefore, of the thread between the hook 436 and the automatic clamp is prevented, and the tension on the thread 476 is shifted from the spring which controls the lever carrying the hook 436 to the spring 404 on the tightener. The tension of the spring 404 upon the thread is much heavier than the tension of the spring which governs the action of the hook lever. Each of these springs is independently adjustable so that it is possible to have a very light tension to keep the thread tight, during all of the operation, except while the loop is being drawn up, as shown in Fig. 56, while at this latter time a heavy tension can be put upon the thread. Drawing the loop tight under a heavy tension, and then drawing the thread up to make a second loop under a light tension, materially diminishes the likelihood of the loosening of the first loop, before the second loop is pulled tight. During the end of the operation of drawing up the loop tight, as shown in Fig. 56, the stop 412 forming a part of the hook 411 is drawn away from the support 397, as shown in Fig. 37, thus causing the whole strength of the spring 404 to bear on the thread 476 to tighten the loop.

I have described the thread as being seized by the jaws 192 and 196. Of course, any positively operated means for holding the thread could be substituted for these jaws as, for instance, a clutch controlled by a cam could be used. As the thread loop is drawn tight, the thread strand 465 is drawn to the left of the hook 229 on the arm 227, Figs. 19 and 56. After the first loop has been drawn tight, the roller 474 traveling from the position 504 to the position 505 brings the tightener from the position shown in Fig. 56 to the position shown in Fig. 52, allowing the spring governing the action of the hook 436 to carry back the thread strand 476 into the slots 375 and 376. During the early part of this backward movement, the projection 412 on the hook 411 again engages with the piece 397, thus taking the tension of the spring 404 off of the thread 476, at which time there is no tension upon the thread 476, except that of the spring which governs the action of the hook 436. The continuance of the backward movement of the tightener releases the thread from the clamp jaws 192 and 196, the spring 198 aiding in this. When the roller 474 has reached the position 505 the tightener has assumed the position shown in full lines in Fig. 52, having pushed the thread strand 476 again into the slots 375 and 376. The strand 476 cannot be pulled quite back to the position shown in Fig. 52, however, because it comes in contact with the left hand face of the hook 229. During the operation of winding, the thread strand 476 passes under the hook 229 which yields upwardly against the tension of the spring 231, and thus the hook 229 performs no function during the operation of winding. When the winding operation stops, the thread strands are in the position shown in Fig. 51, and the strand 476 is just a little behind the hook 229; now when the thread strand 476 is pulled into the position shown in Fig. 56, it passes under the hook 229, which yields as before stated, so that when the thread strand 476 returns toward the position shown in Fig. 52, it is prevented from returning to exactly the position shown in Fig. 52, because the left hand face of the hook 229 prevents it from so doing, and thus the strand 476 is not pulled into a position in which it greatly tends to loosen the first loop.

Shortly after the roller 474 has reached the position 505, the roller 479 has reached the position 506, at which point the twister commences to turn in a direction opposite to the arrow 485 in Fig. 53 to form the second loop, during which motion the twister makes two complete revolutions, these two revolutions, however, producing but one twist in the loop. At the end of these two revolutions the roller 479 has reached the position 507. Shortly before the roller 479 has reached the position 507, the roller 474 has reached the position 508, the motion from the position 505 to the position 508 being a dwell. When the roller 474 moves from the position 508 to the position 509, the tightener moves back from the position shown in full lines to the position shown in dotted lines in Fig. 52 in order that the action of the twister loop former may be unimpeded. While the roller 479 is moving from the position 503 to the position 507, and while the roller 474 is moving from the position 505 to a point a little beyond position 509, the roller 486 is moving from position 502 to position 510, this being simply a dwell. When the roller 486 moves from the position 510 to position 511, the loop former again turns from the position shown in Fig. 53 in the direction of the arrow 483 to the position shown in Fig. 54, in order to deliver the second loop to the tightener mechanism. While the roller 486 is moving from position 510 to position 511, the roller 479 is moving from position 507 to position 512, keeping the slots in the twister always in line with the slot 493, in the loop former. During this operation, the roller 474 is moving from position 509 to position 513, which is simply a dwell. As the roller 474 moves from position 513 to position 514, the tightener moves from the position shown in Fig. 53 to the position shown in Fig. 54, as already described. The roller 474 then moves to position 515, this being simply a dwell. While the roller 474 is moving from position 515 to position 518, the tightener is moved from the position shown in Fig. 54 to that shown in Fig. 55.

While the roller 474 is moving from position 513 to a point a little beyond position 515, the roller 479 is moving from position 512 to position 516, and the roller 486 is moving from position 511 to position 517, both of these movements being merely dwells. As the roller 486 passes from position 517 to position 519, during the first part of this movement the loop former turns from the position shown in Fig. 54 to the position shown in Fig. 55, there then being a considerable dwell until the roller 486 reaches the position 519. The purpose of this dwell is in order to give a chance for the roller 474 to move a considerable distance from position 518 toward position 520, in order to pull the strand 476 fairly tight, thus again tightening the first loop before the strand 465 is pulled up by the loop former to tighten the second loop, which pulling up of the loop former is occasioned by the motion of the roller 486 from position 519 to position 521, when the loop former will be in the position shown in Fig. 56, and by the time the roller 486 has reached the point 521, the roller 474 will have passed slightly beyond position 520, and the tightener will be in a position a little to the left of its position, as shown in Fig. 56. While the roller 486 has been traveling from position 517 to position 521 through position 519, the roller 479 has been traveling from position 516 through position 522 to position 523, which motions of the roller 479 are simply designed to keep the slots in the twister always registering with the slot 493.

While the roller 474 is traveling from position 520 to position 524, the tightener has been moved from substantially the position shown in Fig. 56 to the position shown in Fig. 52 in full lines. During this motion the action of the automatic jaws 192 and 196, and of the hook 436 is as has already been explained with reference to their action during and after the tightening of the first loop. When the roller 474 is moving from position 524 to position 525 there is simply a dwell. While the roller 474 is traveling from position 525 to position 526, the tightener retreats from the position shown in full lines to the position shown in dotted lines in Fig. 52, leaving the strand 476 passing through the slots 375 and 376, and as before explained with reference to the first loop the strand 476 bears against the left face of the hook 229. While the roller 474 is passing from a point a little in advance of position 524 to its original position shown in dotted lines, the roller 486 passes from position 521 back to its original position, shown in dotted lines, and the roller 479 passes from position 523 back to its original position, shown in dotted lines. Meanwhile the roller 468 has reached substantially its original position, shown in dotted lines in Fig. 70, but a little closer to the center of the cam in consequence of the fact that some of the length of the strand 476 has been used in tying the knot, and in reaching around the hook 229. The roller 468 in traveling from the point 471 back to approximately its original position is not affected by the cam at all, being simply governed by the tension of the spring and the pull on the strand of thread 476.

The various positions of the thread when the loops are formed are shown on an enlarged scale in Figs. 64 and 65. A square knot is formed as will be obvious from the fact that the strand 476 is first pulled tight on forming the second loop, which causes this strand to bind tightly around the neck of thread securing the button to the fabric, whereupon a pull on the strand 465 will cause the lower or second loop to work inside and buckle the first one, thus crimping the thread 476 and forming a square or reef knot. While I have shown the hook 229 attached to the lever 227 as being constantly near the path of the needle, I do not desire to limit myself to this construction, for certain purposes it might be desirable to have the lever 229 entirely from under the button, and then to move it, by a cam, to the position shown in Figs. 19, 20 and 21, at the beginning of the knot tying operation. Thus during the sewing and winding operations the space under the button would be entirely clear.

The means for throwing off the power from the knot-tying mechanism, and for locking the same after it has finished its work, will next be described. The roller 330, Figs. 9 and 11, which is carried on the end of the rod 328, stays in the position shown in Fig. 11 during the sewing and winding operations, and during the knot-tying operations it remains in the same vertical plane, but is forced downward against the plate 525. This roller 330 and rod 328, under the influence of the spring 320 tend to swing forward toward the front of the machine, and this forward motion is checked by the downwardly projecting end 526 of the wire 329, see Figs. 9 and 11, which strikes against the outer curved face of the switch cam. When the sewing operation is going on, the C-lever is in the position shown in dotted lines in Fig. 11. When the winding operation is going on, the C-lever drops to the position shown in full lines in Fig. 11. Just as the winding operation is about to finish, the arm 236 is pushed out from beneath the projection 235 and the C-lever falls, the projection 235 striking the roller 330 and carrying it down against the plate 525. The falling of the rod 328 moves the top 313, Fig. 7, out of engagement with the slot 312 in the clamp 309 and shifts the driving gear 306 and the guiding pulley 307 over to the left from the position shown in Fig. 7, so that the projections 310ª and 311 come in contact with each other, thus starting the knot-tying mechanism. At the same time the downward motion of the rod 328 turns the point 527 of the lever 418, Fig. 12, in toward the lower cam disk until it nearly touches the same. This is effected by means of the following connections: In the downwardly extending sleeve or portion 417, Fig. 2, is mounted a pin 528 on which the lever 418 is supported. To the end of the lever 418 is pivotally connected a rod 529, which rod is connected to another rod 530 by an adjusting device 531, Fig. 3, which consists of a sleeve having internal right and left handed screws provided with a lock nut at the end. The rod 530 has its end bent upward passing through a vertical sleeve 531ª, which is carried on a horizontal sleeve 532, mounted on a pin secured on the end of a bent arm 533, Fig. 7, which is formed integral with the part 324, Figs. 8 and 9. At about the time when the knot-tying mechanism has finished its work, namely, at the time when the tightener mechanism has moved about half way back after tightening the second loop from the position shown in Fig. 56 toward its original position, the end 527 of the lever 418 strikes the inclined face of the projection 467 on the lower cam disk, which moves the end 527 away from the center of the cam disk, thus by the means of the connections already described drawing the roller 330 from underneath the projection 235, allowing the C-lever to drop back to its original position, as shown in Fig. 5. While the end 527 of the lever 418 is in contact with the projection 467, the roller 330 is held back in contact with the vertical face 534 of the bed plate, thus limiting the backward movement of said roller 330, and preventing the disengagement of the projections 310ª and 311 until the proper moment, thus keeping the power mechanism in engagement with the driving means of the knot-tying mechanism until the proper time for releasing it. This condition of affairs obtains until the projection 467 on the lower cam disk has passed from underneath the point 527 of the lever 418, whereupon the spring 320 brings the roller 330 back toward the position shown in Fig. 11, until said roller 330 strikes the rear face of the projection 235, and at the same time throws the gear wheel 306 and guide 307 into the position shown in Fig. 7 and brings the stop 313 over until it engages with the slot 312 in the clamp 309, which immediately stops the knot-tying mechanism.

The construction of the presser bar or plate 19 will next be described, reference being had to Figs. 1, 2, 3, 4, 40, 45, and 46. This presser plate, as already described, is supported by rods 24, 25 and 26 depending from the frame 21. The presser plate is turned down to a taper edge, as shown at 535 in Fig. 1, so that the thread from the winder can be wound down close to the fabric. A slot 536 is provided at about the center of this depressed portion, Fig. 1, to afford a space for the needle to play in, and this slot extends out to the front edge of said plate to afford a space for the passage of the neck of thread securing the button to the fabric, after the button has been sewed on. It is also provided with a longitudinal slot 537, Figs. 45, 46 and 49 to guide the trimmer mechanism in its movement, as hereinafter described. At the end of the slot 537, a stop 538 is provided to limit the rearward motion of the trimmer and to reset the same, this stop being fastened by screws to the top of the presser plate 19. On the left the presser plate is provided with a rearward extension 539 which passes underneath the loop former and serves as a guard for the same, Fig. 4, and to this extension 539 is fastened, in any suitable manner, a bent curved guide 540, Figs. 3 and 4, which serves as a guard for the hook 436 on the hook lever 431.

The trimmer mechanism will next be described, reference being had to Figs. 39 to 50. In the slot 537 works the trimmer for the winding thread. This trimmer is shown in plan view in Figs. 39 to 47, and in longitudinal section in Fig. 48. It consists of two upright L-shaped pieces 541 and 542, Fig. 49, the horizontal portions running in undercut grooves in the slot 537 of the presser plate 19. As shown in Fig. 48, the upright pieces 541 and 542 are connected by a distance piece 543 all secured together by a pin 544. To take the strain of the backward movement of the ram, hereinafter described, off of the pin, the distance piece is provided with ears 545 and 546, Fig. 47, resting against the upright pieces 541 and 542. The main portion of this trimmer is made out of a solid portion of machinery steel. This is milled out for the entire width between the side pieces 541 and 542 up to the solid portion 547. This solid portion 547 is milled out, as shown at 548, for the passage of the smaller portion of the ram, hereinafter described. The portion 547 is also provided with a hole 549 for the reception of one end of a spring 550, Fig. 48, the other end engaging a similar hole in the ram. On the left of the part 547 is a slot 551 in which the trigger 552 engages. Then the whole left hand face of the piece 547 is cut down, as shown in Fig. 48. The part 547 is also drilled out to provide a hole 553 for the reception of the trigger spring 554, Fig. 47. To the side of the upright piece 541 is screwed, as shown in Figs. 41 and 49, a projecting piece 555 provided with serrations 556, Fig. 48, and a V-shaped end 557 for the purpose of guiding the thread to be severed toward the center of said piece. To the upright piece 542 is fastened a similar piece 558, but this piece is not provided with serrations, and the V-shaped end 559 thereof, Fig. 41, is sharpened to form a knife edge for the purpose of severing the thread. The piece 558 is smaller than the piece 555 in order that it may be permitted to pass under the button. The top of the piece 547 terminates in a pin 560, on which is mounted a roller 561 secured in position by the cotter pin 562. This roller forms the point of application of power to the trimmer, as hereinafter described. The ram of the trimmer consists of a long thin piece 563, Fig. 48, it terminating on the left in an end 564 provided with upright extensions 565 and 566. The extension 565 is serrated on the outside, as shown at 567, which serrations coöperate with the serrations 556 on the piece 555 to firmly hold the thread between them. The extension 566 is brought to a knife edge 568 which coöperates with the V-shaped knife edge 559 on the piece 558 to sever the thread. Both of the extensions 565 and 566 are slightly undercut, as shown at 569, for the purpose of keeping the thread down against the thin portion of the arm. Between the extensions 565 and 566 is pivoted a guide 570 provided with ears 571 through which passes a pin 572. A spring 573 is coiled around this pin and normally holds the part 570 in the position shown in Fig. 48, the ears 571 forming a stop which limits the downward motion of the same. The right hand portion of the ram, as shown in Fig. 48, is enlarged vertically, as shown at 574, and is hollowed out, as shown at 575, for the reception of the spring 550. It is provided with a vertical extension 576, which is adapted to strike against the part 547. The motion of the ram in the other direction is limited by the cross piece 543, the extension 576 striking against it. The upward extension 576 is beveled off, as shown at 577, Fig. 47, to more easily coöperate with the inclined end 578 of the trigger 552, which is pivoted on a pin 579 on the part 547.

The means for driving the trimmer just described, will now be described, reference being had especially to Figs. 3, 39 to 44, and 78 to 82. It is operated by means of the lever 8, Fig. 39. This lever, as already described, moves the arm 13 to operate the link 15 to open the movable jaw of the button chuck. When the projection 23 of the link 15 strikes the pin 20, the pin 580, Fig. 39, which connects the arm 13 and link 15 becomes a stationary pivot. The movement of the arm 10 then moves the lever 13 in the direction of the arrow 581, Fig. 39, and by means of the lever 582 it partially revolves the shaft 583, Fig. 41, which is revolubly mounted in the perforation 584 of the frame 21, Fig. 78. The shaft 583 extends downwardly through a sleeve 585 secured to the under part of the frame 21, this sleeve being omitted from Fig. 41. The lower end of the shaft 583 passes through the end of the lever 586. It also passes through the lever 587, Fig. 40, and a nut 588 holds both levers in place on said shaft. The shaft is shouldered and otherwise arranged to keep the levers 582, 586, and 587 in their proper relative position to each other and on the shaft. The lever 587 is cut away, as shown at 588ª, terminating in a hook 589, and is adapted to fit partly around the roller 561. On the lever 587 is mounted a short pin 590 on which is pivoted an arm 591, undercut, as shown at 592. A spring 593 wound on the pin 590 tends to bring the arm 591 into the position shown in Fig. 40, from its normal position shown in Fig. 39 for driving the trimmer. The undercut portion 592 of the arm 591 catches into the hook 589, keeping the parts in the position shown in Fig. 39 until they are forcibly disengaged, when they assume the position shown in Fig. 40. On the arm 591 is pivoted a curved lever 594, which passes down under the lever 587, as shown in Fig. 41, and is held by a shoulder on a screw 595 in contact with the underside of said lever 587. The lever 594 is provided with a slot 596 through which the screw 595 plays.

The end of the lever 587 is provided with an upward extension 597. Through this extension 597 passes the end of the screw 598, and this screw also passes through a hole in a pivoted pawl 599, which is shaped as shown in Fig. 40. A spring 600 kept in place by a pin 601 surrounds the screw headed pin 598, and a bearing for this spring is furnished by the screw 595. The other end of the spring 600 bears against a pin 602, which projects downwardly from the pawl 599 tending to hold the parts in the normal position shown in Fig. 45. The pin 602 is struck by the lever 594 when the power connection is thrown off the roller 561, as shown in Fig. 40, when the trimmer is thrown out of action. On the arm 603 is a downwardly extending projection carrying the roller 604 which governs the knife mechanism for severing the carrying end of the winding thread, and also governs the action of the gripper opening fingers. The roller 604 bears against one face of the lever 586, Figs. 39 and 41, and is also guided by the pivoted pawl 599, and by the extension 597 on the lever 587. Secured to the top of the arm 603, and preferably made integral therewith, is a flat piece 605, which is bent down, as shown at 606, and is then cut away to form the two gripper fingers 374 and 370, shown in Fig. 41, the lower one being in dotted lines. These gripper arms are bent near their ends, as shown in Fig. 27. A screw having a countersunk head passes through the end of the arm 603, through the part 605, through a cylindrical part 607, which is secured to the parts 603 and 605 and forms a bearing for the same, into a threaded hole 608ª provided in the downward extension 607ª, Fig. 2, of the frame 21, Fig. 78. The part 607ª is extended forwardly and downwardly to form a projecting portion 609, Fig. 79, upon which the knife 610 is pivotally mounted on the screw 611, Fig. 41. The parts 603 and 605 are perforated and through the perforations passes the upwardly extending boss or sleeve 607 through which the securing screw passes, and around this boss or sleeve the spring 608 is coiled, one end thereof being fastened to a pin 612, which also passes through the parts 603 and 605, and aids in securing them together. The other end of the spring 608 bears against the downward projection 609 on which the knife is mounted. The tension of the spring 608 tends to keep the roller 604 always in the position shown in Fig. 39, and also to keep the knife 610 always in the raised position shown in Fig. 41. The knife 610 is provided with a slot 613 through which a pin 614 fastened in the horizontal piece 605 passes, the parts being so arranged that as the arm 603 swings in a horizontal plane, the knife 610 swings in a vertical plane.

Figure 57:
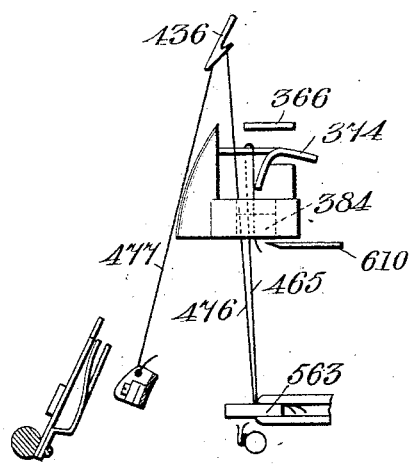

The operation of the trimmer for the winding thread, the opener device for the grippers of the twister, the swinging chuck jaw, and the trimmer for the carrying end of the winding thread, will now be described. Starting from the position shown in Fig. 39, and considering that the button has been sewed on and the winding thread applied and knotted, at which time the positions of the various threads will be as shown in Fig. 57, (except that the loose ends shown near the bottom of such figure have not been severed, as shown,) nor the trimmer moved up into the position therein shown, on the completion of the operation of the knottying mechanism, the treadle 37 is automatically unlocked, and can then be moved back into its original position, as shown in Fig. 81, thus freeing the treadle *l* which is then operated. This, as before described, moves the lever 8 in the direction of the arrow 615, in Fig. 39. This opens the movable jaw 18 of the button chuck, as already described. This occurs at the beginning of the movement of the lever 8, and the further movement of the lever moves the trimmer mechanism up toward the button, whereupon the projection 570, Fig. 48, passes down under the button compressing the spring 573, and this motion continues until the trigger 552 strikes against the support of the movable jaw 18, thus compressing the spring 553, and releasing the hook 578 from the projection 576 of the ram. The spring 550 then causes the ram to shoot back until the projection 576 strikes the distance piece 543. This sudden backward action of the ram severs the thread by means of the knife edges 559 and 568, and the loose end is held by the serrations 567 and 556, and this condition of affairs is exactly shown in Fig. 57.

The trimming mechanism, shown in Fig. 13

48, is operated when the foot presses down the left hand treadle *l*, as already described. This brings the knife 610 down into the position shown in Fig. 59, and in which position it will be noted that the thread 476 does not touch the cutting edge of the knife 610, because the gripper jaws are closed to hold the thread strand 465, while the strand 476 is free. The gripper jaws being closed, the thread 476 cannot enter between them. A further downward motion of this treadle *l* brings the nose *r* into contact with the projection 33, Fig. 80, lifting the frame 21, and carrying with it its attached parts, including the presser plate. During this motion of the frame 21 the roller 7 slips over the curved face 616 of the projecting end *y*, and during the further lifting movement of the frame 21 the roller lever 8 is not operated. The roller 7 is guided in a straight path back and forth, by means of the slot 617, in the projection 618, which is carried by the upright arm 619 of the frame 21. This dwell of the lever 8 keeps the knife 610 in the position shown in Fig. 59 until the treadle *l* is released. The upward motion of the plate 21, by means of the rod 341, Fig. 4, playing in the slot 342 of the arm 343, throws the knife edged arm 346 into the tension mechanism for the needle thread, thereby opening said tension and allowing said needle thread to be drawn through the needle freely, during the operation of removing the button, which has just been sewed on, from the chuck. At the same time the presser plate is lifted allowing the garment or other fabric to be drawn along for the purpose of sewing on another button. This movement has also moved the gripper opening fingers 370 and 374 from the position shown in Fig. 39 to the position shown in Fig. 45 bringing them very close to the grippers of the twister, as shown in Fig. 57. During this movement the roller 604 has moved from the position shown in Fig. 39, that is to say in engagement with the arm 586, into the position shown in Fig. 45, when the end of the pawl 599 drops behind the roller 604.

Figure 58:
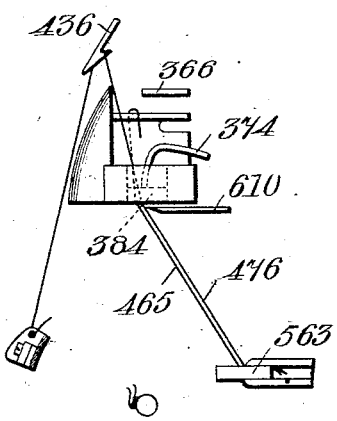
Figure 59:
Figure 60:
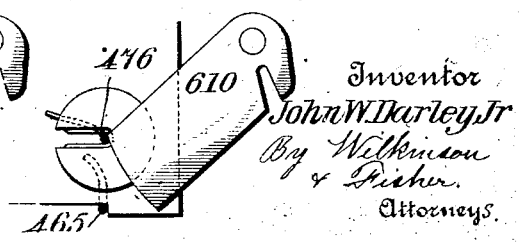

When pressure is removed from the treadle *l*, the presser plate falls and clamps the fabric in position, the movable jaw 18 clamps the new button which has just been introduced into the chuck in position, and the trimmer mechanism, shown in Fig. 48, returns toward its original position, as shown in Fig. 39, still retaining the ends of the thread strands 465 and 476 between the serrations 556 and 567, as shown in Fig. 58. During this movement, the roller 604 rides over the pawl 599, as shown in Fig. 46, throwing the gripper opening fingers 370 and 374 into contact with the grippers of the twister, thus opening them, as shown in Figs. 46 and 58, thus allowing the strand 476 to be drawn in between the grippers, as shown in Figs. 58 and 60. This motion also causes the knife 610 to be depressed still farther from the position shown in Fig. 59 to that shown in Fig. 60. It will be noted that near the pivot 598 of the pawl 599 the roller 604 bears on the part 597 as well as the pawl 599, this is to prevent the roller 604, after it passes the pivot 598, from causing the pawl to lift against the tension of its spring, which would allow the roller 604 to spring back against the lever 586 too early. This part 597 extends beyond the back end of the pawl 599, Fig. 40, so that the time when the rollers 604 springs back against the lever 586 is determined by the part 597, and not by the pawl 599. All this time the trimmer mechanism for the winding thread has been traveling back toward its original position, pulling with it the strands 465 and 476. It pulls the thread strand 476 in between the gripper jaws, and pulls the strand 465 out from between the grippers, as shown in Figs. 58 and 60. This return motion of the trimmer mechanism continues, and just before it reaches its original position the roller 604 passes over the end of the pawl 599, whereupon the spring 608 quickly forces the arm 603 back until the roller 604 strikes the arm 586, quickly bringing the knife 610 back toward its horizontal position, severing the thread strand 476. Just before the knife 610 has severed the thread strand 476, however, the gripper opener fingers 370 and 374 have been drawn back toward their original position sufficiently to allow the grippers to firmly grasp the thread strand 476 so that before the latter is severed the end will be held firmly by said grippers. This condition of affairs is represented in Fig. 61, with the thread strand 476 cut and the end held in the grippers, and with the thread strand 465 pulled out of the loop former. A further backward motion of the trimmer mechanism brings the ram thereof in contact with the stop 538, thus stopping the backward motion of the ram, but the backward motion of the rest of the trimmer mechanism, including the solid portion 547 and its projecting arms 555 and 558, continues, disengaging the serrations 556 from the serrations 567, and releasing the severed ends of the thread strands and the backward motion of the part 547 continues until it strikes the projection 576 on the upper part of the ram, when the backward motion of the entire trimmer mechanism is stopped. At the same time the inclined face 578 contacts with the inclined face 577 of the projection 576, and slips around it, whereupon the spring 554 forces the rear arm of the trigger 552 into connection with the projection 576, thus locking the two main parts of the trimmer mechanism into their original position, as shown in Fig. 47. This backward motion of the part 547 also compresses the spring 550, which is kept under compression until the trigger 552 is released, as already described. The condition of affairs when all of these operations have been completed is shown in Fig. 62, and the two severed ends of the thread strands 465 and 476 can be removed in any suitable way.

In Fig. 66 is shown the button as sewn on, after the needle thread has been trimmed off by hand. In sewing on a button the action of sewing pulls the preceding stitch up tight, in addition to the pulling as caused by the ordinary take up lever 621, Fig. 4. The last loop, however, is oftentimes not drawn tightly into the fabric, and I have provided special means for tightening up this last loop by a quick jerk, best shown in Figs. 1–5. The needle end of the goose neck carries an upright bracket 622, in the end of which is pivoted an arm 623, which is bent downward, as shown at 624 and terminates in a loop 625 through which the needle thread is designed to pass. The arm 623 is firmly fastened to the end of a rod 626, which is revolubly mounted in the bracket 622, and in a similar bracket 627 carried by the end of the standard 152. This bracket 627 is perforated for the passage of the rod 626. To the other end of the rod 626 is firmly fastened an arm 628 adapted to rest upon the top of the rod 283. The weight of the arm 623 keeps the arm 628 always in contact with the rod 283. The bracket 627 is provided with a pin 629 to prevent the arm 628 from falling below the position shown in Fig. 5. When the sewing operation is proceeding the rod 283 is in the position shown in Fig. 8, as already described, and the top thereof is not in contact with the arm 628. When the winding mechanism is thrown into operation, however, the rod 283 moves into the position shown in Fig. 9, and gives a quick upward jerk to the arm 628 causing a quick upward motion of the loop 625 through which the needle thread passes. This quick jerk pulls the loose stitch tight, as the jerk occurs at a point between the needle thread tension and the fabric.

The mechanism for severing and holding the shuttle thread will next be described, reference being had to Figs. 1, 3, 4, 5, 6, 11, and 71 to 76, inclusive. The shaft c, by means of the usual mechanism, shown in Fig. 6, drives the shuttle with a variable motion. On the shaft 60 is mounted a casting 630 provided with a key way 631, in which a spline fixed to said shaft slides, as shown in Fig. 4, thus determining the angular position of said casting on said shaft. The longitudinal position of said casting on said shaft is determined by means of a bolt 632 provided with a tightening handle 633, which works in a slot 634 in the bed plate, Fig. 3, so that the casting can be clamped in either of two positions, the one shown in Fig. 3 being the position in which the knife for the shuttle thread is operative. By shifting the bolt to the other end of the slot this knife is thrown out of action. The bolt 632 passes downward into the slot 635 of the casting 630, as shown in Fig. 4. When the parts are in the position shown in Fig. 3, the slot 636 in the casting 630 is in engagement with the ball 637. This ball 637 is carried near the end of the arm 639 of a bell crank lever, which arm is provided with an extension 638. In this extension is mounted a screw 640, the head of which forms a shoulder, and around the body of this screw is coiled a spring 641, one end of which engages a pin 642, and the other a pin 643. The pin 643 is fastened to the underside of the arm 644 of the main bell crank lever, and the pin 643 is fastened to one arm 645 of another bell crank lever, the angle of which is pivoted on the pin 646 carried by the arm 644, which pin is retained in place by the nut 647. This bell crank lever has its other arm 648 formed to sever and hold the shuttle thread 649. It is formed with a V-shaped slot 650, 651 representing the sharpened severing edge of the knife. This edge 651 is not sharpened on both sides, but is only sharpened on the edge next the throat plate, the other side being designed to catch and hold the shuttle thread. The lower extension 652 is not sharpened, and is for the purpose of discharging the end of one thread before severing a fresh one. The arm 645 is provided with a slightly curved face 653 for coöperation with the corners 654 and 655 of the pawl 656. The pawl 656 is mounted above the arm 644 on a screw 657 fastened in the throat plate. A spring 658, passing around a screw 659 and pin 660 secured to the throat plate, bears against the heel of said pawl, normally holding the same against the pin 661, which limits its movement in one direction. The lever arm 644 is pivoted to the bed plate of the machine by means of a screw 662, and a nut 663, and collar 664 are provided to keep said arm in the proper position in relation to the bed plate.

Above the arm 648, which carries the knife edge, is a spring cutting plate 665 provided with a cutting edge 666. This cutting spring is carried by a screw 667 passing through the arm 644 and held in place by a nut 668. The head of the screw is shown at 669, and it passes through a perforation in the cutting spring 665 through a washer 670 approximately the thickness of the knife arm 648, and through a perforation in the holding spring plate 671, which is roughened on the upper side. The cutting knife 665, and the spring holding plate 671 are held in position by the screw 667 and also by another screw 672 fastened by a nut 673. The head of this screw is shown at 674 and it passes through the knife arm 665, a distance washer 675, and through a perforation in the holding plate 671. The spring knife arm 665, and the spring holding arm 671 are therefore firmly held in fixed position relatively to the arm 644, and the knife arm 648 plays between them. When the C-lever is moved from the position shown in Fig. 5 to the position shown in dotted lines in Fig. 11, in order to start the sewing mechanism into operation, the arm 644 is moved into the position shown in Fig. 71. When the C-lever drops into the position shown in full lines in Fig. 11 to throw the winding mechanism into operation, the arm 644 assumes the position shown in Fig. 72, and when the C-lever drops so that the projection 235 strikes the roller 330, the arm 644 assumes the position shown in Fig. 73.

In the position shown in Fig. 71, the end of the shuttle thread 649 is held between the holding spring plate 671 and the edge of the knife arm 648. When the mechanism is moved into the position shown in Fig. 72, that is, when the sewing operation has stopped, and the winding operation has started, the end of the arm 645 slips on the corner 654, releasing the thread 649, and tilting the knife arm 648 from the position shown in Fig. 71 to that shown in Fig. 72, which accomplishes the release of the thread 649 already referred to. As soon as the winding operation is completed, the arm 645 slips over the corner 654, whereupon the spring 641 throws the knife arm into the position shown in Fig. 73, which, however, does not sever the thread 676 because the arm 645 strikes the corner 655, preventing the knife from completely closing. The sharp snap from the corner 654 to the corner 655 is provided in order to insure the disengagement of the thread 649 from the devices which hold it. As soon as the roller 330 is disengaged from the stop 235, and the C-lever returns to its original position with the lug 267 in contact with the bed plate, the corner 655 passes over the end of the arm 645, and the knife carrying arm 648 falls with a sudden snap under the influence of the spring 641, thus severing the thread 676, but firmly holding the end leading to the shuttle, the arm 644 then assuming the position shown in Fig. 6. If, for any purpose, it is desired to dispense with the operation of this knife, all that it is necessary to do is to loosen the handle 633 and move the stud or pin 632 from the position shown in Fig. 3 to the right hand end of the slot 634. This will move the casting 630 from the position shown in full lines to the position shown in dotted lines in Fig. 71 and disengage the ball 637 from the slot 636 in said casting, and bring the end 678 of the casting in engagement with the downwardly extending projection 677 of the lever arm 644, thus holding all the thread trimming and related parts away from the path of the needle, as shown in Fig. 71.

The button and fabric shifting mechanism used when a four-hole button is sewed on will next be described, reference being had to Figs. 1, 2, 3, 4, 6, 13, 14, 78, 79 and 80. In case a four-hole button is to be sewed on, the nuts 683, Figs. 1 and 4, are loosened so that the spring 679 bearing against the washer 680 can move the frame 21 and the parts carried thereby back so that the needle is in line with the front pair of holes in the button. The nut 681 on the bolt 682 is then released and the screw is moved back, so that when the frame 21 is brought in contact with the inside end of said screw, the rear pair of holes will exactly come in the path of the needle. The spring 679, at one end, bears against the washer 680 which rests against the piece 34 solidly bolted against the horizontal arm 30 of the goose neck, and the other end bears against the frame 21. The piece 34 is slotted at 36 to permit the free vertical movement of the frame 21 when moved by the treadles. The pin 27 on which the ear 31 of the frame 21 is mounted is solidly fastened to the bed plate of the machine, but is provided with a shoulder 685 which furnishes a bearing for the angle of a bell crank lever 686, Fig. 80. The longer arm 687 of this bell crank lever extends from the pin 27 up to the edge of the throat plate, and then a thinner piece 688 Fig. 2 screwed to the upper face of this lever extends over the throat plate. The shorter arm 689 is perforated and passes around a pin 690, which pin projects downwardly from the frame 21, and passes into a slot 691 in the bed plate, Fig. 2. The whole frame 21, and the parts carried thereby swing around the pins 27 and 28 as a center, which pass through the ears 31 and 32 of the frame 21, this frame also having a vertical movement, as already described. In case it is desired to sew on four-hole buttons, the set screw $u$ is loosened, and the sliding cylinder $t$ is moved down until it comes nearly in contact with the upper face of a crooked lever 684. This lever 684 is mounted on the shaft 83, which passes through suitable bearings underneath the base plate, and a strong spring 692 is coiled around said shaft. On said shaft is also mounted a short lever or trigger 693 fastened thereto by a pin 694, which trigger is adapted to strike, when moved by the spring 692, against the end of a horizontal sliding arm 695, which is connected to the arm 687 of the bell crank lever, which is mounted on the pin 27, Figs. 6 and 80.

To hold the button shifting mechanism locked until half the required number of stitches have been passed through the front pair of holes, the shaft 83 is provided with a sleeve 696, which has a projection to which is screwed the plate 697 cut away as shown in Fig. 6. The lever arm 108 has a projecting portion 698 cut away at the corner, which acts as a pawl to engage and hold the part 697 when it is thrown up by the rotation of the shaft 83. Thus the button shifting mechanism will be locked against operation until half the required number of stitches have been made, when the three-armed slide 88 will strike the pin 105 and swing the pawl out of engagement with the part 697, whereupon the shaft 83 will be partially revolved and the trigger 693 will strike a sharp blow against the sliding arm 695 moving the lever 687 forward, and with it the frame 21 and the parts carried thereby, until the motion of the frame 21 is stopped by striking the end of the screw 682, in which position the stitches will be passed through the rear pair of holes in the button.

The means for throwing out of operation the knife for severing the shuttle thread has already been described. To throw the knife carried by the trimmer mechanism out of operation it is only necessary to lift the arm 591 so that the projection 592 thereon will be disengaged from the hook 589 and throw the parts into the position shown in Fig. 40, and in which case there will be nothing to cause the reciprocation of the trimmer mechanism. When this is done, the lever 594 throws the pawl 599 out, as shown in Fig. 40, so that the roller 604 cannot engage the end thereof, but passes under it, and is always in contact with the arm 586. This prevents the gripper opener fingers 370 and 374 from operating upon the grippers in the twister, and so releasing the end of the thread therefrom, and in this condition of affairs the knife 610 never passes below the position shown in Fig. 59.

If desired, the winding and knotting mechanisms may both be thrown out of operation together. This is accomplished in the following way, reference being had to Figs. 1, 2, 3, 5, 6, 7, 8, 9, 10, 11, 16, 17, and 77. As already described, the arm 327 has attached to it a wire, 329, which, as shown at 526, is bent downwardly nearly parallel to the curve of the switch cam 131. When the pin 253, Fig. 77, is shifted into the zero position, as shown on the left this swings the projection 247 to the right, striking the pivoted piece 236 and moving it aside so that it will not be struck by the projection 235 on the C-lever when the latter falls. The sidewise movement of the pivoted arm 236 also brings the roller 330 from out of the path of the projection 235 by the following means. To the arm 236, Fig. 7, is rigidly fastened a bar 699 to which is pivoted a wire 700, which passes through a perforated bracket 701 on the standard 152, and is then bent upward, passing around the arm 327. Under ordinary conditions the movement of the arm 236 around its supporting pin, while, of course, it moves the wire 700, does not move it far enough to move the arm 327, and it is only when the pin 253 is in the zero hole causing the movement of the arm 236 to occur through a wide arc, that the movement of the wire 700 is great enough to cause a movement of the arm 327. When the index pin of the winding mechanism is set in the zero hole, however, this movement of the arm 236 is great enough to cause the backward movement of the arm 327, which carries with it the arm 328, as they are both fastened to the same frame, and removes the roller 330 from out of the path of the stop 235. In other words, the C-lever is free to fall from the position shown in dotted lines in Fig. 11, to the off position, as shown in Fig. 5, since the arm 236 and the roller 330 are moved entirely out of the path of the stop 235. The pulling back of the arm 327 also pulls back the bent wire 526 bringing it in the path of the lever 276, Fig. 16, throwing the switch 270 in the switch cam 131 so that the pin 148 cannot move into the winding position, as shown in section in Fig. 17, because the lever 276 has struck the wire 526 throwing the switch cam into the position shown in dotted lines in Fig. 17, whereupon the pin passes from the position 278 to the position 277 without stopping, and without moving the parts into the winding position. Consequently the winding mechanism is never unlocked and never driven. Furthermore, the knot-tying mechanism is never unlocked and never operated, because the roller 330 is always held out of the path of the stop 235 and therefore the clutch mechanism, which throws the power mechanism into connection with the knot-tying mechanism, is never operated. Consequently the sewing mechanism alone operates.

To render the first part of the winding operation easy, it may be explained that when the winding begins the parts 436 and 189 are in the position shown in Fig. 62. The hook 436 then moves into the position shown in dotted lines in Fig. 63, and as the winding progresses the thread pulls off of the hook 436, which is slightly bent so that its sides make about an angle of 30° with the axis of the loop former sleeve 350, as shown in Fig. 61, over the horn of the loop former into the position shown in Fig. 63, thus rendering it easier to start the winding. As the winder begins to rotate the vertical knife edge 201 comes around and cuts the needle thread, which extends from the button, which has just been sewed on, or which is held by the hand of the operator in sewing on the first button.

It is thought that the operation of the machine will be evident from the foregoing description, but a brief general description of the operation will be given. The lefthand treadle is pressed down, which opens the button chuck, trims the winding thread of the button that has just been sewed on, lifts the presser plate, opens the tension of the needle thread, whereupon a fabric may be moved under the presser plate, and a new button placed in the chuck. The left hand treadle is released, whereupon the button chuck closes and the presser plate drops, firmly holding the button and the fabric in their proper relative positions. While the left hand treadle is depressed, the other treadle cannot be depressed, thus preventing mistakes on the part of the operator. After the left hand treadle has been released the other treadle is pressed down, bringing the sewing mechanism into operation. The sewing mechanism then finishes its allotted work. Just before the sewing operation is finished, the C-lever drops, the sewing operation being finished by inertia, and the winding mechanism is thrown into operation, the sewing mechanism being at the same time locked. It may be said in passing that while the sewing mechanism is doing its work, the winding and knot-tying mechanisms are also locked. Just before the winding mechanism finishes its work, the C-lever again drops, the winding mechanism going on by inertia to finish its work, whereupon it and the sewing mechanism are locked, and the knot-tying mechanism is brought into operation. The knot-tying mechanism then ties a double square knot in the winding thread, and when it has finished its work the right hand treadle may be brought back to its original position, it having been locked until the knot-tying mechanism had very nearly completed its work. The right hand treadle, during all this time, has, of course, locked the left hand treadle so that it cannot be operated at the improper time, thus avoiding mistakes. Just before the knot-tying mechanism has finished its work, the severing mechanism, beneath the bed plate, has cut the shuttle thread. The right hand treadle may then be brought back to its original position, and the left hand treadle can then be depressed, which operation operates the trimming mechanism for the winding thread, again raises the presser plate and opens the button chuck, whereupon the fabric may be again adjusted, and the old button pulled from the chuck, and a new button inserted, after which the operation is repeated.

The description just given applies to the sewing on of a two-hole button. It applies substantially to the sewing on of a four-hole button, with the exception that during the middle of the sewing operation, after the needle has passed half the total number of stitches through the front pair of holes, the garment and the button are automatically shifted so as to bring the rear pair of holes in the path of the needle. When a fresh bobbin 176 is placed on the winding mechanism, its end is to be passed through the tension, various thread guides and hole 190. The left pedal being depressed its full amount the trigger 552 strikes the button chuck releasing the ram 574, the left pedal being held down, a sufficient length of thread is drawn beyond the hole 190 to pass slightly beyond the point of the horn 367, back through the slots 375 and 376, its end being held by the right hand of the operator a little to the right of the button chuck, the operator's left hand at the same time holding the portion which passes beyond the horn 367, the left pedal being released, the grippers open, allowing the thread strand to enter, then close and the knife 610 rises severing the thread strand leading to the operator's right hand. The hook 436 is then moved forwardly by hand and hooked with the thread, when the parts are as is shown in Fig. 62, the thread strands 465 and 476 being absent.

While I have thus described my invention, I wish it to be distinctly understood that I do not limit myself to the details described and shown, as it is obvious that these details might be varied in many different ways, and many of the functions described could be omitted without departing from the principle of my invention, or without seriously impairing the usefulness of the machine. The gist of my invention is the provision of mechanisms which will sew a button onto a fabric separated therefrom by a neck of thread, which will wind a thread around said neck of thread, will double knot the winding thread, or secure it in any suitable manner, and will trim off the various threads, at the same time providing means preventing the interference of these mechanisms with each other, and providing means for throwing out of operation various parts of the machine, and for determining the extent of the operation, more especially the winding and sewing operations. I believe that I am the first to produce a machine which will accomplish these results, and I wish to cover these results and functions broadly in this application.

I claim—

1. In a button sewing machine, the combination of winding mechanism, sewing mechanism and means for tying a knot in the winding thread, substantially as described.

2. In a button sewing machine, the combination of winding mechanism, sewing mechanism and means for securing the winding thread after it has been wound around the neck of thread holding the button to a fabric, substantially as described.

3. In a button sewing machine, the combination of winding mechanism, sewing mechanism and means for securing both ends of the winding thread which is wound around the neck of thread securing a button to a fabric, substantially as described.

4. In a button sewing machine, the combination of winding mechanism, sewing mechanism, means for securing the winding thread and means for trimming the same, substantially as described.

5. In a button sewing machine, the combination of winding mechanism, sewing mechanism, means for tying a knot in the winding thread, and means for trimming the same after the knot has been tied, substantially as described.

6. In a button sewing machine, the combination of sewing mechanism, winding mechanism, means for tying a knot in the winding thread, and means for throwing said means out of operation when desired, substantially as described.

7. In a button sewing machine, the combination of winding mechanism, sewing mechanism and means for gripping the end of the winding thread for forming a loop therein, and for drawing said loop tight, substantially as described.

8. In a button sewing machine, the combination of winding mechanism, sewing mechanism and means for gripping the end of the winding thread, and means for forming a knot in said thread, substantially as described.

9. In a button sewing machine, the combination of winding mechanism, sewing mechanism, means for holding the end of the winding thread, means for forming a loop in said thread, means for drawing said loop tight, and means for forming another loop in said thread and drawing it tight, thereby forming a knot, substantially as described.

10. In a button sewing machine, the combination of winding mechanism, sewing mechanism, means for holding the end of the winding thread, means for twisting one strand of said thread over the other thereby forming a loop, means for drawing said loop tight, and means for twisting said strands a second time to form a second loop, and means for drawing said second loop tight, thereby tying a knot, substantially as described.

11. In a button sewing machine, the combination of winding mechanism, knot-tying mechanism, and means for throwing the same out of operation when desired, and trimming mechanism substantially as described.

12. In a button sewing machine, the combination of sewing mechanism, winding and knot-tying mechanism, means for starting the latter in operation, and means locking the sewing mechanism until said winding and knot-tying mechanism has finished its operation, substantially as described.

13. In a button sewing machine, the combination of sewing mechanism, winding mechanism, knot-tying mechanism, operating means therefor, and means for starting said operating means at the proper time, substantially as described.

14. In a button sewing machine, the combination of sewing mechanism, winding mechanism, knot-tying mechanism and means for automatically stopping said knot-tying mechanism after the knot has been tied, substantially as described.

15. In a button sewing machine, the combination of winding mechanism, mechanism for tying a knot in the winding thread, tension devices and means for opening said tension devices at the beginning of the knot-tying operation, substantially as described.

16. In a button sewing machine, a knot-tying mechanism consisting of a hook, loop former, twister and tightener combined with means for driving the same, substantially as described.

17. In a button sewing machine, the combination of a hook, loop former, twister and tightener, a lever for driving each of said parts, cam faces for operating said levers, and means for operating said cam faces.

18. In a button sewing machine, the combination of winding mechanism, a loop former, means for gripping the end of the winding thread carried by said loop former, and means for drawing up a thread strand into the loop former, substantially as described.

19. In a button sewing machine, the combination of winding mechanism, a loop former, means for gripping the end of the winding thread in said loop former, means for drawing the winding thread into said loop former, and means for twisting the winding thread, thereby forming a loop, substantially as described.

20. In a button sewing machine, the combination of winding mechanism, a loop former, means carried by said loop former for gripping the end of the winding thread, means for drawing the winding threads into said loop former, means for twisting the strands of the winding thread to form a loop, and means for turning the loop former to deliver the loop, substantially as described.

21. In a button sewing machine, the combination of winding mechanism, a loop former, means carried thereby for gripping the end of the winding thread, means for drawing the strands of said winding thread into the loop former, means for twisting said strands to form a loop, means for turning said loop former to deliver the loop, and tightener mechanism for drawing the loop tight, substantially as described.

22. In a button sewing machine, the combination of winding mechanism, a loop former, means carried thereby for gripping the end of the winding thread, means for drawing the strands of the winding thread into said loop former, means for properly guiding the strands of thread, means carried by said loop former for twisting said strands to form a loop, means for turning said loop former to deliver the loop, means for tightening the loop so formed, and means for turning the loop former back to its original position, substantially as described.

23. In a button sewing machine, the combination of winding mechanism, a slotted loop former, grippers carried by said loop former for securing the end of the winding thread, a slotted casing carrying said grippers, means for drawing the strands of the winding thread into said slots, and means for keeping said slots always in alinement with each other except when the strands of the winding thread are twisted to form a loop, substantially as described.

24. In a button sewing machine, the combination of winding mechanism, a slotted loop former, means carried thereby for gripping the end of the winding thread, means for drawing the strands of the winding thread into the slot in the loop former, and means for positively guiding said strands into said slot, substantially as described.

25. In a button sewing machine, the combination of winding mechanism, a slotted loop former, means carried thereby for gripping the ends of the winding thread, means for drawing the strands of said winding thread into the slot in the loop former, means for positively guiding said strands into said slot, and means for twisting said strands to form a loop, substantially as described.

26. In a button sewing machine, the combination of winding mechanism, a slotted loop former, gripping and twisting means carried thereby, means for drawing the strands of the winding thread into the slot of the loop former, means for positively guiding said strands into said slot, and means for drawing the loop tight after it has been formed, substantially as described.

27. In a button sewing machine, the combination of winding mechanism, a slotted loop former, gripping means carried thereby for holding one end of the winding thread, means for drawing the strands of said thread into the slot of the loop former, means for twisting said strands to form a loop, and means for drawing the loop tight after it has been formed, and operating means, substantially as described.

28. In a button sewing machine, the combination of winding mechanism, a loop former, means for holding one end of said winding thread, means for forming a loop in said winding thread, means for tightening said loop, and means for holding said loop tightened while the second loop is being formed, substantially as described.

29. In a button sewing machine, the combination of winding mechanism, a loop former, means for holding one end of the winding thread tight, means for drawing the strands of the winding thread into said loop former under a light tension, means for forming a loop, means for drawing the loop tight, at the same time shifting the tension upon said thread from a light tension to a heavier tension, substantially as described.

30. In a button sewing machine, the combination of winding mechanism, means for forming a loop in the winding thread, means for drawing said loop tight, and means for forming a second loop in the winding thread and drawing said second loop tight, substantially as described.

31. In a button sewing machine, the combination of winding mechanism, means for forming a loop in the winding thread, means for drawing said loop tight, means for holding said loop in its tightened condition, and means for forming and tightening a second loop in the winding thread on top of said first named loop, whereby a square knot is formed, substantially as described.

32. In a button sewing machine, the combination of winding mechanism, a loop former, means for drawing the strands of the winding thread into said loop former under tension, means for twisting said strands to form a loop, means for drawing said loop tight, and an automatically operating clamp which catches one of the strands of the winding thread during the operation of the tightening mechanism, and throws a heavier tension upon said strand, thereby drawing it tight, substantially as described.

33. In a button sewing machine, the combination of winding mechanism, a loop former, means for drawing the strands of the winding thread into said loop former under tension, means for drawing tight the loop formed by the loop former, an automatically operating clamp engaging one of the strands of said winding thread during the tightening operation to throw a heavier tension upon said strand, and means for holding the loop tight after it has once been tightened, substantially as described.

34. In a button sewing machine, the combination of winding mechanism, a revoluble loop former, means carried thereby for gripping one end of the winding thread, means for drawing the strands of the winding thread into said loop former, means for twisting said strands to form a loop, means for turning said loop former to deliver the loop thus formed, tightening mechanism adapted to receive said loop and draw it tight, and means for releasing the tension devices acting on the winding thread before said loop former begins its operation, substantially as described.

35. In a button sewing machine, the combination of winding mechanism, knot-tying mechanism, and means for releasing the tension on the winding thread during the operation of the knot-tying mechanism, substantially as described.

36. In a button sewing machine, the combination of winding mechanism, a loop former, gripping means carried thereby for holding one end of the winding thread, means for releasing the tension upon the winding thread before the action of said loop former, means for operating said loop former to form a loop, and means for drawing said loop tight, substantially as described.

37. In a button sewing machine, the combination of winding mechanism, a loop former, means for releasing the tension upon the winding thread, means operating said loop former to form successive loops, and means for drawing said loops tight, thereby forming a knot, substantially as described.

38. In a button sewing machine, the combination of winding mechanism, a loop former, means carried thereby for gripping one end of the winding thread, means for operating said loop former to form a loop, means for drawing said loop tight, said last named means including an automatically operating clamp which firmly grips one strand of said winding thread, whereby the loop formed may be drawn tight around the neck of thread securing the button to the fabric, substantially as described.

39. In a button sewing machine, the combination of winding mechanism, a loop former, means for operating said loop former to form a loop, means for tightening said loop including a clamp to grip one of the thread strands, and automatically operating means for causing said clamp to grip said thread strand, substantially as described.

40. In a button sewing machine, the combination of winding mechanism, means for loosening the tension of the winding thread, a loop former, means carried thereby for gripping one end of said winding thread, means for drawing the strands of said thread into said loop former, means for twisting said strands to form a loop, tightening mechanism to draw said loop tight, and means for turning said loop former at the proper time to deliver said loop to said tightening mechanism, substantially as described.

41. In a button sewing machine, the combination of winding mechanism, a slotted loop former, a slotted casing carried thereby, means for causing the slot in said casing and the slot in said loop former to remain in line with each other at certain times, means for drawing the strands of the winding thread into said loop former, means for turning said casing to twist said strands, thereby forming a loop, and means for tightening the loop thus formed, substantially as described.

42. In a button sewing machine, the combination of winding mechanism, a slotted loop former, a slotted casing carried thereby, spring operated grippers in said casing to hold one end of the winding thread, means for drawing the strands of the winding thread into the said loop former, means for turning said casing to form a loop, means for guiding the thread into said slots, means for keeping the slot in said casing in line with the slot in said loop former at certain times, and means for drawing the loop formed by said twisting operation tight, substantially as described.

43. In a button sewing machine, the combination of a loop former, tightener mechanism for drawing the loop made by said loop former tight, means for turning the loop former to deliver said loop to said tightening mechanism, and means for advancing said tightening mechanism to seize the loop and then withdrawing said tightening mechanism to draw the loop tight, substantially as described.

44. In a button sewing machine, the combination of a loop former, tightening mechanism for the loop made by said loop former, means for turning said loop former to deliver said loop to said tightener mechanism, means for advancing said tightener mechanism to seize said loop and for withdrawing said tightener mechanism to draw said loop tight, and means for holding said loop fast after it has been tied, substantially as described.

45. In a button sewing machine, the combination of a loop former, tightening mechanism to draw the loop made by said former tight, means for turning said loop former to deliver the loop to said tightening mechanism, means for advancing said tightening mechanism to seize said loop and then withdrawing it to draw said loop tight, and means for returning the parts named to their original position, substantially as described.

46. In a button sewing machine, the combination of a slotted loop former, a slotted casing carried thereby containing grippers for holding one end of the winding thread, means for drawing the strands of the winding thread into said loop former, means for twisting said strands to form a loop, means for keeping the slot in said casing always in alinement with the slot in said loop former except during the twisting operation, means for turning said loop former to deliver the loop, tightening mechanism, and means for causing said tightening mechanism to advance and seize the loop and then withdraw and tighten the loop, automatically increasing the tension on said winding thread at the same time, substantially as described.

47. In a button sewing machine, the combination of a slotted loop former, a slotted twister carried by said loop former, grippers carried by said twister and adapted to hold one end of the winding thread, means for keeping the slot in said twister always in alinement with the slot in said loop former except during the twisting operation, means for drawing the strands of the winding thread into said loop former and twister, means for positively guiding said strands thereinto, means for revolving said twister, thereby forming a loop, means for withdrawing said guides, means for partially rotating said loop former to deliver the loop formed by the twister, tightening mechanism, means for causing said tightening mechanism to advance and seize the loop and then return and tighten the loop, and means for increasing the tension on the winding thread while the loop is being tightened, substantially as described.

48. In a button sewing machine, the combination of winding mechanism, means for releasing the tension on the winding thread, a slotted loop former, a slotted twister, grippers carried by said twister for holding one end of the winding thread, means for keeping the slot in said twister always in alinement with the slot in said loop former, except during the twisting operation, means for turning said twister to form a loop, means for partially rotating said loop former to deliver the loop thus formed, tightening mechanism, means for causing said tightening mechanism to advance and seize the loop and then retreat and tighten the loop, and means for increasing the tension on the thread as the loop is being tightened, substantially as described.

49. In a button sewing machine, the combination of winding mechanism, a slotted loop former, a slotted twister carried thereby, grippers carried by said twister to secure one end of the winding thread, means for keeping the slot in said twister always in alinement with the slot in said loop former, except while the twisting operation is going on, means for releasing the tension on the winding thread, means for drawing the strands of the winding thread into said slots, means for positively guiding said strands into said slots, tightening mechanism, means for partially rotating said loop former to deliver the loop, means for causing the tightening mechanism to advance and seize the loop and then retreat and draw the loop tight, an automatic clamp for seizing one strand of the winding thread during the tightening operation, and means for increasing the tension upon said strand after the tightening operation has commenced, substantially as described.

50. In a button sewing machine, the combination of winding mechanism a slotted loop former, a slotted twister carried thereby and provided with grippers adapted to hold one end of the winding thread, means for keeping the slot in the twister always in alinement with the slot in the loop former except during the twisting operation, means for loosening the tension on the winding thread, a hook for drawing the strands of the winding thread into said slots, positive means for guiding said strands into said slots, tightening mechanism, means for operating said twister to form a loop, means for partially rotating said loop former to deliver the loop so formed, means for causing said tightening mechanism to advance and seize the loop thus formed, and then to retreat thereby tightening the loop, an automatic clamp for seizing one strand of the winding thread during the tightening operation and thereby increasing the tension upon said strand, means for keeping said loop tight, after it has once been drawn up, and means for restoring the parts to their original positions, substantially as described.

51. In a button sewing machine, the combination of winding mechanism, a slotted loop former, a slotted twister carried thereby and provided with grippers adapted to hold the end of the winding thread, means for drawing the strands of the winding thread into said slots, means for operating the twister to form a loop, means for partially rotating the loop former to deliver the loop thus formed, tightening mechanism, means for causing said tightening mechanism to advance and seize the loop and then retreat and tighten the loop, an automatic clamp for seizing one strand of the winding thread during the tightening action and thereby shifting from a light tension to a heavy tension, means for holding said loop against loosening, and means for repeating said operations, thereby forming a second loop and tightening it to form a square knot, substantially as described.

52. In a button sewing machine, the combination of winding mechanism and a loop former comprising a slotted central piece, a projecting horn and projecting thread guides, substantially as described.

53. In a button sewing machine, the combination of winding mechanism and a loop former comprising a slotted central piece, a horn, and thread guides in combination with a slotted twister carried in said loop former, said twister being provided with grippers adapted to hold one end of the winding thread, substantially as described.

54. In a button sewing machine, a loop former comprising a slotted central piece, a horn, thread guides, a slotted twister mounted therein, and spring operated grippers in said twister for holding one end of the winding thread, substantially as described.

55. In a button sewing machine, the combination of winding mechanism and a twister consisting of a casing slotted for the passage of the winding thread, and also slotted for the passage of the gripper opening fingers, spring operated grippers in said casing, and a gear wheel attached to one end of said casing, substantially as described.

56. In a button sewing machine, an automatic clamp for seizing the thread during the knot-tying operation, consisting of two jaws, a spring bearing against one of said jaws, and a roughened pin fastened in one of said jaws and entering a slot in the other jaw, substantially as described.

57. In a button sewing machine, the combination of sewing mechanism, winding mechanism, and a tension device operating on the winding thread, consisting of a supporting pin, a lever and disk mounted on said pin, a spring surrounding said pin and pressing said disk against the winding thread, and an arm for acting on said lever to cause it to release said thread from the pressure of said disk, substantially as described.

58. In a button sewing machine, tightener mechanism consisting of a movable support, a shaft revolubly mounted in said support, a spring surrounding said shaft, and a hook attached to the lower portion of said shaft, substantially as described.

59. In a button sewing machine, tightener mechanism composed of a movable support, a shaft pivotally mounted in an extension of said support, a spring surrounding said shaft and tending to rotate it, means for varying the tension of said spring, a hook movable with the lower portion of said shaft, and thread guides also movably connected with said shaft, substantially as described.

60. In a button sewing machine, the combination of a slotted loop former, a slotted twister carried thereby, means for causing the slot in said twister to remain in alinement with the slot in said loop former all the time except during the twisting operation, means for operating said twister, and means for stopping the said twister at the exact instant when a complete revolution or revolutions has been made, substantially as described.

61. In a button sewing machine, the combination of a slotted loop former, a slotted twister carried thereby, means for keeping the slot in said twister in alinement with the slot in said loop former except during the twisting operation, means for operating the twister, and means preventing the stopping of the motion of said twister except at the end of a complete revolution or revolutions, substantially as described.

62. In a button sewing machine, the combination of a loop former, a twister provided with grippers carried thereby, a hook for drawing the strands of the winding thread into said loop former and twister, a lever for operating said twister to form the loop, a lever for rotating the loop former to deliver the loop thus formed, tightener mechanism, a lever for causing the tightener mechanism to advance and seize the loop and then retreat and tighten the loop, and operating cam faces for said levers, substantially as described.

63. In a button sewing machine, the combination of winding mechanism, means for tying a knot in the winding thread, means for trimming the winding thread after the knot has been tied, and means for cutting off the excess of winding thread leading from the knot-tying mechanism to the trimming mechanism, substantially as described.

64. In a button sewing machine, the combination of winding mechanism, means for tying a knot in the winding thread including means for gripping said winding thread, means for trimming the strands of the winding thread after the knot has been tied, and means for cutting off the excess of winding thread leading from the knot-tying mechanism to the trimming mechanism, but leaving the end of the winding thread secured, substantially as described.

65. In a button sewing machine, the combination of winding mechanism, knot-tying mechanism, trimming mechanism and means operated by the foot of the operator to bring said trimming mechanism into operation, substantially as described.

66. In a button sewing machine, the combination of a supporting frame, knot-tying mechanism carried thereby, trimming mechanism also carried thereby, and means for lifting said frame and operating said trimming mechanism when the knot-tying operation is finished, substantially as described.

67. In a button sewing machine, the combination of a supporting frame, a presser plate carried thereby, knot-tying and trimming mechanism also supported thereby, and means for simultaneously lifting said presser plate and operating said trimming mechanism after the knot has been tied, substantially as described.

68. In a button sewing machine, the combination of knot-tying mechanism, operating means therefor, and locks preventing interference with said knot-tying mechanism after it has once started until it has finished its work, substantially as described.

69. In a button sewing machine, the combination of a supporting frame, knot-tying mechanism carried thereby, a presser plate supported on said frame, trimming mechanism resting on said supporting plate, means for simultaneously raising said presser plate and operating said trimming mechanism, and means preventing the lifting of said presser plate until the knot-tying operation has been finished, substantially as described.

70. In a button sewing machine, the combination of sewing mechanism, winding mechanism, knot-tying mechanism, and means for throwing the last two mechanisms out of operation when desired, substantially as described.

71. In a button sewing machine, the combination with winding mechanism, knot-tying mechanism, and an automatic lock preventing the operation of the knot-tying mechanism until the winding mechanism has finished its operation, substantially as described.

72. In a button sewing machine, the combination of winding mechanism, knot-tying mechanism and trimming mechanism, with means for preventing the operation of the last two mechanisms named until the winding mechanism has finished its operation, substantially as described.

73. In a button sewing machine, the combination of winding mechanism, knot-tying mechanism, and means for preventing the operation of the winding mechanism after the knot-tying mechanism has once begun its work until the knot-tying operation has finished, substantially as described.

74. In a button sewing machine, the combination of winding mechanism, knot-tying mechanism, trimming mechanism, with means for preventing the operation of the trimming and winding mechanisms until the knot-tying is finished, after the knot-tying mechanism has commenced its operation, substantially as described.

75. In a button sewing machine, the combination of sewing mechanism, winding mechanism and knot-tying mechanism, substantially as described.

76. In a button sewing machine, the combination of sewing mechanism, winding mechanism, knot-tying mechanism, and means for trimming the winding thread after the knot has been tied, substantially as described.

77. In a button sewing machine, the combination of sewing mechanism including a shuttle, winding mechanism, knot-tying mechanism, and separate means for severing the shuttle thread, the winding thread, and the needle thread at the proper times, substantially as described.

78. In a button sewing machine, the combination of sewing mechanism, winding mechanism, knot-tying mechanism and trimming mechanism, with means for throwing the winding mechanism, knot-tying mechanism and trimming mechanism out of operation when desired, substantially as described.

79. In a button sewing machine, the combination of sewing mechanism, winding mechanism, knot-tying mechanism and automatically operated locks preventing the interference of said mechanisms with each other after the machine has been properly adjusted at the start, substantially as described.

80. In a button sewing machine, the combination of sewing mechanism, winding mechanism, knot-tying mechanism and trimming mechanism, with means for compelling the successive operation of said mechanisms in the order named, substantially as described.

81. In a button sewing machine, the combination of sewing mechanism, winding mechanism, knot-tying mechanism, automatic means locking the winding and knot-tying mechanisms until the sewing mechanism has finished its operation, automatic means for locking the sewing mechanism when the winding mechanism is in operation, and automatic means for locking both the sewing mechanism and the winding mechanism against operation until the knot-tying operation is finished, substantially as described.

82. In a button sewing machine, the combination of sewing mechanism, winding mechanism, knot-tying mechanism, and trimming mechanism with means compelling the operation of said mechanisms in the order named after the machine has once been adjusted and started, and means locking each of said mechanisms against operation as soon as it has finished its allotted work, and for keeping said means locked until the whole cycle of operations has been performed, substantially as described.

83. In a button sewing machine, the combination of a constantly running source of power, sewing mechanism, winding mechanism, knot-tying mechanism, means for bringing said driving means successively into action so as to drive said mechanisms successively in the order named, and locks preventing the operation of all of said mechanisms excepting one at a time, substantially as described.

84. In a button sewing machine, the combination of a constantly running driving shaft, sewing mechanism, winding mechanism, knot-tying mechanism, and trimming mechanism with locks preventing the operation of all of said mechanisms except one at a time, substantially as described.

85. In a button sewing machine, the combination of a constantly running driving shaft, sewing mechanism, winding mechanism, knot-tying mechanism, and trimming mechanism, means for compelling the sewing mechanism, winding mechanism and knot-tying mechanism to automatically perform their functions in the order named after the machine has once been properly adjusted and started, and locks preventing the operation of more than one of said mechanisms at a time, substantially as described.

86. In a button sewing machine, the combination of a constantly running driving shaft, sewing mechanism, winding mechanisms, knot-tying mechanism, and automatic means for successively stopping the sewing mechanism, starting the winding mechanism, stopping the winding mechanism, starting the knot-tying mechanism and stopping the same, after the machine has once been adjusted and started by throwing the sewing mechanism into operative relation with the driving shaft, substantially as described.

87. In a button sewing machine, the combination of a constantly running driving shaft, sewing mechanism, winding mechanism, and knot-tying mechanism, with a treadle and connections for causing said sewing-mechanism to be operatively connected with said driving shaft, and means operating automatically after said connection has been made to successively stop the sewing mechanism, start the winding mechanism, stop the winding mechanism, start the knot-tying mechanism, and stop the same, substantially as described.

88. In a button sewing machine, the combination of a constantly running driving shaft, sewing mechanism, winding mechanism and knot-tying mechanism with a treadle and connections for throwing the sewing mechanism into operative relation with the driving shaft, means automatically operated for successively stopping the sewing mechanism, starting the winding mechanism, stopping the winding mechanism, and stopping the same at the proper times and holding said mechanisms locked at the end of the knot-tying operation until said treadle has been restored to its original position, substantially as described.

89. In a button sewing machine, the combination of sewing mechanism, winding mechanism, knot-tying mechanism, trimming mechanism and means preventing the operation of the trimming mechanism until the knot-tying mechanism has finished its work, substantially as described.

90. In a button sewing machine, the combination of winding mechanism, knot-tying mechanism, and trimming mechanism, means for preventing the operation of the trimming mechanism until the knot-tying mechanism has finished its work, and means for preventing the operation of the knot-tying mechanism until the winding mechanism has finished its work, substantially as described.

91. In a button sewing machine, the combination of trimming mechanism, knot-tying mechanism, winding mechanism, and sewing mechanism, with means for preventing the operation of the trimming mechanism until the knot-tying mechanism has finished its work, means for preventing the operation of the knot-tying mechanism until the winding mechanism has finished its work, and means for preventing the operation of the winding mechanism until the sewing mechanism has finished its work, substantially as described.

92. In a button sewing machine, the combination of trimming mechanism, knot-tying mechanism, winding mechanism, and sewing mechanism, with means for preventing the operation of the trimming mechanism until the knot-tying mechanism has finished its work, means for preventing the operation of the knot-tying mechanism until the winding mechanism has finished its work, means for preventing the operation of the winding mechanism until the sewing mechanism has finished its work, and means for preventing the renewed operation of the sewing mechanism after this cycle of operations has been commenced and before it has been finished, substantially as described.

93. In a button sewing machine, the combination of winding mechanism, knot-tying mechanism and means for trimming the knotted end of the winding thread, substantially as described.

94. In a button sewing machine, the combination of winding mechanism, knot-tying mechanism, and means for trimming the winding thread after the same has been knotted and simultaneously opening the button chuck, and said chuck said means being operated by the foot of the operator, substantially as described.

95. In a button sewing machine, the combination of winding mechanism, knot tying mechanism, and means for trimming the winding thread and simultaneously opening the button chuck and lifting the presser plate, said means being operated by the foot of the operator, and said chuck and said presser plate substantially as described.

96. In a button sewing machine, the combination of a button chuck, trimming mechanism, and means for simultaneously opening the button chuck and operating the trimming mechanism, substantially as described.

97. In a button sewing machine, the combination of a presser plate, trimming mechanism carried thereon, a button chuck, and means for simultaneously lifting said presser plate, operating said trimmer mechanism and opening said button chuck, substantially as described.

98. In a button sewing machine, the combination of a presser plate, trimming mechanism, a button chuck, and means for simultaneously lifting said presser plate, operating said trimming mechanism, and opening said button chuck, substantially as described.

99. In a button sewing machine, the combination of a presser plate, trimming mechanism, a button chuck, a frame supporting the three parts named, and means operated by the foot of the operator to lift said frame and simultaneously lift said presser plate, operate said trimming mechanism, and open said button chuck, substantially as described.

100. In a button sewing machine, the combination of a supporting frame, a presser plate carried thereby, trimming mechanism supported by said presser plate, and a button chuck supported by said supporting frame, and means operated by the foot of the operator to simultaneously lift said presser plate, operate said trimming mechanism and open said button chuck, said means including a treadle operated by the operator's foot, a lever adapted to strike said supporting frame, and connections between said lever and the trimmer mechanism and button chuck, whereby all of said operations are accomplished by a downward pressure on the treadle sufficient to cause said treadle to move the full distance permitted by the arrangements of the machine, substantially as described.

101. In a button sewing machine, the combination of a movable supporting frame, knot-tying mechanism carried thereby, a presser plate also carried thereby, trimming mechanism supported on said presser plate, a button chuck carried by said supporting frame, means for lifting said supporting frame by the foot of the operator, and connections between said lifting means and said button chuck and trimming mechanism, whereby the action of the lifting means lifts all the other parts named, actuates the trimming mechanism and opens the button chuck, substantially as described.

102. In a button sewing machine, the combination of sewing mechanism, winding mechanism, knot-tying mechanism and trimming mechanism, a constantly running driving shaft, a treadle and connections whereby the movement of said treadle puts the sewing mechanism into operative connection with the driving shaft, automatic means compelling the successive operation of said mechanisms in the order named after the sewing mechanism has been started, a treadle for operating the trimming mechanism, and locking means between said treadles, whereby neither of said treadles can be operated unless the other one is in its normal position, substantially as described.

103. In a button sewing machine, the combination of a treadle for starting the machine in operation to sew on a button, trimming mechanism to cut the thread after the button has been completely sewed on, a treadle for operating each of said mechanisms, and means preventing the operation of either of said treadles unless the other treadle is in its normal position, substantially as described.

104. In a button sewing machine, the combination of sewing mechanism, winding mechanism, knot-tying mechanism and common means for locking the winding mechanism when the sewing mechanism is in operation, locking the sewing mechanism while the winding mechanism is in operation, and locking both the sewing and the winding mechanism against operation during the operation of the knot-tying mechanism, substantially as described.

105. In a button sewing machine, the combination of winding mechanism, knot-tying mechanism, constantly running driving means, and means for throwing the driving mechanism of the knot-tying mechanism into operation when the winding operation is finished, substantially as described.

106. In a button sewing machine, the combination of knot-tying mechanism, winding mechanism, locking means for holding the knot-tying mechanism out of operation until the winding mechanism has finished its work, and means for simultaneously stopping and locking said winding mechanism, and for unlocking and starting said knot-tying mechanism, substantially as described.

107. In a button sewing machine, the combination of sewing mechanism, winding mechanism, knot-tying mechanism, and trimming mechanism, means for compelling the operation of the various mechanisms in the order named, a treadle and connections for moving the sewing mechanism to start the sewing operation and means for locking said treadle against return movement until after the knot-tying mechanism has finished its work, substantially as described.

108. In a button sewing machine, the combination of sewing mechanism, including a shuttle winding mechanism, knot-tying mechanism, trimming mechanism for the winding thread, and means for cutting the shuttle thread near the end of the operation of knot-tying mechanism, substantially as described.

109. In a button sewing machine, the combination of sewing mechanism, means for winding a thread around the sewing thread, and mechanism for severing the winding thread, substantially as described.

110. In a button sewing machine, the combination of sewing mechanism, winding mechanism, knot-tying mechanism, and a plate interposed between said knot-tying mechanism and the fabric, substantially as described.

111. In a button sewing machine, the combination of sewing mechanism, winding mechanism, knot-tying mechanism and trimming mechanism, and a plate interposed between said mechanism and the fabric, substantially as described.

112. In a button sewing machine, the combination of sewing mechanism, winding mechanism, means for holding a button a predetermined distance from the fabric, and means for tying a knot in the winding thread, substantially as described.

113. In a button sewing machine, the combination of sewing mechanism, winding mechanism, knot-tying mechanism, and means for shifting the button during the middle of the sewing operation, substantially as described.

114. In a button sewing machine, the combination of sewing mechanism, winding mechanism, knot-tying mechanism, and separate means for severing the various threads, substantially as described.

115. In a button sewing machine, the combination of sewing mechanism, winding mechanism, knot-tying mechanism, separate means for severing the various threads, and means for holding the severed ends next to the machine fast so that a new button may be sewed on, substantially as described.

116. In a button sewing machine, the combination of sewing mechanism, winding mechanism, knot-tying mechanism, button shifting means, and separate means for severing the various threads, substantially as described.

117. In a button sewing machine, the combination of sewing mechanism, winding mechanism, knot-tying mechanism, means for pulling tight the last loop made by the sewing mechanism, and separate means for severing the various threads, substantially as described.

118. In a button sewing machine, the combination of sewing mechanism, winding mechanism, knot-tying mechanism, means for shifting the button during the middle of the sewing operation, means for pulling tight the last loop made by the sewing mechanism, and separate means for severing the various threads, substantially as described.

119. In a button sewing machine, the combination of sewing mechanism, winding mechanism, knot-tying mechanism, means for shifting the button at the middle of the sewing operation, means for pulling tight the last loop made by the sewing mechanism, separate means for severing the various threads, and means for holding the ends of said threads next the machine tight, so that a new button may be sewed on, substantially as described.

120. In a button sewing machine, the combination of sewing mechanism, winding mechanism, knot-tying mechanism, means for opening the tension of the winding thread during the knot-tying operation, and means for opening the tension of the sewing thread, when the knot-tying operation is finished, substantially as described.

121. In a button sewing machine, the combination of sewing mechanism, winding mechanism, knot-tying mechanism, means for opening the tension controlling the winding thread at the beginning of the knot-tying operation, means for opening the tension controlling the needle thread at the end of the knot-tying operation, and means for severing said threads when a button has been completely sewed on, substantially as described.

122. In a button sewing machine, the combination of sewing mechanism, winding mechanism, knot-tying mechanism, means for shifting the button in the middle of the sewing operation, means for opening the tension controlling the winding thread at the beginning of the knot-tying operation, means for opening the tension of the needle thread at the end of the knot-tying operation, separate means for severing the various threads, and means for holding tight the free ends of the severed threads leading to the spools, substantially as described.

123. In a button sewing machine, the combination of sewing mechanism, winding mechanism, knot-tying mechanism, means for pulling tight the last loop made by the sewing mechanism, separate means for severing the various threads after the button is sewed on, means for opening the tension controlling the winding thread before the knot-tying operation has begun, means for opening the tension controlling the needle thread after the knot-tying operation is finished, and means for holding the ends of the threads which lead to the spools tight, substantially as described.

124. In a button sewing machine, the combination of sewing mechanism, winding mechanism, knot-tying mechanism, means for shifting the button at the middle of the sewing operation, means for pulling tight the last loop made by the sewing mechanism, means for opening the tension controlling the winding thread at the beginning of the knot-tying operation, means for opening the tension controlling the sewing thread at the end of the knot-tying operation, separate severing mechanisms for the said threads and means for holding tight the ends of said threads leading to the spools, substantially as described.

125. In a button sewing machine, the combination of sewing mechanism, including a shuttle knot-tying mechanism, means for trimming off the ends of the loop after the knot is tied, means for cutting off the excess of thread leading from the loop forming mechanism to the said trimming means, and means for cutting the shuttle thread, substantially as described.

126. In a button sewing machine, the combination of sewing mechanism, including a shuttle, winding mechanism, knot-tying mechanism, means for severing the needle thread, means for severing the shuttle thread, and means for severing the winding thread in two places, substantially as described.

127. In a button sewing machine, the combination of sewing mechanism, including a shuttle, winding mechanism, knot-tying mechanism, means for severing the needle thread, means for severing the shuttle thread, means for severing the winding thread in two places, and means for holding tight the severed ends of said threads which lead back to said spools, substantially as described.

128. In a button sewing machine, the combination of sewing mechanism, winding mechanism, and means for trimming the winding thread after the button has been sewed on, substantially as described.

129. In a button sewing machine, the combination of winding mechanism, means, including gripping devices, for holding the winding thread, trimming it after a button has been sewed on, and severing the excess of thread leading from the gripping devices to the said trimming means, substantially as described.

130. In a button sewing machine, the combination of trimming mechanism, a button chuck, and means for simultaneously operating said trimming mechanism and opening said button chuck, substantially as described.

131. In a button sewing machine, the combination of a presser plate, trimming mechanism, a button chuck, means for severing the excess of thread, and means for simultaneously lowering said presser plate, closing said button chuck, and operating the severing mechanism, substantially as described.

132. In a button sewing machine, the combination of knot-tying mechanism, trimming mechanism, and means for preventing the operation of the trimming mechanism until the knot-tying operation has been finished, substantially as described.

133. In a button sewing machine, the combination of knot-tying mechanism, trimming mechanism, means for severing the excess of thread, and means for preventing the operation of the trimming mechanism and the means for severing the thread until the knot-tying operation has been completed, substantially as described.

134. In a button sewing machine, the combination of winding mechanism, knot-tying mechanism, and movable trimming mechanism adapted to sever the thread after a knot has been tied, and to simultaneously grip the severed ends, substantially as described.

135. In a button sewing machine, the combination of sewing mechanism, winding mechanism and movable trimming mechanism therefor including severing knives and corrugated plates for holding the severed ends of the thread, substantially as described.

136. In a button sewing machine, the combination of sewing mechanism, winding mechanism and trimming mechanism, and means for throwing said trimming mechanism out of operation when desired, substantially as described.

137. In a button sewing machine, the combination of sewing mechanism, winding mechanism, knot-tying mechanism, and means for throwing said winding and knot tying mechanisms out of operation when desired, substantially as described.

138. In a button sewing machine, the combination of sewing mechanism, winding mechanism, knot-tying mechanism, trimming mechanism, and means for preventing the operation of the last three named mechanisms, substantially as described.

139. In a button sewing machine, the combination of sewing mechanism, winding mechanism, knot-tying mechanism, trimming mechanism, means for throwing the winding mechanism and knot-tying mechanism out of operation, and a separate means for throwing the trimming mechanism out of operation, substantially as described.

140. In a button sewing machine, the combination of sewing mechanism, winding mechanism, knot-tying mechanism, trim- 141. In a button sewing machine, the combination of sewing mechanism, winding mechanism, knot-tying mechanism, a plurality of trimming mechanisms, means for simultaneously throwing the winding mechanism and knot tying mechanism out of operation, and means for separately throwing said trimming mechanisms out of operation, substantially as described.

142. In a button sewing machine, the combination of sewing mechanism, winding mechanism, knot-tying mechanism, means for holding a button, and means for trimming the winding thread after the knot has been tied, including a movable part provided with projecting roughened portions and projecting knives and adapted to be moved under the button, thereby trimming the winding thread and simultaneously holding the loose ends thereof, substantially as described.

143. In a button sewing machine, the combination of sewing mechanism, winding mechanism, knot-tying mechanism, a button chuck, gripping devices and movable trimming mechanism adapted to pass under said button chuck and provided with projecting roughened portions and with knives adapted to sever the winding thread and hold the loose ends thereof, and severing mechanism for cutting off the excess of the winding thread leading to the grippers, substantially as described.

144. In a button sewing machine, the combination of sewing mechanism, winding mechanism, knot-tying mechanism, movable trimming mechanism, means for advancing said trimming mechanism, causing it to sever the strands of the winding thread after a knot has been tied and to hold the loose ends, and means for returning said trimming mechanism to its original position and simultaneously loosening the severed strands of the winding thread, substantially as described.

145. In a button sewing machine, the combination of winding mechanism, knot-tying mechanism, gripping devices, trimming mechanism, mechanism for severing the excess of thread leading from the gripping means to the button, and common means for simultaneously throwing said trimming mechanism and said severing mechanism out of operation, substantially as described 146. In a button sewing machine, the combination of sewing mechanism, winding mechanism, movable trimming mechanism provided with a trigger, knives, and a spring, means for moving said trimming mechanism as a whole toward the button which has just been sewed on and until the trigger strikes a fixed part of the machine, whereupon the spring quickly forces forward one of said knives to the other, thus severing the winding thread, substantially as described.

147. In a button sewing machine, the combination of winding mechanism and trimming mechanism movable as a whole and made up of parts movable with relation to each other and including a trigger, knives, roughened projections, and a spring, means for moving said trimming mechanism as a whole toward said button until said trigger strikes a fixed part of the machine, whereupon the spring forces one of said knives and one of said roughened portions quickly toward the corresponding portions, thus severing the strands of the winding thread and firmly gripping the severed ends, substantially as described.

148. In a button sewing machine, the combination of winding mechanism and trimming mechanism movable as a whole and made up of parts movable with relation to each other and including a trigger, knives, roughened projections, and a spring, means for moving said trimming mechanism as a whole toward said button until said trigger strikes a fixed part of the machine, whereupon the spring forces one of said knives and one of said roughened portions quickly toward the corresponding portions, thus severing the strands of the winding thread and firmly gripping the severed ends, and means for returning said trimming mechanism to its original position, substantially as described.

149. In a button sewing machine, the combination of winding mechanism and trimming mechanism movable as a whole and composed of parts movable with relation to each other including a long projecting portion roughened on one side and provided with a knife edge on the other, a trigger normally locking the movable parts of the trimming mechanism together, a spring tending to force said movable parts away from each other, and a spring controlled thread guide, substantially as described.

150. In a button sewing machine, trimming mechanism including a long projecting portion roughened on one side and provided with a knife on the other, a spring controlled thread guide mounted thereon, a movable part or ram mounted thereon, a pivoted trigger securing the ram to the main portion of the trimming mechanism, and a spring tending to force the ram along the main portion of the trimming mechanism, substantially as described.

151. In a button sewing machine, the combination of winding mechanism and trimming mechanism composed of a long narrow guide provided with projections near one end, one of which is roughened and the other provided with a knife edge, a spring actuated thread guide mounted between said projections, a ram movable on said guide, a spring constantly tending to move said ram along said guide, a spring actuated trigger pivoted on said ram and adapted to engage a projection on said guide, said ram being provided with a projecting roughened portion and a projecting knife edge, substantially as described.

152. In a button sewing machine, the combination of winding mechanism, trimming mechanism composed of a long narrow guide, with projections near one end, one of which is sharpened and the other corrugated, a ram movable on said guide and provided with a projecting knife and a projecting roughened portion, a spring actuated trigger mounted on said ram and normally engaging a projection on said guide, and means for moving said trimming mechanism bodily until the trigger strikes a fixed portion of the frame whereupon the ram moves forward with a snap, severing the strands of the winding thread and firmly holding the severed ends thereof, substantially as described.

153. In a button sewing machine, the combination of winding mechanism, knot-tying mechanism, including grippers, trimming mechanism for the strands of the winding thread, means for opening said grippers, and means for severing the excess of thread leading from said grippers to said trimming mechanism, and simultaneously releasing said grippers, whereupon they immediately grip the severed free end of the winding thread, substantially as described.

154. In a button sewing machine, the combination of winding mechanism, grippers for the winding thread, a button chuck, trimming mechanism, severing mechanism to cut off the excess of thread leading from said grippers to said trimming mechanism, means for simultaneously opening said button chuck and operating said trimming mechanism to trim the strands of the winding thread and to open said grippers, and means for simultaneously releasing said grippers allowing them to close and for severing the excess of winding thread leading from said grippers to said trimming mechanism, substantially as described.

155. In a button sewing machine, the combination of a button chuck provided with movable jaws, a support for said chuck, means for adjusting said chuck in said support, and loop holding means carried by said chuck, substantially as described.

156. In a button sewing machine, the combination of a button chuck, a hollow support therefor, means for adjusting said chuck up and down in said support, and means for preventing the rotation of the button chuck, substantially as described.

157. In a button sewing machine, the combination of a button chuck provided with movable jaws, a hollow support therefor provided with a scale, means for adjusting said button chuck up and down, and a spring actuated loop holding device attached to said button chuck, substantially as described.

158. In a button sewing machine, the combination of a button chuck provided with three jaws and means for adjusting said jaws equally toward or away from a common center, and a swinging jaw, with a hollow support for said button chuck provided with a scale, and means for adjusting said button chuck up and down, substantially as described.

159. In a button sewing machine, the combination of winding mechanism, a hollow support projecting downwardly from a part thereof and provided with a scale, a button chuck carried by said support, means for adjusting said button chuck, means for preventing the rotation of said button chuck with relation to said support, and a spring operated device carried by said button chuck for holding the loop tight, said button chuck being provided with a plurality of adjustable jaws and a swinging jaw, substantially as described.

160. In a button sewing machine, the combination of sewing mechanism, means for starting the sewing mechanism into operation, and means for winding a thread around the neck of thread connecting the button and the cloth, and means for tying and severing said thread at the end of the winding operation, substantially as described.

161. In a button sewing machine, the combination of sewing mechanism, winding mechanism, knot-tying mechanism, means for severing the sewing thread, means for compelling the operation of the sewing mechanism, winding mechanism and knot-tying mechanism in the order named, starting mechanism for the sewing mechanism, and means operated by the return of said starting means to its original position to operate said severing means, substantially as described.

162. In a button sewing machine, the combination of sewing mechanism, winding mechanism, knot-tying mechanism arranged to operate successively in the order named, a treadle and connections for starting the sewing mechanism, and means for holding said treadle locked after it has once been moved to start the sewing mechanism until the knot-tying operation has been finished, substantially as described.

163. In a button sewing machine, the combination of sewing mechanism, winding mechanism, knot-tying mechanism, a treadle and connections for starting the sewing mechanism into operation, and means compelling the complete operation of all of said mechanisms in the order named until the knot-tying operation has been finished, substantially as described.

164. In a button sewing machine, the combination of sewing mechanism, winding mechanism, knot-tying mechanism, means for starting the sewing mechanism into operation, locking means for preventing the operation of the winding mechanism and knot-tying mechanism until the sewing mechanism has finished its work, locking means for preventing the operation of the sewing mechanism and knot-tying mechanism during the operation of the winding mechanism, and locking means preventing the operation of the sewing mechanism and the winding mechanism while the knot-tying mechanism is in operation, and means for compelling the operation of said mechanisms successively in the order named, substantially as described.

165. In a button sewing machine, the combination of sewing mechanism, winding mechanism, knot-tying mechanism, means for starting the sewing mechanism, and means for insuring the application of power to the machine until the knot-tying operation has been finished, substantially as described.

166. In a button sewing machine, the combination of sewing mechanism, winding mechanism, knot-tying mechanism, a presser plate and trimming mechanism carried thereby, a treadle and connections for starting said sewing mechanism into operation, a second treadle for lifting the presser plate at the end of the knot-tying operations, means compelling the action of the sewing mechanism, winding mechanism, and knot-tying mechanism in the order named, and means preventing the lifting of the presser plate and the action of the trimming mechanism until the knot-tying operation is finished, substantially as described.

167. In a button sewing machine, the combination of sewing mechanism, winding mechanism, knot-tying mechanism, and means for severing the needle thread, shuttle thread and winding thread at the proper times, substantially as described.

168. In a button sewing machine, the combination of sewing mechanism, winding mechanism, knot-tying mechanism, means for severing the needle thread, shuttle thread and winding thread, means for starting the sewing mechanism, and means compelling the operation of the various mechanisms named and the severing means in the order recited, substantially as described.

169. In a button sewing machine, the combination of sewing mechanism, winding mechanism, knot-tying mechanism, trimming mechanism for the needle thread, shuttle thread and the winding thread, means for starting the sewing mechanism, means for compelling the operations of the various mechanisms in the order named, and locking means preventing the operation of any one of said mechanisms until the preceding mechanism has finished its work, substantially as described.

170. In a button sewing machine, the combination of sewing mechanism, means for starting said mechanism into operation, means for winding a thread around the neck of thread connecting the button and the cloth, severing means, and means for tying a knot in said winding thread at the close of the winding operation, the shuttle and winding threads being severed after the tying operation, substantially as described.

171. In a button sewing machine, the combination of a sewing mechanism including a shuttle, winding mechanism, knot-tying mechanism, trimming mechanism for the winding thread, means for severing the shuttle thread after a button has been sewed on, means for starting the sewing mechanism, and means operated by the return of said starting mechanism to its original position to operate said means for severing the shuttle thread, substantially as described.

172. In a button sewing machine, the combination of sewing mechanism including a shuttle, winding mechanism, knot-tying mechanism, a presser plate, trimming mechanism supported thereby, means for severing the shuttle thread, a treadle and connections for starting the sewing mechanism, locking means preventing the return of said treadle to its original position until the knot-tying operation has been finished, a treadle for lifting the presser plate and operating the trimming mechanism, locking means for preventing the operation of either of said treadles unless the other is in its original position, and means operated by the return of said first named treadle to set in operation the means for severing the shuttle thread, substantially as described.

173. In a button sewing machine, the combination of sewing, winding, knot-tying and trimming mechanisms and means for causing the successive operation of said mechanisms in the order named, substantially as described.

174. In a button sewing machine, the combination of winding mechanism, trimming mechanism, grippers, gripper openers, and means for throwing the trimming mechanism for the winding thread and the gripper openers out of operation simultaneously, substantially as described.

175. In a button sewing machine, the combination of winding mechanism, trimming mechanism, gripping devices for the end of the winding thread, means for opening said gripping devices, and means for simultaneously throwing said trimming mechanism and said gripper opener devices out of operation, substantially as described.

176. In a button sewing machine, the combination of sewing mechanism, winding mechanism, knot tying mechanism, and a plate interposed between the winding mechanism and the fabric, substantially as described.

177. In a button sewing machine, the combination of sewing mechanism, winding mechanism, knot tying mechanism, and a plate interposed between said winding and knot tying mechanism and the fabric, substantially as described.

178. In a sewing machine, the combination of a throat plate, a presser plate arranged to move parallel with the throat plate, sewing mechanism, means for moving said presser plate, means for applying power to said sewing mechanism, and means for preventing the movement of the presser plate when the sewing mechanism is in operation, and for preventing the operation of the sewing mechanism when the presser plate is being moved, substantially as described.

179. In a sewing machine, the combination of a throat plate, a presser plate arranged to move parallel with the throat plate, sewing mechanism, means for lifting said presser plate, means for applying power to the sewing mechanism, and means for preventing the lifting of the presser plate when the sewing mechanism is operating, and for preventing the operation of the sewing mechanism when the presser plate is being lifted, substantially as described.

180. In a button sewing machine, the combination of a presser plate, winding mechanism, means for lifting the presser plate and winding mechanism and means for preventing the operation of the winding mechanism while the presser plate is lifted, substantially as described.

181. In a sewing machine, the combination of a presser plate, knot tying mechanism, means for lifting the presser plate and knot tying mechanism and means for preventing the operation of the knot tying mechanism while the presser plate is lifted, substantially as described.

182. In a sewing machine, the combination of a presser plate, sewing mechanism, winding mechanism, knot tying mechanism, means for lifting said winding and knot tying mechanisms as a unit, and means for preventing the operation of the sewing mechanism during said lifting operation, substantially as described.

183. In a button sewing machine, the combination of means for winding a plurality of turns of single thread about the material to be bound, with means for securing the ends of said thread together.

184. In a button sewing machine, the combination of winding mechanism, a slotted loop former, a slotted twister carried by said loop former, means for drawing the strands of the winding thread into the slots of said former and twister, and means for periodically retaining said slots in alinement with each other, substantially as described.

185. In a button sewing machine, the combination of winding mechanism, a slotted loop former, means carried thereby for gripping the end of the winding thread, and means for drawing the strands of the winding thread into the slot of the loop former, substantially as described.

186. In a button sewing machine, the combination of sewing mechanism, winding mechanism adapted to wind a plurality of turns around the neck of thread holding the button to a fabric, means for holding said button a predetermined distance from the fabric, and means for tying a knot in the winding thread, substantially as described.

187. In a button sewing machine, the combination of means for winding a plurality of turns of single thread about the material to be bound, with means for securing the ends of said thread.

188. In a button sewing machine, the combination of means for winding a plurality of turns of single thread about the material to be bound, with means for securing the beginning end of said thread.

189. In a button sewing machine the combination of means for winding a plurality of turns of single thread about the material to be bound, with means for securing the ending end of said thread.

190. In a button sewing machine, the combination of sewing mechanism adapted to pass a thread through a fabric and form a stitch therein, with means for winding a thread around said sewing thread, and means for securing the ends of the winding thread.

191. In a button sewing machine, the combination of sewing mechanism adapted to pass a thread through a fabric and form a stitch therein, with means for winding a thread around said sewing thread on one side of said fabric, and means for securing the ends of the winding thread.

192. In a button sewing machine, the combination of sewing mechanism adapted to pass a thread through a fabric and form a stitch therein, with means for winding a thread around said sewing thread on the upper side of said fabric, and means for securing the ends of the winding thread.

193. In a button sewing machine, the combination of sewing mechanism adapted to pass a thread through a fabric and form a stitch therein, with means for winding a thread around said sewing thread, and means for securing the ends of the winding thread.

In testimony whereof, I affix my signature, in presence of two witnesses.

JOHN W. DARLEY, Jr.

Witnesses:
G. A. BRERETON,
A. B. STELLE.